United States Patent
Jacobsen

(10) Patent No.: US 12,352,910 B2
(45) Date of Patent: Jul. 8, 2025

(54) APPARATUS AND METHOD FOR MEASURING RADON

(71) Applicant: Jacobsen Scientific ApS, Skanderborg (DK)

(72) Inventor: Rune Shim Jacobsen, Skanderborg (DK)

(73) Assignee: Jacobsen Scientific ApS, Skanderborg (DK)

( * ) Notice: Subject to any disclaimer, the term of this patent is extended or adjusted under 35 U.S.C. 154(b) by 0 days.

(21) Appl. No.: 18/967,633

(22) Filed: Dec. 3, 2024

(65) Prior Publication Data
US 2025/0180763 A1 Jun. 5, 2025

(30) Foreign Application Priority Data
Dec. 5, 2023 (DK) .......................... PA 2023 01163

(51) Int. Cl.
*G01T 1/178* (2006.01)
*G01T 1/24* (2006.01)

(52) U.S. Cl.
CPC .............. *G01T 1/244* (2013.01); *G01T 1/178* (2013.01); *G01T 1/245* (2013.01)

(58) Field of Classification Search
CPC .......... G01T 1/244; G01T 1/178; G01T 1/245
See application file for complete search history.

(56) References Cited

U.S. PATENT DOCUMENTS

| 5,834,628 A | 11/1998 | Hunter et al. |
| 10,132,936 B2 | 11/2018 | Ko et al. |
| 2006/0103537 A1 | 5/2006 | Defant et al. |
| 2009/0230305 A1 | 9/2009 | Burke et al. |

FOREIGN PATENT DOCUMENTS

| CA | 1293570 C | 12/1991 |
| EP | 0473015 A2 | 3/1992 |
| EP | 0503568 A2 | 9/1992 |
| EP | 1298381 A2 | 4/2003 |
| GB | 2064105 A | 6/1981 |
| GB | 2106641 A | 4/1983 |

(Continued)

OTHER PUBLICATIONS

6th Technical Examination of Danish Patent Application No. PA 2023 01163 dated Jan. 27, 2025.

(Continued)

*Primary Examiner* — David P Porta
*Assistant Examiner* — Fani Polyzos Boosalis
(74) *Attorney, Agent, or Firm* — Vista IP Law Group, LLP

(57) ABSTRACT

The disclosure relates to an apparatus for measuring Radon progeny. The apparatus moves air through a filter and thereby collects Radon progeny on the filter and detects radiation from the collected progeny using a semiconductor detector. The apparatus might use a filter that is permanently attached to a filter holder, which aids in miniaturizing the detection system. The apparatus might determine the equivalent equilibrium Radon concentration and possibly the Radon concentration. The apparatus is suited for measuring Radon relatively fast. The disclosure also relates to a method for measuring Radon using the apparatus, where a measurement is performed at a place where air movement is unlikely.

15 Claims, 32 Drawing Sheets

(56) References Cited

FOREIGN PATENT DOCUMENTS

| KR | 20200025899 A | 3/2020 | | |
|---|---|---|---|---|
| WO | WO 2013/011321 A2 | 1/2013 | | |
| WO | WO 2013/011322 A2 | 1/2013 | | |
| WO | WO-2022063776 A1 * | 3/2022 | ............. | G01T 1/167 |
| WO | WO 2022063785 A2 | 3/2022 | | |

OTHER PUBLICATIONS

Foreign Intention to Grant for Danish Patent Appln. No. PA 2023 01163 dated Dec. 3, 2024.
"Modulus of Elasticity," Omnexus: The Material Selection Platform, date found via Google as Mar. 1, 2023.
"Yellow washing up bowl," Museum of Design in Plastics, URL: https://www.modip.ac.uk/artefact/phsl-282, Copyright 2024.
"Photodiodes for Radon Detection," Excelitas Technologies, URL: https://www.excelitas.com/product-category/photodiodes-radon-detection, date found via Google as Jun. 16, 2022.
Shilov, A., "Intel's Core i7-11700K 'Rocket Lake' Delidded: A Big Die, Revealed," tom's Hardware, dated Mar. 16, 2021.
"Diamond (C)—Properties and Applications," AzoM, URL: https://www.azom.com/properties.aspx?ArticleID=262, date found via Google as Aug. 2, 2017.
Machine Translation of Foreign Patent Doc. KR20200025899A.
"Digital Radon Monitor System: User Manual," CanaryPRO, Corentium AS, Oslo, Norway, Copyright 2015.
"Airthings Wave—Smart Radon Detector," Operating Manual, Version 2, May 2, 2018.
"Normal Conditions", ISO 61140:2016, section 4.2, p. 19-20, copyright IEC 2016.
"Limitation of voltages", ISO 61140:2016, section 5.2.6, p. 24, copyright IEC 2016.
"Volume of air sampled", ISO 11665-1:2015, section 6.4.3, Volume of air sampled, p. 12, copyright ISO 2012.
Danish Building Regulations 2018, Section 443, (current legislation as of Nov. 25, 2024), with English translation.
Translation of p. 15 in SBI anvisning 270, 1st edition, Feb. 6, 2018, ISBN 978-87-563-1866-2, with scan of pages.
Danish Building Regulations 2018, Section 332, (current legislation as of Nov. 25, 2024), with English translation.
"Council Directive 2013/59/EURATOM," Official Journal of the European Union, dated Jan. 17, 2014.
"What is EPA's Action Level for Radon and What Does it Mean?," EPA: United States Environmental Protection Agency, URL: https://www.epa.gov/radon/what-epas-action-level-radon-and-what-does-it-mean, dated Nov. 15, 2024.
"Chapter 8.3", WHO air quality guidelines for Europe, 2nd edition, 2000 (CD ROM version), dated 2001.
Translation of p. 36 in SBI anvisning 270, 1st edition, Feb. 6, 2018, ISBN 978-87-563-1866-2, with scan of pages.
Translation of p. 40 in SBI anvisning 270, 1st edition, Feb. 6, 2018, ISBN 978-87-563-1866-2, with scan of pages.
"Materials Data Book," 2011 Edition, Cambridge University Engineering Department, dated 2019.
"Gamma-Photon Radiation Detector," Application Note 2236, Maxin Integrated, dated Sep. 22, 2003.
"International Atomic Energy Agency's homepage," URL: https://www-nds.iaea.org/, archived by Internet Archive on Mar. 9, 2023.
1st technical examination of Danish Patent Appln. No. PA 2023 01163 dated Apr. 11, 2024.
4th technical examination of Danish Patent Appln. No. PA 2023 01163 dated Nov. 29, 2024.
Amendment to $2^{nd}$ Technical Examination of Danish Patent Appln. No. PA 2023 01163 dated May 27, 2024.
2nd Technical Examination of Danish Patent Appln. No. PA 2023 01163 dated May 17, 2024.
$3^{rd}$ Technical Examination of Danish Patent Appln. No. PA 2023 01163 dated Sep. 2, 2024.

* cited by examiner

APPARATUS AND METHOD FOR MEASURING RADON

RELATED APPLICATION DATA

This application claims priority to, and the benefit of, Danish Patent Application No. PA 2023 01163 filed on Dec. 5, 2023. The entire disclosure of the above application is expressly incorporated by reference herein.

FIELD

The field of the disclosure relates to apparatus and method for measuring radon.

BACKGROUND

This disclosure relates to an apparatus that allows fast measurement of the Radon concentration. Such a device is needed, as it is e.g. difficult for potential real estate buyers to evaluate the Radon risk before buying property.

This is because, at present day, measurement instruments are either expensive, large and complex, aimed at a professional marked, or slow measuring, aimed at current houseowners.

If a property has elevated Radon concentration, it will normally require a significant renovation process to rectify. Hence current houseowners are not compelled to measure the Radon concentration, as a negative result (high Radon concentration observed in the property) will either demand a potential expensive renovation or if knowingly left unattended, it might lower the property value.

By introducing a simple, user friendly Radon apparatus, which allows the real estate buyer to determine the Radon level while the broker shows the property, the Radon problem will be pushed to the current owner. This will also mean that the potential Radon renovation cost will be reflected in the real estate price, hence encouraging real estate owners to do Radon renovations, as the renovation will no longer be in vain from a purely economic viewpoint.

In Denmark (population 5.9 mio.) Radon is responsible for approximately 300 cases of lung cancer annually. This is a large health expenditure and it also shortens the life expectancy for the affected people considerably. Hence, a fast user friendly Radon apparatus will have a considerably positive effect.

There are numerous techniques for measuring the Radon concentration. A common method is to use a passive trace film, also known as a solid-state nuclear track detector or SSNTD. Here the film is left for a considerably amount of time, e.g. a few weeks to about 3 months, in the building that is examined. Hereafter, the film is sent to a laboratory for analysis.

The most common principle for active apparatuses is to use a diffusion chamber, where a semiconductor detector is used to detect the radiation. Different embodiments of this type of apparatus are described in patent applications WO 2013/011322A2 (CORENTIUM AS) 2013 Jan. 24, WO 2013/011321A2 (CORENTIUM AS) 2013 Jan. 24 and US 2009/230305A1 (BURKE JOSEPH P et al) 2009 Sep. 17. This type of apparatus normally uses around 1 week to determine the Radon concentration with a reasonable accuracy, as described in the manual for Canary Pro by Corentium, v1.3, 2015, under specifications and in the manual for Airthings Wave by Airthings, version 2, May 2, 2018, under technical specifications. The relative long measurement time is caused by the small volume of the diffusion chamber.

To obtain a faster measurement time, multiple diffusion chambers can be combined. But to achieve 10% uncertainty (1-sigma) for a 100 Bq/m3 Radon concentration within a 30 min measurement time with a typical diffusion chamber that gives 1 count pr hour (CPH) at 100 Bq/m3, it is necessary to combine 200 individual diffusion chambers. Here the time needed to replace the air in the diffusion chamber is not taken into account and hence in reality, the number of needed chambers is therefore considerably larger.

It is also possible to use a Lucas cell as the detector in a diffusion bases apparatus. The advantage is that the detector area can be large and hence the sensitivity is better, but it is a somewhat expensive and volumetric large solution.

Another method is to use an ion chamber, as described in patent application U.S. Ser. No. 10/132,936B2 (KO JAE JUN et al.) 2018 Nov. 20. The testing time is here reduced due to the larger volume of the chamber. However, as stated in the cited patent, the input impedance of the ion chamber detector is close to infinity and it is sensitive to electrical noises. Moreover, it requires a large DC voltage (50-200V in the cited patent) at the surface of the ionization chamber. Other ion chambers use an even larger DC voltage like 750V. Low voltages are advantageous from a safety viewpoint and here ISO 61140:2016, section 4.2, "Normal Conditions", page 19-20, states that DC voltages below 120 volt are classified as extra low voltage. ISO 61140:2016, section 5.2.6, "Limitation of voltages", pager 24, states that touch DC voltage should be below 15V, if the equipment is not solely used in dry areas.

A common issue for all diffusion-based detectors is the time it takes for the air inside the detector to be substituted when moving the apparatus. When the apparatus is moved it will generally contain air and until a significant part of said air is substituted by diffusion, the measurement result will reflect some average between the previous location and the current location.

To illustrate this issue, the diffusion equation solution in 1D can be used. Here, it is necessary to use the diffusion coefficient for Radon-222, which can be approximated to 0.067 cm^2/s using Graham's law and the diffusion coefficients for Hydrogen, Helium and Argon at 20 Celsius.

The Radon-222 diffusion coefficient can then be used to determine the average concentration inside an ion chamber. E.g. when a 10 cm high ion chamber is moved from a low concentration Radon (outside) to a high concentration Radon environment (inside a building), it will take approximately 50 min before the radon concentration inside the ion chamber reaches 80% of the high Radon concentration.

The diffusion length can of course be shortened by designing the ion chamber differently, but this will in general require a higher DC voltage; hence, from an electrical standpoint it introduces additional safety risks.

These considerations clearly demonstrate, that a diffusion-based apparatuses will either have too low sensitivity or too long diffusion time to enable a user, e.g. the real estate buyer to access the Radon concentration within a reasonable timeframe.

These considerations point towards the advantage of using an apparatus, that has means to move air through a filtering mean to catch the Radon progeny in close proximity to a detector. There exist several apparatuses that measure Radon in this way, but they all suffer from similar issues. Typical prior art detectors, like patent application EP0503568A2 (CONSULTEC SCIENT INC) 1992 Sep. 16 and U.S. Pat. No. 5,834,628A (HUNTER SCOTT R et al) 1998 Nov. 10, require relatively large and expensive detectors and/or require a relatively long measurement time, in particular a relative long exposure time at which the apparatus is located at the measurement location. Moreover, many prior art devices prevent a clear distinction between radiation energies. Some prior art, like patent application CA1293570C (THOMSON IAN) 1991 Dec. 24, does not report the Radon level directly, but requires the user to perform cumbersome calculations to determine the Radon level.

It is thus desirable to provide an apparatus that overcomes one or more of the above shortcomings or that solves one or more other problems or that at least provides an alternative to existing solutions.

SUMMARY

It is an object to measure decay(s) from Radon progeny.

This object can be achieved by an apparatus comprising the features defined in claim 1. Additional embodiments are disclosed in the dependent claims, the following description and the drawings. Secondly, a measurement method is provided.

Various embodiments of the apparatus for measuring decay(s) from Radon progeny comprises:
  an air moving device configured to create an airflow
  a filter
  a pathway configured to guide the airflow through said filter, wherein the filter is configured to collect at least part of the Radon progeny present in said airflow
a semiconductor detector for detecting radiation from the Radon progeny collected by said filter An advantage of this apparatus is that the number of measured radiation decays scales with the volume of air moved through the filter. Hence, this apparatus can reach a much higher count rate, than similar sized diffusion-based apparatus. This can allow for a reduced measurement time, which in turn allows a e.g. real estate buyer the opportunity to examine Radon in a prospective property.

It is also advantageous to employ a semiconductor detector, as the cleanroom manufacturing techniques makes it possible to produce almost identical devices. Hence, it is much easier to employ a semiconductor detector when producing a radon apparatus.

In one embodiment, the apparatus comprises a filter holder, wherein the filter is permanently attached to said filter holder and where at least part of said filter holder defines a periphery of the air's pathway and where said filter holder comprises more than a minuscule amount of at least one rigid material, possibly with a Youngs modulus above either 0.01 GPa, 0.05 Gpa or 0.1 Gpa and possible below either 200 Gpa or 600 Gpa.

In one embodiment, said filter holder comprises more than a tiny amount of at least one rigid material, possibly with a Youngs modulus above either 0.01 Gpa, 0.05 Gpa or 0.1 Gpa and possible below either 200 Gpa or 600 Gpa.

In one embodiment, said filter holder comprises more than a minute amount of at least one rigid material, possibly with a Youngs modulus above either 0.01 Gpa, 0.05 Gpa or 0.1 Gpa and possible below either 200 Gpa or 600 Gpa.

In one embodiment, said filter holder comprises more than a small amount of at least one rigid material, possibly with a Youngs modulus above either 0.01 Gpa, 0.05 Gpa or 0.1 Gpa and possible below either 200 Gpa or 600 Gpa.

In one embodiment, said filter holder comprises a bulk amount of at least one rigid material, possibly with a Youngs modulus above either 0.01 Gpa, 0.05 Gpa or 0.1 Gpa and possible below either 200 Gpa or 600 Gpa.

In one embodiment, said filter holder comprises more than 1% W/W of at least one rigid material, possibly with a Youngs modulus above either 0.01 Gpa, 0.05 Gpa or 0.1 Gpa and possible below either 200 Gpa or 600 Gpa.

In one embodiment, said filter holder comprises more than 5% W/W of at least one rigid material, possibly with a Youngs modulus above either 0.01 Gpa, 0.05 Gpa or 0.1 Gpa and possible below either 200 Gpa or 600 Gpa.

Hereby, it is preferably achieved that the active part of the filter has a constant area and that the filter holder maintains the size of this active area. The active area of the filter is defined as the area of the filter that is configured to collect Radon progeny from the airflow. This mitigates a common issue of prior art apparatus, where the user can replace the filter element without replacing the filter holder. Here, the packing elements that allow control of the air's pathway can vary in size when the prior art apparatus are assembled and hence affect the active area. As this impacts the perimeter of the filters active area, some prior art devices use a relatively large filter. For a circular filter, the active filter area scales with the radius squared, while the perimeter scales with the radius. Hence, the relative error scales inversely proportional to the radius. This effect of the perimeter induced error is also true for other forms of the filter. To accommodate for a large filter, an apparatus can either have a large detector or it can accept a low filter/detector efficiency. An issue with the first approach is that large detectors are expensive, moreover large detectors can have a higher power consumption and large detectors can have a higher electric capacity hence dampening the responds to measured radiation. Moreover, a large radiation detector might also prohibit differentiation between radiation energies and in turn might prohibit differentiation between different Radon progeny concentrations. An issue with the second approach is that a low filter/detector efficiency will limit the measured count rate and hence prolong the measurement time.

In one embodiment, the apparatus comprises a replaceable filter holder with a permanently attached filter.

Hereby, it is preferably achieved that the user can replace the filter by replacing both the filter holder and the filter. As the active area of the filter is here controlled by the manufacturing of the filter holder with the permanently attached filter, this allows for accurate determination of the Radon concentration using a relatively small detector while simultaneously having a high filter/detector efficiency. The air's pathway can in this case be controlled by packing elements that contacts at least in part the inactive area of the filter and/or the impermeable part of the filter holder.

In one embodiment, the filter is irreplaceable for the average consumer.

Hereby it is preferably achieved that the filter's position relative to the detector is accurately controlled. Moreover, when the filter is irreplaceable for the average consumer, both the size of the active area of the filter and its position relative to the detector can be maintained. This again can allow for accurate determination of the Radon concentration using a relatively small detector while simultaneously having a high filter/detector efficiency.

In one embodiment, the filter is permanently built into the apparatus.

Just as the battery in a modern-day smartphone can be permanently built into the phone, the described apparatus can have the filter permanently built into the apparatus. Accordingly, the filter forms a permanently integrated part of the apparatus and cannot be removed from the apparatus in a non-destructive manner, i.e. without damaging the filter itself or another part of the apparatus. This effectively hinders that the user replaces the filter. Such an apparatus can be a limited-use device that is discarded, when the filter needs replacement.

Using a filter permanently built into the apparatus can aid in producing an accurate apparatus using a relatively small detector while simultaneously having a high filter/detector efficiency.

In one embodiment, filter replacement requires the use of one or more specialized tools.

In one embodiment, filter holder replacement requires the use of one or more specialized tools.

Hereby, it is preferably achieved that the use of one or more specialized tools, which can comprise specialized assembly tools, can ensure the size and placement of the filter's active area relative to the detector. In an embodiment of the apparatus, the filter and/or the filter holder replacement should be performed by the manufacturer or other qualified personnel. The use of one or more specialized tools, hereunder specialized assembly tools, can allow for accurate determination of the Radon concentration using a relatively small detector while simultaneously having a high filter/detector efficiency.

In one embodiment, the one or more specialized tools comprise Radon calibration equipment.

When the one or more specialized tools comprise Radon calibration equipment, the manufacturing and assembly tolerances can be somewhat relaxed, as calibration of the apparatus can be used to rectify the variations. This can be a cost-effective strategy for producing an accurate Radon apparatus using a relatively small detector while simultaneously having a high filter/detector efficiency.

In one embodiment, the filter is fused and/or glued to the filter holder.

Hereby, it is preferably achieved that the air's pathway through the filter is ensured to pass through the filter by reducing or even eliminating false air, which again allows for accurately determination of the Radon concentration using a relatively small detector while simultaneously having a high filter/detector efficiency. Moreover, fusing and/or gluing is a cost-effective way for permanently attaching the filter to the filter holder.

In one embodiment, the semiconductor detector is manufactured from a silicon substrate.

The advantage of a silicon-based detector arises partly from the vast manufacturing experience with silicon. Due to this experience, a detector can be made in a repeatable, cost-effective manner.

In one embodiment, the semiconductor detector is a photodiode.

The advantage of using a photodiode is that they are manufactured in large quantities and hence are commercially available. Moreover, photodiodes are generally sensitive to alpha radiation.

In one embodiment, the apparatus is configured to use a constant voltage to power the air moving device, when the air moving device is activated.

Hereby, it is preferably achieved that the airflow rate is relative constant. Moreover, it is common that electric devices are limited with respect to the voltage they can endure. Hence, a constant voltage is preferable, as it allows operating the air moving device close to its maximum capacity.

In one embodiment, the apparatus uses a pump as air moving device.

The normally applied air moving devises comprise different construction principles. The most commonly applied construction principles include a fan, a blower and a pump. From an application viewpoint, a fan is preferable, when large quantities of air is moved, but where the back pressure is minimal. A blower is in between a fan and a pump, as it can both move relative large quantities of air and overcome some back pressure. A pump is more suited for moving smaller amounts of air in situations where a large back pressure must be overcome. Some filters induce a relatively large backpressure and hence in some embodiments, it is advantageous to apply a pump. In other embodiments that employ more permeable filters, a blower or even a fan will be preferable.

In one embodiment, the apparatus is configured to automatically enter a low power mode, which consumes less than either 100 mA or 20 mA current.

When the apparatus is used, it will consume power, especially when the air moving device is activated. To avoid unnecessary energy consumption, it is advantageous if the apparatus can automatically enter a low power mode. In this way, the apparatus can for example enter a low power mode after the air moving device stops, while maintaining to measure radiation from the filter due to the collected Radon progeny. Moreover, the apparatus might also enter a low power mode (which can be even more power saving) after the measurement is completed. In this way, the user can perform the measurement and obtain the result without risking to exhaust the apparatus power supply.

In one embodiment, the apparatus comprises an inlet for the airflow, said inlet being capable of connecting to a tube, which allows for measuring at air from a distance from the apparatus.

Hereby, it is preferably achieved that the apparatus can measure at places that are difficult to access. This could for example be inside a closet. Moreover, a larger distance between the air's inlet and outlet will limit recirculation of the air. Such recirculation is unwanted, as air that passes through the apparatus will already be filtered and hence contain fewer Radon progeny.

In one embodiment, the apparatus comprises an enclosure accommodating the air moving device, the filter and the semiconductor detector, wherein the enclosure comprises an inlet for allowing air to enter the enclosure, and wherein the apparatus further comprises a tube connectable to the inlet for allowing receipt of air at a distance from the enclosure.

Hereby, it becomes even more convenient for the user to measure at air originating from a position some distance away from the apparatus, as the needed tube is readily at hand.

In one embodiment, the apparatus comprises at least one relative airtight pressure chamber in the pathway that guides the airflow, where at least one side of said chamber comprises at least part of a PCB board.

The apparatus moves air through a filter and detects radiation from said filter. Hence, it is advantageous if the airflow is controlled and at the same time accessible by electronic components. These components can comprise one or more radiation detector(s) and possibly other air sensors. The latter can for example include one or more temperature sensor(s), one or more pressure sensor(s), both differential and/or absolute, one or more humidity sensor(s) one or more $CO_2$ sensor(s) and/or other similar sensors. The described chamber might allow for connecting to one or more electronic components via the PCB board, while controlling the air's pathway.

In one embodiment, a distance between the filter and the semiconductor detector is 2 mm or less.

In one embodiment, it is advantageous to use a detector chip either without enclosure or with a larger part of the enclosure removed. In other embodiment, it is advantageous to only remove part of the detector chip enclosure and then let the filter be in contact with at least part of the remaining enclosure. Hence the common chip enclosure thickness can be governing the filter to chip distance. In other embodiments, the chip enclosure is partly removed, but the filter is moved a little away from the enclosure to allow for a relative laminar airflow between the remaining enclosure and the filter. Common chips have an enclosure thickness between 0.38 mm and 1.65 mm (see detailed description). A large distance between the filter and the detector can also allow for substitution between detectors, hence allowing the manufacturer the freedom to choose between different detectors while using the same filter holder.

On the other hand, a large distance lowers the filter/detector efficiency. Hence, a distance of 2 mm or less between detector and filter might be preferable, pending the detector chips that the manufacturer envisions to apply.

In some embodiments, it can also be advantageous if the distance between the filter and the radiation detector is so large, that the speed of the airflow is easily manageable. E.g. it is difficult to manufacture an apparatus that controls an airflow which is faster than the speed of sound. For some embodiments this requires that the distance between the filter and the radiation detector is 0.02 mm or more.

For other embodiments, it is advantageous if the airflow speed is less than hurricane wind speed (33 m/s), as maintaining faster airflows imposes high manufacturing demands. In some cases, this requires that the distance between the filter and the radiation detector is 0.2 mm or more.

In one embodiment, the filter is a mechanical filter.

A mechanical filter is simple to use compared to an ionizing filter, as the later employs an electric field that ionizes the air. Such a field and especially the variations in the field caused by ionizing of dust particles can disturb the electronics that detects the radiation decays. Moreover, employing an electric field so strong that it ionizes the air, is in itself a safety concern.

On the other hand, an ionizing filter can be turned off and purged, which can remove material caught by the filter. This is an advantage, as the Radon decay daughters can then be flushed out when a measurement is complete and hence minimize the needed wait time between measurements. Moreover, permanent dust particle settlement might accumulate much slower on an ionizing filter if at all, hence postponing or avoiding filter replacement.

In one embodiment, the apparatus comprises or is connectable to electronic circuitry configured to interpret the detected radiation and hereby perform a Radon measurement.

The equivalent equilibrium Radon concentration can be determined by measuring the radiation from the Radon progeny collected at the filter, by knowing the measurement history (e.g. if the filter contained a significant amount of radioactive elements prior to the measurement) and by knowing how long time the air moving device was active and/or by moving air for a prolonged time, as the latter allows for asymptotically determination of the radiation rate. In all cases, the amount of air under investigation can be an input for the determination of the equivalent equilibrium Radon concentration from the radiation counts or count rate. The amount of air moved through the filter can be either assumed or measured.

The Radon concentration can be determined if the conversion factor (f), see detailed description, is either know by other means, or determined by the apparatus for example using the count rate ration between detected Polonium-214 radiation and detected Polonium-218 radiation.

The Radon concentration can be estimated if a conversion factor (f) is assumed.

In one embodiment, the apparatus comprises or is connectable to means for outputting an equivalent equilibrium Radon concentration and/or outputting a Radon concentration.

The apparatus can output the equivalent equilibrium Radon concentration and/or output the Radon concentration in a variety of ways. For example, the apparatus may include a display. Alternatively, the apparatus may include a communication interface for communicatively coupling the apparatus to a smartphone, a tablet, a computer or other electronic devices to allow the apparatus to communicate the equivalent equilibrium Radon concentration and/or output the Radon concentration, to said electronic device for display or otherwise. This is advantageous, as the user can then directly asses the Radon risk.

In one embodiment, the apparatus comprises or is connectable to a persistent memory for storing a remaining number of Radon measurements and/or measurement time that the apparatus can carry out using a current filter.

This is advantageous, as consecutive measurements can affect the filter performance and/or the calibration of the apparatus. As Radon cannot be smelled, tasted or otherwise assessed by the apparatus user, it is useful that the apparatus is trustworthy. In some embodiments, the calibration is only valid for a limited number of consecutive measurements and/or for a limited amount of air being moved through the filter. Hence, by including storage that is independent of the main power like storing the remaining valid measurement times in for example EEPROM, the user can be certain about the validity of the measurement. For clarification, the phrase current filter is used for the filter that is currently located in the airs pathway in the apparatus.

In one embodiment, the apparatus comprises or is connectable to means for interpreting the detected radiation and hereby determine a waiting time between consecutive Radon measurements when reusing the filter.

This is advantageous, as a consecutive Radon measurement can be affected by the previous Radon measurement, if the filter contains any of Radon's progeny when the consecutive Radon measurement is started. The influence of a previous Radon measurement can be minimized if enough time passes between the Radon measurements, as this allows the progeny time to decay. The required wait time depends on the needed level of accuracy and on the amount of Radon progeny collected during the previous Radon measurement. To aid the user, it is hence advantageous if the apparatus determines the required wait time, which allows for an acceptable precision for the later Radon measurement.

In one embodiment, the apparatus comprises or is connectable to a persistent memory for storing a remaining waiting time between consecutive Radon measurements.

This is advantageous, as waiting enough time between Radon measurements ensures an acceptable accuracy and if the apparatus is disconnected from the main power source, it will still be capable of informing the user about when a new Radon measurement can be performed. Here, the wait time does not have to be updated while disconnected from the main power source, as this only prolongs the overall wait time. Hence, even if the apparatus does not count the time passes while disconnected from the main power source, then if the user waits until the apparatus indicates a new Radon measurement is viable, the Radon progeny will at least have decayed to an acceptable level.

In one embodiment, the apparatus comprise means for establishing an airflow rate and/or an air volume moving through the filter during a Radon measurement and where a determination of an equivalent equilibrium Radon concentration and/or a determination of a Radon concentration in the air incorporates said airflow rate and/or said air volume.

Hereby, it is preferably achieved that sensing the airflow result in a more accurate determination of the equivalent equilibrium Radon concentration. It is here understood that incorporation of the flowrate will affect the numerical value of the determined concentration. In other embodiments, the airflow can be assumed, e.g. if the pump characteristics are known or calibrated at the manufacturing facility. Assumption of the air's flow rate will however in general be less precise than using means to establishing it.

In one embodiment, the apparatus comprises an air pressure sensor configured to sense at least a pressure of the airflow, and wherein the apparatus is configured to use this for establishing an airflow rate and/or an air volume that passes through the filter during a Radon measurement and where a determination of an equivalent equilibrium Radon concentration and/or a determination of a Radon concentration in the air incorporates said airflow rate and/or said air volume.

In one embodiment, the apparatus comprises an absolute pressure sensor.

Hereby, it is preferably achieved that the pressure sensor can be used to establish the airflow, as the pressure depends on the flow rate. Moreover, an absolute pressure sensor can in some embodiments also be used to establish the ambient pressure. This is advantageous, as the Radon concentration output in some embodiments refers to standardized conditions according to ISO 11665-1:2015, section 6.4.3, "Volume of air sampled", page 12. In some embodiments, a single absolute pressure sensor can be used both to establish the ambient pressure and to establish the flow rate.

In one embodiment, the apparatus comprises a dedicated choke in the air's pathway to induce a pressure difference that can be sensed by a pressure sensor.

Hereby, it is preferably achieved that the pressure difference measured is relatively stable, both for the individual apparatus and also ensures easier repeatability when manufacturing the apparatus. Moreover, the choke can be placed in an accessible position, which can allow cleaning by the user.

In one embodiment, the apparatus comprises a dedicated choke which is configured such that the pressure difference's dependency on humidity results in less than 10% error, when the apparatus measures at ambient conditions.

Hereby, it is preferably achieved that the establishment of the flow is relatively correct even if the apparatus does not measure the humidity. Moreover, as the uncertainty of a humidity measurement is generally large compared to temperature, pressure and CO2 concentration, it is advantageous if the establishment of the flow rate is not too dependent on the humidity, even if the apparatus employs a humidity sensor.

In one embodiment, the apparatus comprises a dedicated choke that uses one or more hole(s) shorter than 6 mm for a part of the choke that predominantly limits the airflow.

Hereby, it is preferably achieved, that the choke is easier to manufacture, as holes with a high aspect ratio are difficult to produce.

In one embodiment, the apparatus comprises a semiconductor detector that is configured to spectrally resolve alpha radiation and output a detector signal indicative of two or more respective energy levels of the detected alpha radiation.

Hereby, it is preferably achieved, that the radiation measurement can be used to distinguish between different radiation sources and in some embodiments between one or more of the Radon progeny's decays.

In one embodiment, the apparatus comprises or is connectable to electronic circuitry than includes means to spectrally resolve the detected radiation.

Hereby, it is preferably achieved, that the apparatus can distinguish between different radiation sources and in some embodiments between one or more of the Radon progeny's decays.

In one embodiment, the apparatus comprises a semiconductor detector with an active area that is less than 225 mm2.

This is advantageous, as a large detector makes it difficult to distinguish between different radiation energies, as the alpha radiation is attenuated when it passes through air. The active area of the detector is the area that is configured to detect radiation from Radon progeny. Applying an active detector area less than 225 mm2 can make the apparatus useful for discriminating between alpha decays originating from Polonium-214 and alpha decays originating from Polonium-218. Hence, an active detector area less than 225 mm2 can in turn make the apparatus useful for:

determining the conversion factor (f) between a Radon 222 progeny concentration and a Radon 222 concentration.

determining a ventilation rate in the dwelling.

using only Polonium-218 for making a Radon measurement, that due to the short lifetime of Polonium-218 will have a conversion factor (f) close to 1.

Alternatively, using only Polonium-214 for making a Radon measurement, which can be advantageous, as it can avoid issues due to Lead-210 build-up on the filter.

In one embodiment, the apparatus comprises a semiconductor detector with an active area that is less than 120 mm2.

Applying an active detector area less than 120 mm2 can make the apparatus useful for discriminating between alpha decays originating from Polonium-212 and alpha decays originating from Polonium-214. Hence, an active detector area less than 120 mm2 can in turn make the apparatus useful for distinguishing between Radon-220 and Radon-222 progeny. As the origin of Radon-220 is normally the applied building materials while Radon-222 normally originates from cracks in the dwelling's foundation, distinguishing between these isotopes can be used to guide a renovation process.

Moreover, if one dwelling contains an elevated Radon-220 concentration and another contains an elevated Radon-222 concentration similar in value (Bq/m3), then an apparatus that cannot distinguish between Polonium-212 and Polonium-214 will normally, wrongly, determine two very different Radon concentrations in the two dwellings, as the effective lifetime of Polonium-212 is much longer than the effective lifetime of Polonium-214.

In one embodiment, the apparatus comprises a semiconductor detector with an active area that is less than 25 mm2.

Applying an active detector area less than 25 mm2 can make the apparatus useful for discriminating between alpha decays originating from Polonium-210 alpha decays originating from Polonium-218. Hence, an active detector area less than 25 mm2 can in turn allow the apparatus to use both the Polunium-214 and the Polonium-218 decays to make a Radon measurement which gives a higher count rate and hence allows for a more precise result compared to using only the Polonium-214 decay, while at the same time avoiding issues due to Lead-210 build-up on the filter.

In one embodiment, the apparatus comprises a semiconductor detector with an active area that is less than 8 mm2.

Applying an active detector area less than 8 mm2 can make the apparatus useful for discriminating between alpha decays originating from Polonium-218 alpha decays originating from Bismuth-211. Hence, an active detector area less than 8 mm2 can in turn allow the apparatus to measure on Radon-222 progeny while excluding Radon-219 progeny. As legislation states that the Radon concentration is the Radon-222 concentration, it is useful to avoid counting other radiation sources.

Notice moreover that even though Radon-219 and Radon-222 both originates from Uranium (235 and 238, respectively), the half-live of the Radon isotopes are different. Hence the relative concentration between the isotopes will in part be determined by the diffusion time into the dwelling and it can hence vary significantly.

In one embodiment, the apparatus is configured to use a ratio between detected Polonium-214 radiation and detected Polonium-218 radiation to determine a conversion factor (f) between a Radon-222 progeny concentration and a Radon-222 concentration.

This is advantageous, as ventilation will lower the Radon progeny concentration in comparison with the Radon concentration. If a conversion factor (f) of 1 is applied, the actual Radon concentration tents to be underestimated.

In one embodiment, the apparatus is configured to use a ratio between detected Polonium-214 radiation and detected Polonium-218 radiation to determine a ventilation rate in the dwelling.

The ventilation rate can be used to determine the Radon concentration if the dwelling is unventilated (the maximal Radon concentration at that position in the dwelling), but moreover, the ventilation rate can be used to guide the user to the best solution for the Radon problem. E.g. if the ventilation rate is low, simply opening a window on a regular basis can lower the Radon concentration. It the ventilation rate is higher, the recommendation can be to install a mechanical air ventilation system, while if the ventilation is already close to or above the recommended ventilation level for new buildings (In the Danish Building Regulations 2018, § 443, (current legislation as of 25 Nov. 2024), it is stated that "supply of outdoor air must be present at any time at minimum 0.30 l/s per sq. metre heated floor area"), the solution can be to minimize the Radon entrance to the dwelling.

In one embodiment, a Radon measurement comprises a total count of one or more of Radon's progeny's decay(s) detected during the Radon measurement.

Generally, an apparatus can either move air for an extended period of time to achieve decay count rate stabilization, or it can use all the counts from the beginning of the measurement. The advantage of the first approach is that the mathematical treatment of the measurement is easier. Moreover, when a stabilized count rate is achieved, the influence from previous measurement is generally nil, as Radon progeny from the previous measurement will mostly be decayed. Using the total count is more difficult in these respects, but it offers a clear advantage, as it is possible to shorten the measurement time significantly.

In one embodiment, the Radon measurement comprises that the apparatus measures radiation while the air moving device is activated and in addition comprises that the apparatus measures radiation while the air moving device is deactivated.

This is advantageous, as a high count rate improves the measurement uncertainty. One example of such a measurement, is where the apparatus moves air while it is in the dwelling. After the air moving device is deactivated, the apparatus can then continue to measure on the decay tail, hence refining the measurement. In some cases, the apparatus can even be moved, after the air moving devise stops, while continuing the measurement on the decay tail. In some cases, this will allow the user to measure inside a dwelling for 30 min, while investigating the potential property and then bring the apparatus along afterwards, while it still continues measuring on the Radon progeny from the dwelling.

A different case is where the apparatus measures the airflow by deactivating the air moving device periodically to accommodate for changes in the ambient pressure. Here, it is advantageous if the apparatus continues to measure radiation when the air moving devise is deactivated, as this approach maximizes the count rate.

In one embodiment, the apparatus performs a Radon measurement by using the air moving device to accumulate Radon progeny on the filter for 90 minutes or less or in some embodiments even for 40 minutes or less during a Radon measurement.

Hereby, it is preferably achieved, that the user can determine the Radon concentration within a short period of time, e.g. while a real estate agent shows around in a potential property. In some embodiments, the apparatus achieves this by measuring the total counts from Radon progeny. In some embodiments, the apparatus achieves this by measuring predominately at Radon progeny with a shorter effective half-life. This could for example be an equivalent equilibrium Radon-222 measurement based on the Polonium-218 decay rate, as this stabilizes relatively fast. In other embodiments, the airflow rate is adjusted through the measurement, in such a way that the decay rate from slower decaying Radon progeny reaches stabilization faster, by starting a measurement with a high flow rate and then gradually decreasing said flow rate.

In one embodiment, the apparatus comprises a semiconductor detector located in an enclosure and where at least a part of the electronic circuitry is also positioned inside said enclosure.

In one embodiment, the apparatus comprises a semiconductor detector located on a PCB board and where at least a part of the electronic circuitry is also located on said PCB board.

This is advantageous, as the electric signal due to the radiation is usually quite small and hence prone to disturbances from electrical interference. Placing the detector and at least part of the electronic circuitry inside the same enclosure makes it easier for the manufacturer to control this delicate part of the apparatus. Likewise, placing the detector and at least part of the electronic circuitry on the same PCB also aids the apparatus's ability to handle electrical interference. A better signal to noise ratio might also aid the apparatus ability to distinguish between radiation originating from different Radon progeny, as noise can smear out the detected energy spectrum from a given decay.

In one embodiment, the apparatus comprises one or more ferrite bead(s) in a signal pathway between an analog signal from the semiconductor detector and the electronic circuitry that interprets said analog signal.

This is advantageous, as the electrical interference is generally high frequency noise compared to the frequency of the signal caused by detecting radiation. A ferrite bead is a low pass filter with little resistance to DC. Hence, it will allow the radiation signal to pass, while attenuating most electronic interference.

In one embodiment, the apparatus comprises an amplifying circuit connected to a semiconductor detector, where said amplifying circuit has an error due to the amplifier limitation that is below either 50% or 10% at a maximum amplifying frequency and in a 3 dB proximity hereto.

This is advantageous, as the amplified signal will otherwise reflect the amplifiers limitations, which can vary with temperature. This will in turn make it difficult to spectrally resolve the radiation. The potential issue is also apparent for an apparatus without spectral resolution capabilities, as such an apparatus needs to distinguish between the natural occurring signal fluctuations and a signal caused by detecting radiation, which is more challenging if the amplifiers limitations affect the amplified radiation signal.

In one embodiment, the apparatus comprises or is connectable to electronic means configured to determine a geographical position.

In one embodiment, the apparatus comprises or is connectable to electronic means configured to determine and store time.

This is advantageous, as the geographical position and/or the time will aid the user in recalling in which dwelling the determination of the Radon concentration was performed. Moreover, the data can aid the professional user with the rapport that the costumer receives. Here, the measurement position may be determined as a geolocation, e.g. GPS coordinates, street address and/or location within a building or otherwise.

In accordance with a second aspect of the present disclosure and analogous to the apparatus described above, a method is provided for measuring decay(s) from Radons progeny, comprising using an apparatus as described, in a place where air movement is unlikely due to limited ventilation.

This is advantageous, as the owner of the dwelling might have ventilated it before a prospective buyer measures the Radon concentration. As the diffusion time is long for Radon, places that are purely ventilated will most likely still represent the unventilated Radon concentration.

BRIEF DESCRIPTION OF THE FIGURES

The foregoing summary, as well as the following detailed description, will be better understood when read in conjunction with the appended drawings. For the purpose of illustration, there are shown in the drawings embodiments which are presently preferred. It should be understood, however, that the claimed invention is not limited to the precise arrangements and instrumentalities shown.

The present embodiments will become more fully understood from the detailed description given herein below and the accompanying drawings, which are given by way of illustration only, and thus, they are not limitative of the claimed invention, and wherein:

DETAILED DESCRIPTION

Figure 1:
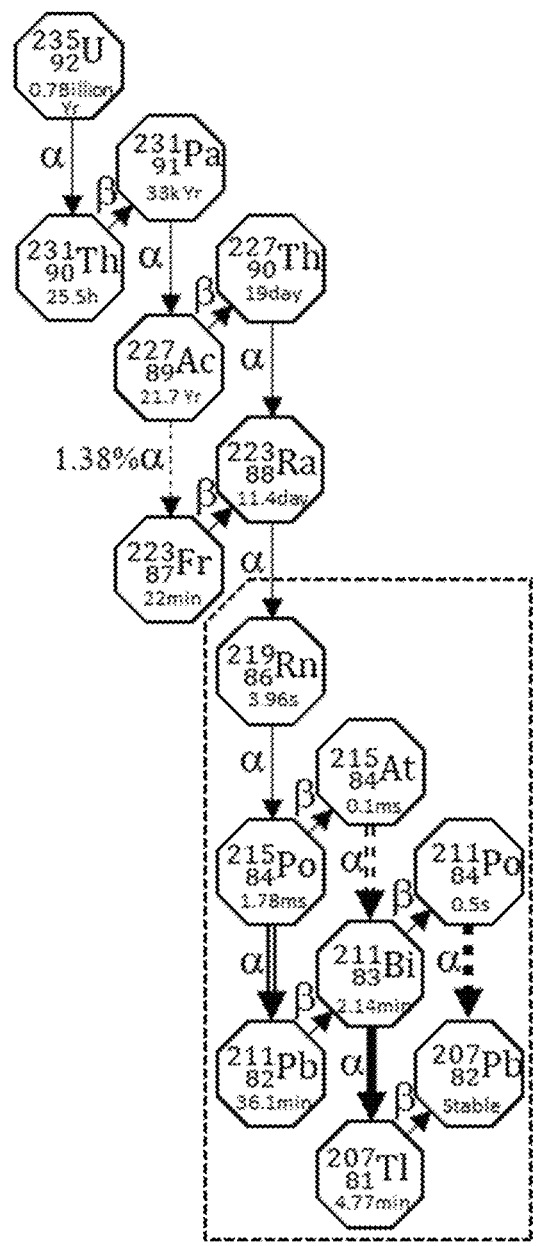
FIG. 1 shows the decay chain from Uranium-235 to Radon-219 and the Radon progeny.

Various embodiments are described hereinafter with reference to the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.
Technical Generalities about Radon There are a limited number of radioactive sources originating from the earth. In reality, there are only 4 elements that are present in more than trace amount, Uranium, Thorium, Potassium and Bismuth, as they have a half-life similar to the earth age. Uranium has two isotopes with a long half-life, Uranium-235 and Uranium-238, Thorium has one, Thorium-232, while the radioactive long-lived isotopes of Potassium and Bismuth are Potassium-40 and Bismuth-209.

The potential health risk from these elements arises, when the radioactive elements that emits radiation are inhaled. Here, Potassium-40 can be disregarded, as it decays to the stable isotope Calcium-40 through a beta emitting decay. Bismuth-209 can also be disregarded, as it makes an alpha decay to Thallium-205, which is stable. The decay chains of Uranium-238, Uranium-235 and Thorium-232 all contains Radon isotopes, respectively Radon-222, Radon-219 and Radon-220 (the latter is historically called Thoron).

In this document, Radon is defined as Radon-219 and/or Radon-220 and/or Radon-222, both when referring to the substance and furthermore when referring to the concentration of the substance. The same use of Radon is employed when referring to Radon's decay daughters, which is also referred to as Radon progeny.

To understand the focus on Radon, one must consider how people generally get exposed to radiation. The clay in the underground contains an elevated level of the heavy elements, including Uranium and Thorium. When they decay, radiation is emitted. But all the real hazardous radiation has a short penetration depth and is hence absorbed in the adjacent soil. E.g. even a piece of paper can absorb the alpha radiation emitted by Radon. Hence, even though clay is radioactive, the material itself shields against the dangerous radiation.

When the decay chain reaches Radon, another effect must be considered. Radon is a noble gas and will therefore not bind chemically to the surrounding soil. Radon diffuses out of the clay and into the surrounding soil. From here it can diffuse into buildings and people can inhale either Radon or its decay progeny.

Radon's decay progeny is normally electrically charged and will hence bind to dust or smoke particles in the air. When a human inhales particles containing Radon daughters, these particles will tend to stick to the lungs. Afterward, the Radon daughters can decay, and the radiation will cause an increased risk for lung cancer.

It takes time for the Radon to diffuse from the clay into the building and a larger fraction of the Radon will therefore decay before reaching the dwelling. Hence the lifetime of the Radon isotope will greatly affect the concentration inside the building. The lifetime of the Radon isotopes and other relevant data can be found at the International Atomic Energy Agency's homepage (https://www-nds.iaea.org/):

The decay chain for Radon-219 is:
Radon-219, 100% decay to Polonium-215, half-life 3.96 s, radiation; Alpha 6.75 MeV
Polonium-215, almost 100% decay to Lead-211, half-life 1.78 ms, radiation; Alpha 7.39 MeV
Polonium-215, 2.3E-4% decay to Astatine-215, half-life 1.78 ms, radiation; Beta
Lead-211, 100% decay to Bismuth-211, half-life 36.1 min, radiation; Beta
Astatine-215, 100% decay to Bismuth-211, half-life 0.1 ms, radiation; Alpha 8.03 MeV
Bismuth-211, 99.7% decay to Thallium-207, half-life 2.14 min, radiation; Alpha 6.55 MeV
Bismuth-211, 0.3% decay to Polonium-211, half-life 2.14 min, radiation; Beta Thallium-207, 100% decay to Lead-207, half-life 4.77 min, radiation; Beta
Polonium-211, 100% decay to Lead-207, half-life 0.516 s, radiation; Alpha 7.44 MeV
Lead-207 is stable
The decay chain for Radon-220 (Thoron) is:
Radon-220, 100% decay to Polonium-216, half-life 55.6 s, radiation; Alpha 6.29 MeV
Polonium-216, 100% decay to Lead-212, half-life 145 ms, radiation; Alpha 6.78 MeV
Lead-212, 100% decay to Bismuth-212, half-life 10.6 h, radiation; Beta
Bismuth-212, 64.1% decay to Polonium-212, half-life 60.6 min, radiation; Beta
Bismuth-212, 35.9% decay to Thallium-208, half-life 60.6 min, radiation; Alpha 2.18 MeV
Polonium-212, 100% decay to Lead-208, half-life 294 ns, radiation; Alpha 8.78 MeV
Thallium-208, 100% decay to Lead-208, half-life 3.05 min, radiation; Beta
Lead-208 is stable
The decay chain for Radon-222 is:
Radon-222, 100% decay to Polonium-218, half-life 3.82 days, radiation; Alpha 5.49 MeV
Polonium-218, almost 100% decay to Lead-214, half-life 3.10 min, radiation; Alpha 6.00 MeV
Polonium-218, 0.02% decay to Astatine-218, half-life 3.10 min, radiation; Beta
Lead-214, 100% decay to Bismuth-214, half-life 27.1 min, radiation; Beta
Astatine-218, almost 100% decay to Bismuth-214, half-life 1.28 s, radiation; Alpha 6.69 MeV
Bismuth-214, almost 100% decay to Polonium-214, half-life 19.7 min, radiation; Beta
Bismuth-214, 0.02% decay to Thallium-210, half-life 19.7 min, radiation; Alpha 5.45 MeV
Polonium-214, 100% decay to Lead-210, half-life 163 us, radiation; Alpha 7.69 MeV
Thallium-210, 100% decay to Lead-210, half-life 1.3 min, radiation; Beta
Lead-210, almost 100% decay to Bismuth-210, half-life 22.2 years, radiation; Beta
Lead-210, 1.9E-6% decay to Mercury-206, half-life 22.2 years, radiation; Alpha 3.72 MeV
Bismuth-210, almost 100% decay to Polonium-210, half-life 5.01 days, radiation; Beta
Bismuth-210, 1.3E-4% decay to Thallium-206, half-life 5.01 days, radiation; Alpha 4.66 MeV
Mercury-206, 100% decay to Thallium-206, half-life 8.32 min, radiation; Beta
Polonium-210, 100% decay to Lead-206, half-life 138 days, radiation; Alpha 5.30 MeV
Thallium-206, 100% decay to Lead-206, half-life 4.20 min, radiation; Beta
Lead-206 is stable As the half-life of Radon-222 originating from Uranium-238 is significantly longer than the half-life of both Radon-219 and Radon-220, Radon-222 is expected to pose the greatest health risk and indeed according to ISO 11665: 2015, it is responsible for 48% of the overall radiological impact, where Radon-220 only accounts for 4% and the impact from Radon-219 is neglectable.

It should be noted that the Radon found indoor might also originate from the building materials themselves and hence it can be important to measure the Radon-220 concentration.

Figure 2:
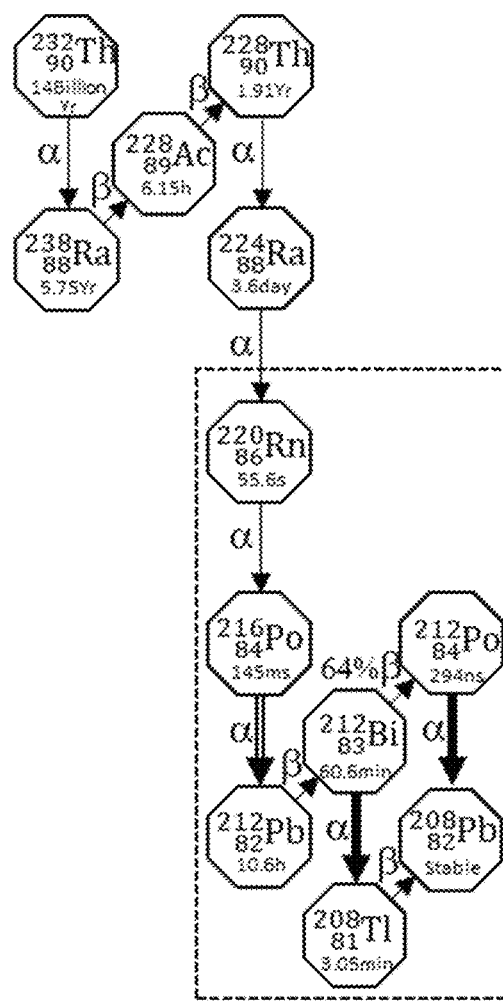
FIG. 2 shows the decay chain from Thorium-232 to Radon-220 and the Radon progeny.
Figure 3:
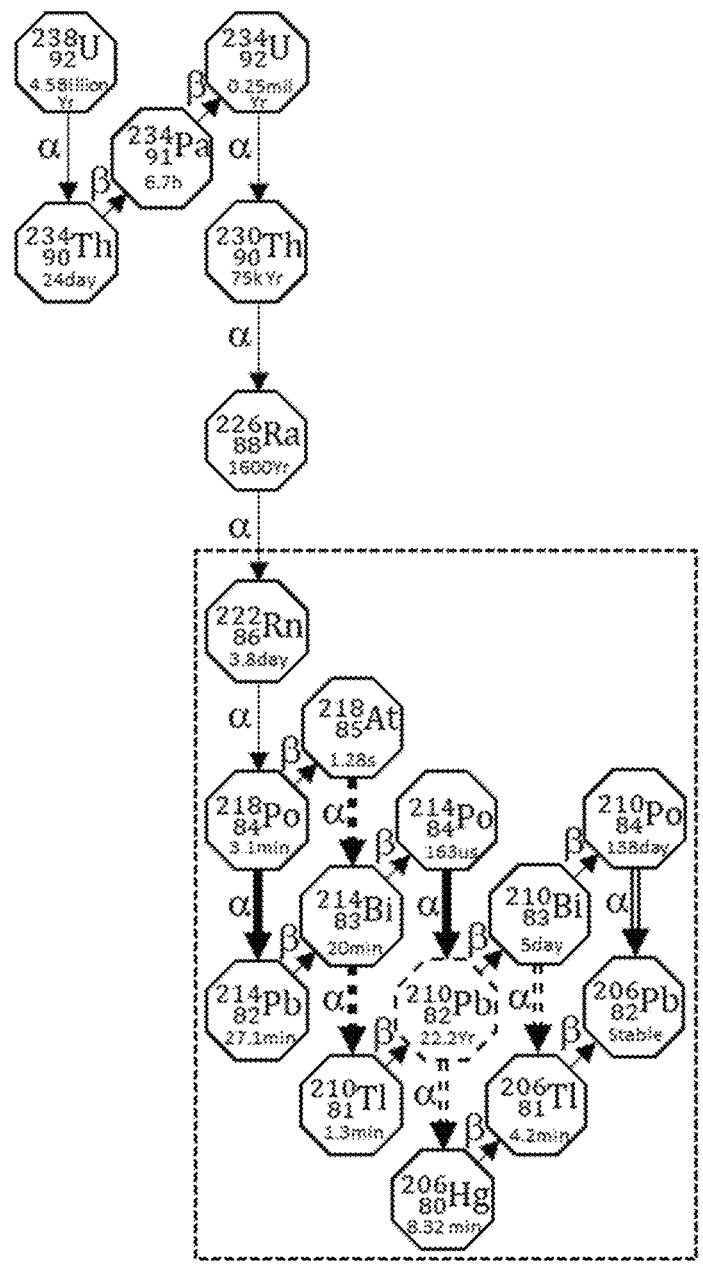
FIG. 3 shows the decay chain from Uranium-238 to Radon-222 and the Radon progeny.

The three decay chains (including the parent Uranium or Thorium) are illustrated in FIG. 1, FIG. 2 and FIG. 3.

FIG. 1 shows the decay chain of Uranium-235, where the tail from Radon-219 is surrounded by a stippled box, as these isotopes will be present in the atmosphere due to diffusion of Radon-219. For simplicity, decays with less than 0.006% probability before reaching Radon-219 have been omitted from the decay chain. Notice that Actium-227 most likely makes a beta decay (98.62% probability) but it can also make an alpha decay (1.38% probability). The latter decay is marked with a stippled line due to the relative low probability for this decay. The Polonium-215 alpha decay is marked with a double line arrow. This is because Polonium-215 is present in the dwelling atmosphere, but due to the short half-life, only in limited amounts. The probability of the beta decay to Astatine-215 is only 2.3e-4%. As it is an improbable pathway that leads to the Astatine-215 and as the half-life of Astatine-215 is short (0.1 ms) and as its parent isotopes also decays fast, the amount of Astatine in the dwelling atmosphere is limited. The Astatine-215 decay is therefore indicated with a double (only present in limited amount due to half-lives), stippled (low probability of decay path) arrow. The alpha decay of Bismuth-211 is marked with a pronounced arrow, as this is the dominant decay product present in the dwelling atmosphere. Bismuth-211 can also beta decay (0.28% probability) to Polonium-211, which then in turn alpha decays (7.44 MeV, marked with a stippled arrow due to the low probability of the decay path) to Lead-207.

FIG. 2 shows the decay chain of Thorium-232, the tail from Radon-220 is surrounded by a stippled box, as these isotopes will be present in the atmosphere due to diffusion of Radon-220. The decay of Bismuth-212 and Polonium-212 are illustrated with thick arrows, as these are the dominant alpha decays in the dwelling atmosphere. The Polonium-216 alpha decay and is marked with a double line arrow. This is because Polonium-216 is present in the dwelling atmosphere, but due to the short half-life, only in limited quantities.

FIG. 3 shows the decay chain of Uranium-238, the tail from Radon-222 is surrounded by a stippled box, as these isotopes will be present in the atmosphere due to diffusion of Radon-222. The decay of Polonium-218 and Polonium-214 are illustrated with thick arrows, as these are the dominant alpha decays in the dwelling atmosphere, as described below. Bismuth-214 can make an alpha decay (5.45 MeV, probability 0.021%), which is indicated with a stippled arrow due to the low probability of the decay. Lead-210 is shown with a stippled edge, as the half-life of this isotope is relative long compared to dusts lifetime in a dwelling. The alpha decay of Polonium-210 is therefore marked with a double line arrow, as it is expected to be present in much lower concentrations than its parents in the dwelling atmosphere, as ventilation, vacuuming or dust settling will reduce the Lead-210 (and hence its daughters) concentration considerably. Lead-210 can also alpha decay to Mercury-206 (1.9e-6% probability) and Bismuth-210 can alpha decay to Thallium-206 (1.32e-4%). Both these decays are marked with a double (only present in limited amount due to half-lives), stippled (low probability of decay path) arrow.

Figure 4:
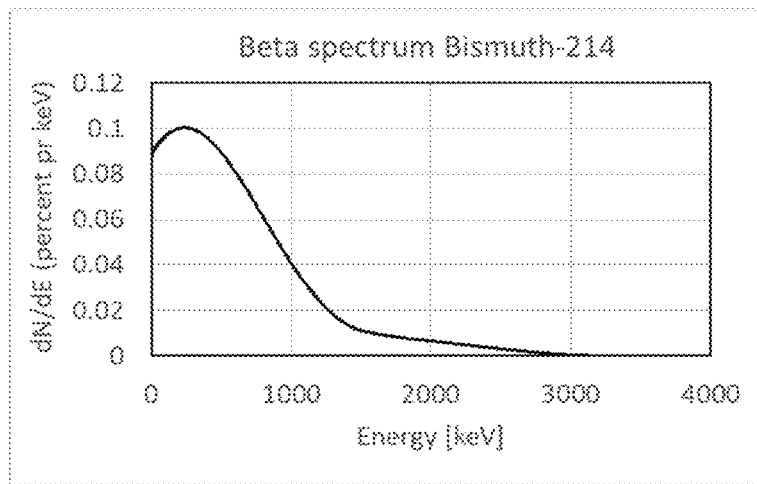
FIG. 4 shows the beta decay spectrum for Bismuth-214 using linear scales.

In the above description of the decay chains, focus has been on decays that emit alpha particles. This is because, from a measurement viewpoint, such particles are easier to detect. An alpha particle is stopped much faster than for example a beta particle or gamma radiation and hence, the detecting layer can be significantly thinner for an alpha detector. Moreover, alpha radiation is emitted with a specific energy, while for example beta radiation is emitted with a spectral distribution of energies. An example of such a distribution is included in FIG. 4 for the beta decay of Bismuth-214. Hence, if an apparatus needs to distinguish between the radiation sources, this is much easier for alpha than for beta radiation. Moreover, the short range of alpha radiation also aids an apparatus. This is because is it relatively easy to construct a detection system, which shields the detector from outside alpha radiation. An apparatus that detects gamma radiation might, on the other hand, be influenced by radiation from other sources than Radon in the dwelling, including the decays in the clay layers in the subsoil.

In the Danish authorizing note "SBI anvisning 270, 1$^{st}$ edition, Feb. 6, 2018, ISBN 978-87-563-1866-2, page 15", the Radon concentration is defined as the Radon-222 concentration. This means that legal regulations in the Danish Building Regulations 2018, § 332, (current legislation as of 25 Nov. 2024), which states that the Radon level, estimated as an annual mean value, should not exceed 100 Bq/m$^3$, refers to the concentration of Radon-222. Hence, it is beneficial if a Radon apparatus can distinguish the radiation from Radon-222 and its decay chain from the Radiation from other Radon isotopes and their progeny.

As described later, one method for determining the Radon concentration is to flow air though a filter element and then collect the Radon daughters. To understand the requirement needed to distinguish between radiation originating from the three Radon isotopes, the energy levels are plotted in FIG. 5. Here, the Radon decays themselves are omitted, as the noble gas Radon is not likely to be caught in a filter, as it does not bind to dust or otherwise. The decays are either labelled fast, slow, limited detection (LD) or unlikely (UL). The latter are plotted closer to the x-axis to aid in the discrimination between the decay types.

An unlikely decay (UL), is a decay, where the probability of the decay path is less than around 0.3%. That is Polonium-215 to Astatine-215 (2.3E-4%), Bismuth-211 to Polonium-211 (0.3%), Bismuth-214 to Thallium-210 (0.02%), Lead-210 to Mercury-206 (1.9E-6%), Bismuth-210 to Thallium-206 (1.3E-4%) and the decay paths originating from one of these unlikely decays. Due to the low probability of these paths, they have not been included in the simulation of the decays described below.

A limited detection (LD) decay, is one that is not expected to generate a large measurable signal. Here, isotopes with an effective half-life of less than 1 second are classified as LD. Effective half-life means the half-life of radiation from the filter, when the air movement is turned off. To understand why this is a practical classification, consider Radon-219. When air containing Radon-219 and its decay daughters is passed through a filter, then the noble gas Radon-219 is expected to pass right though. The first decay daughter, Polonium-215, is on the other hand expected to be caught at least partial by the filter. However, it is only the Polonium-215 that is generated within the last couple of half-live that is present in the air (the other Polonium-215 have already decayed). Hence due to the short effective life-time of Polunium-215, which is equal to its actual half-life of 1.78 ms, the measured radiation from this isotope will be minimal. The Radon-222 progeny Polonium-214 is on the other hand an example of an isotope with a longer effective radiation half-life than the isotopes actual half-life of 163 us. This is because while Polonium-214 decays, it is also being generated by the decay of Polonium-218, Lead-214 and Bismuth-214. Hence, the radiation from the Polonium-214 decay will have an approximate apparent half-life of 37 min, as Polonium-214 is continuously being generated from its parents caught at the filter.

Notice that the 1 second discriminator between LD and non-LD radiation is somewhat arbitrary. This is because Polonium-216 is the slowest decaying product classified as LD, so a limit just above 145 ms would still classify Polonium-216 as LD. On the other hand, the fastest non-LD decay is Polonium-218 with a half-life of 3.10 min. Hence, any discriminator between 145 ms and 3.10 min will yield the same classification.

Figure 6:
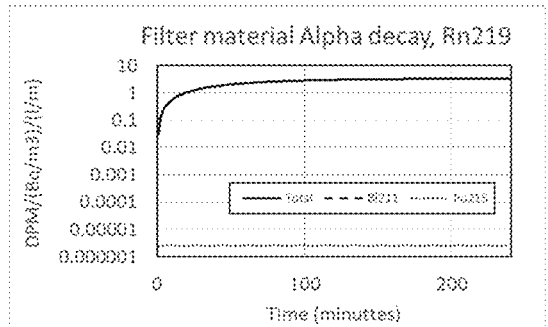
FIG. 6 shows the simulated decay from a filter due to Radon-219 progeny, collected over time, using logarithmic scale for the y-axis and linear scale for the x-axis.
Figure 7:
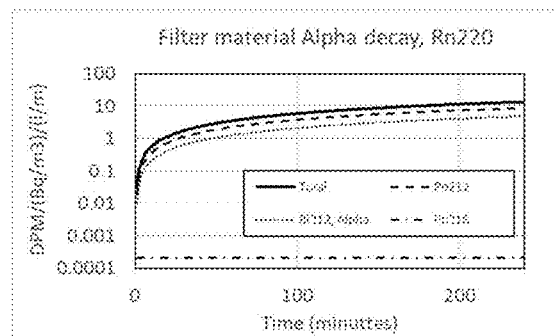
FIG. 7 shows the simulated decay from a filter due to Radon-220 progeny, collected over time, using logarithmic scale for the y-axis and linear scale for the x-axis.
Figure 8:
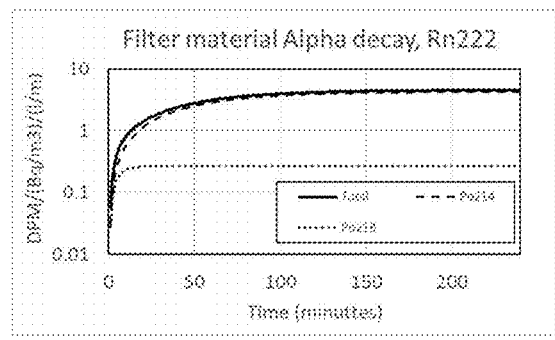
FIG. 8 shows the simulated decay from a filter due to Radon-222 progeny, collected over time, using logarithmic scale for the y-axis and linear scale for the x-axis.

To illustrate why it is convenient to classify Polonium-215 and Polonium-216 as LD, the radiation from Radon daughters for each Radon isotope (219, 220 and 222) have been plotted in FIG. 6, FIG. 7 and FIG. 8. The y-axis is decay pr minute (DPM) pr Radon activity (Bq/m3) pr airflow through the filter material measured as litres of air pr minute (l/m). The curves have been determined using finite time step simulation. It is here assumed that Radon and its daughters are in equilibrium, meaning that one decay pr second for Radon results in one decay pr second for each daughter. The exception from this is the Radon-220 progeny Bismuth-212, as the decay of Bismuth-212 can take 2 paths. Here the daughter concentration in air is found by multiplying with the decay path probability.

Notice that in FIG. 6, the graph for the total alpha radiation and the graph for Bismuth-211 radiation are indistinguishable, as the contribution from Polonium-215 is neglectable.

In FIG. 6, FIG. 7 and FIG. 8 it is moreover assumed that the decay daughter stays on the filter material after the parent decays. At time=0, the filter material is assumed to contain no radioactive particles. Hereafter, a device moves air through the filter at a constant pace. The air is assumed to contain a concentration of Radon progeny, which is in equilibrium with the amount of Radon in the air. The only exception to this is for Radon-222, where the decay of Lead-210 and its daughters have been omitted from the plot. This is because of the relative long lifetime of Lead-210. If the dwelling is either cleaned by a vacuum cleaner or if the air is ventilated to the outside, or if the dust particles settle during the 22.2 year half-life of Lead-210, the result is that Lead-210 and its daughters are not present in the air in a significant concentration.

One decay is particularly difficult to simulate, as a good simulation requires multiple timesteps within a half-life. Polonium-212 has by far the shortest half-life of only 299 ns. To avoid resolving this decay, it has been assumed that Polonium-212 is generated solely by Bismuth-212 decays and that all Polonium-212 decays within one timestep. This approximation ignores the Polonium-212 present in the air, and hence underestimates the Polonium-212 radiation slightly.

Figure 5:
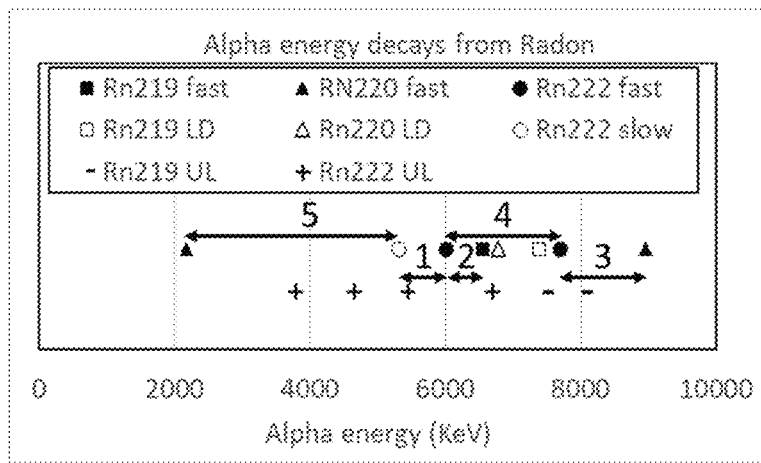
FIG. 5 shows the alpha decay energies for Radon's progeny using linear scale.

As seen in FIG. 6 and FIG. 7, the two decays (Rn219 fast, which is another name for the Polonium-215 decay and Rn220 fast, which is another name for the Polonium-216 decay) marked as LD in FIG. 5, have a neglectable count rate compared to the other decays.

A fast decay, means a decay, which has a controlling half-life that is less than a day, while not being a limited detection (LD) decay.

A slow decay, is a decay with a half-life of more than 1 day, or where the decay parent has a slow decay. Notice that the 1-day limit is somewhat arbitrary. The slow decay classification only includes Lead-210 and its daughters and hence any discriminator between 10.6 hours and 22.2 years would give the same classification.

The slow decay radiation is included in FIG. 5, as these isotopes can build-up on the filter material during a measurement and then possible affect consecutive measurements.

As illustrated in FIG. 5, it is advantageous if an apparatus that focuses on determining the Radon-222 concentration uses both fast Radon-222 decays, is able to distinguish between the 6.00 MeV Polonium-218 decay and the 5.30 MeV Polonium-210 decay (the energy difference is illustrated with the arrow 1 in FIG. 5), as the latter originates from Lead-210, which can build-up on the filter material.

Moreover, it would also be advantageous, if a Radon-222 apparatus can distinguish between the 6.00 MeV Polonium-218 decay and the 6.55 MeV Bismuth-211 decay (the energy difference is illustrated with the arrow 2 in FIG. 5), as the parent Radon isotopes are Radon-222 and Radon-219, respectively.

To enable a Radon-222 apparatus to distinguish between Radon-222 and Radon-220, it is advantageous if it is also be capable of resolving between the 7.69 MeV Polonium-214 decay and the 8.78 MeV Polonium-212 decay (the energy difference is illustrated with the arrow 3 in FIG. 5).

A Radon-222 apparatus, that only uses the 7.69 MeV Polonium-214 decay, might only have to be capable of distinguishing between the 7.69 MeV Polonium-214 decay and the 6.00 MeV Polonium-218 decay (the energy difference is illustrated with the arrow 4 in FIG. 5). This is because, it can normally be assumed that the dominating radiation is caused by Radon-222's decay daughters. As it is normally needed to ensure that the measurement is not affected by the slow decay of Lead-210 that results in 5.30 MeV alpha radiation from the Polonium-210 daughter, it can be chosen to only include the 7.69 MeV Polonium-214 decay(s) to allow for a limited spectral radiation resolution.

If a Radon-220 apparatus only uses the 2.18 MeV Bismuth-212 decay, then it is advantageous if the apparatus can distinguish between the 2.18 MeV Bismuth-212 decay and the 5.30 MeV Polonium-210 decay (the energy difference is illustrated with the arrow 5 in FIG. 5).

A Radon apparatus can of course determine either a single Radon isotope concentration and/or multiple independent concentrations simultaneously and/or the collective concentration of multiple Radon isotopes.

To determine multiple concentrations, the apparatus may still have to distinguish between the individual Radon isotopes, as the decay pr minute in FIG. 6, FIG. 7 and FIG. 8 is different for the individual decay chains. As an example, the radiation from 1 Bq/m3 using an air moving rate of 1 l/m for 240 minutes results in around 13.4 decays pr minute for Radon-220 compared to around 4.82 decays pr minute for Radon-222. Hence, to determine the concentration from the decay rate, the decay isotope should be known and hence the decay energy should be resolved enough to distinguish between the different possible sources.

Measurement Aspects:

To understand the requirements for a Radon apparatus targeting the real estate buyer or other fields of use, it is useful to review the recommended exposure levels and the normal measurement accuracy. The European Union recommends a level of 100 Bq/m3 and states that a member state has to explain if a limit above 300 Bq/m3 is implemented, according to European COUNCIL DIRECTIVE 2013/59/ EURATOM of 5 Dec. 2013, L 13/3 (22) and L 13/3 (24). Here, Bq is the activity of Radon-222 (decays/second) according to European COUNCIL DIRECTIVE 2013/59/ EURATOM of 5 Dec. 2013, L 13/7 (8) and L 13/11 (82).

In the USA, it is recommended to take action if the Radon level exceeds 4 pCi/l (https://www.epa.gov/radon/what-epas-action-level-radon-and-what-does-it-mean), according to EPA, the United States environmental protection agency. Here, 1 pCi/l corresponds to 37 Bq/m3 according to WHO air quality guidelines for Europe, $2^{nd}$ edition, 2000 (CD ROM version), chapter 8.3, page 2.

In Denmark, SBI anvisning 270, $1^{st}$ edition, Feb. 6, 2018, ISBN 978-87-563-1866-2, page 40, states that the reference measurement is a closed trace film, which is expected to have a standard deviation of 5% (same reference, page 36).

The accuracy is generally limited by the apparatus's sensitivity and the measurement time. This is because the number of events approximately follows a Poisson distribution and the uncertainty solely due to the limited number of radiation events encountered (N) is N^0.5. Hence to obtain 10% uncertainty (1-sigma), 100 radiation events must be registered.

For many existing smaller handheld diffusion-based apparatuses, the sensitivity is around 0.1 to 3 CPH at a Radon concentration of 100 Bq/m3. Hence for these apparatuses, the hours it will take to achieve a 10% uncertainty (1-sigma) for a 100 Bq/m3 Radon concentration is "100/X hours", where X is the apparatuses sensitivity (CPH) at 100 Bq/m3. For the mentioned apparatuses, it therefore takes between 33.3 and 1000 hours to reach a 10% uncertainty (1-sigma).

Figure 9:
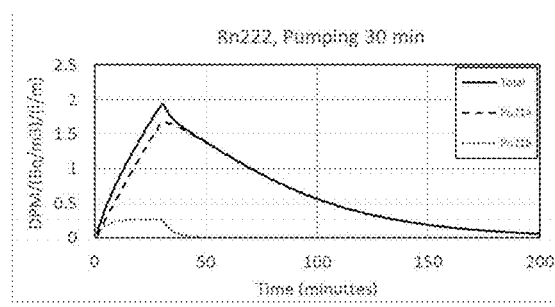
FIG. 9 shows the simulated decay from a filter due to Radon-222 progeny, collected by moving air for 30 min, using linear scale.

For a home buyer it is customary to inspect real estate for around ½ hour with the real estate agent. Hence, it is advantageous if a Radon apparatus can determine the Radon concentration both fast and accurate. E.g. if 10% 1-sigma accuracy for a 100 Bq/m3 Radon concentration is obtained by having the apparatus reside in the real estate for around 30 min. One way of obtaining a short residence time in the real estate, is to enable the air moving device and to collect the Radon daughters by filtration or other means. After collecting the Radon progeny, the apparatus can measure on the decay tail, even after leaving the real estate, hence increasing the accuracy of the measurement considerably compared with the measurement based solely on the count obtained while the air moving device was enabled. The decay pr minute for such a measurement is illustrated in FIG. 9 for Radon-222 progeny. Notice that the decay pr minute builds up until the air moving device is turned off and then decreases due to the decay of the Radon-222 daughters.

The measurement uncertainty will contain multiple sources. As said, the limited count rate can in some cases be the most significant single uncertainty contribution, especially at low Radon concentrations. But other factors contribute to the measurement uncertainty. This includes the accuracy of the flow rate determination for an apparatus that moves air through a filtering element. Moreover, ISO 11665-1:2015, paragraph 6.4.3 states that the air volume should be corrected to a standard atmosphere of 1013 hPa and 0 Celsius. To make this correction, both the ambient temperature and pressure should be determined. This conversion can be based on measured or assumed values for temperature and pressure and hence the conversion increases the total uncertainty. Determination of the Radon concentration also requires determination of the radiation detector's efficiency, which can be affected if dust build-up on the filter.

Various embodiments obtain good accurate measurements in a short timeframe by moving air through a filtering element, which collects at least part of the Radon progeny from the air. When the progeny decays, it emits radiation, which is detected by a nearby semiconductor detector.

Various aspects and embodiments are described by considering the air's pathway through an embodiment of the apparatus first. Hereafter, an example of the electrical detection system is described. This is followed by a description of an example of the detection vs time; finally different methods for measuring Radon are described.

Notice that the apparatus might combine several measurements when it might determine the equivalent equilibrium Radon concentration and/or the determination of the Radon concentration in the air. For clarity, the phrase Radon measurement is used for the determination of the equivalent equilibrium Radon concentration and/or the estimation or determination of the Radon concentration in the air. Moreover, sense is used to describe a measurement that establishes the airflow rate and/or the air volume moving through the filter during a Radon measurement.

Various embodiments of the apparatus moves air though a filter element to collect the Radon daughters in the air. Besides the filter element and the air moving device, the apparatus can also comprise a pathway to establish the airflow.

The order of the elements in the airpath can be permutated in any order.

It can be advantageous if the elements before the filter material are mainly made from electrically non-conduction material, as it is expected that the Radon progeny to a certain degree are present at charged dust particles. These particles might glue to a conducting surface due to electrostatic attraction. Moreover, if an electret filter material is employed, then it is advantageous if the charged dust particle remains charged. As discharging is possible when contacting an electric conductor, it can be advantageous if the elements in the airflow pathway before the filter material are made, at least partially, from isolating materials.

As water droplets in air are much denser than air (about 1000 times denser), alpha radiation emitted from Radon's progeny on the filter material can get at least partially absorbed if droplets are present between the filter and the detector. Here, it can be advantageous, if elements in the airflow pathway lowers the pressure below the ambient pressure before the air enters the filter material. This is because the relative humidity decreases, when the pressure is lowered.

In one embodiment, the air passes into the apparatus via an inlet choke and is then guided through a hose or a tube, hereafter referred to as a tube. Thereafter it passes through the filtering element, before entering the air moving device. After exiting the air moving device, the air can pass through the interior of the apparatus before it exits the apparatus. The path from the air moving devices exhaust to the apparatus exit can either be guided through a tube, or it can pass unguided through the interior of the apparatus. This is illustrated in FIG. 10, which illustrates the entire apparatus and FIG. 11 that illustrates the components in the air's pathway inside the apparatus.

Figure 10:
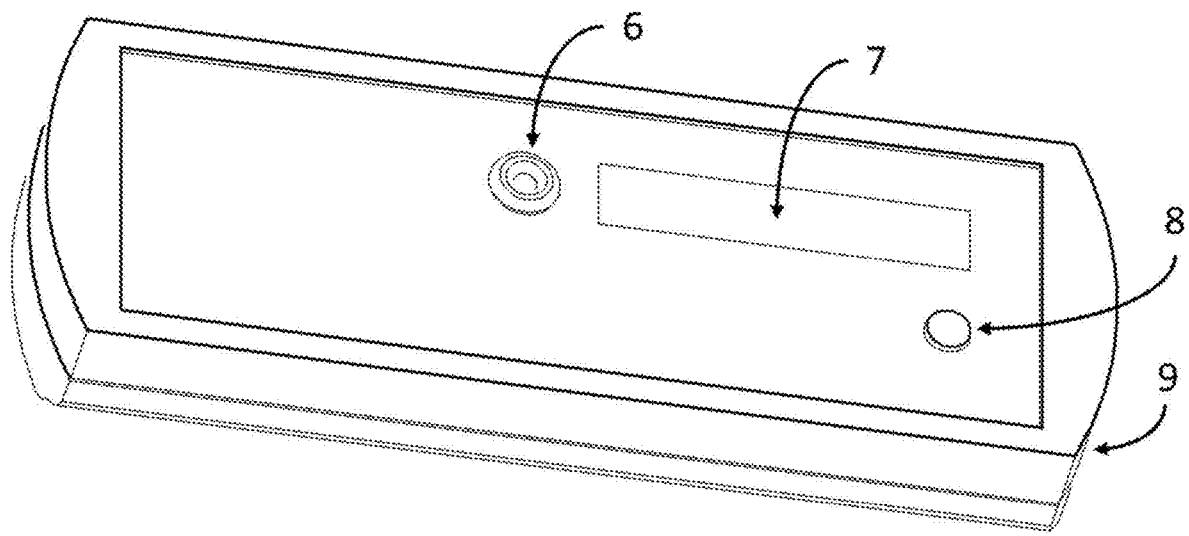
FIG. 10 illustrates a possible embodiment.

In FIG. 10, (6) is the air inlet and choke, (7) is the display, (8) is the button for controlling the apparatus and (9) is the enclosure.

Figure 11:
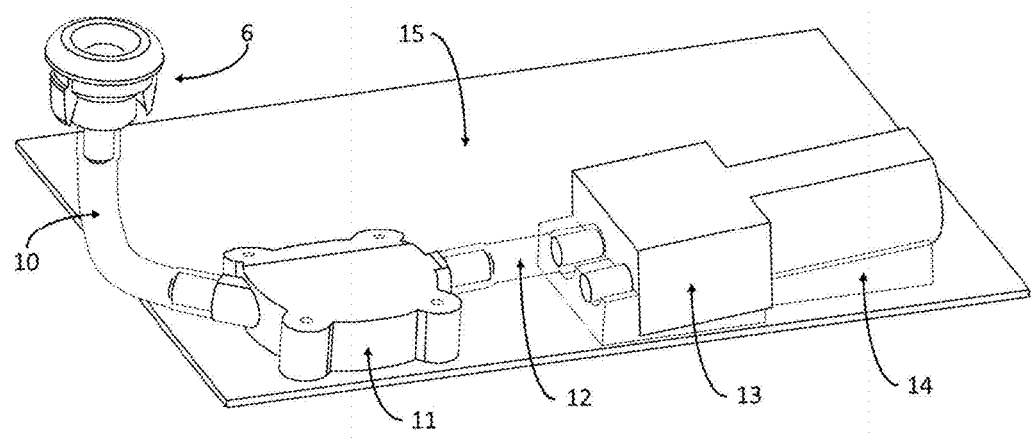
FIG. 11 illustrates the components in the air's pathway for a possible embodiment.

In FIG. 11, (6) is the air inlet and choke, (10) is a tube that guides the air into the filter holder (11), (12) is a tube that connects the filter holder and the vacuum pump (13). The pump is placed on a pump holder (14), which both ensures that the tube (12) is relatively straight and also possibly provides means for sound dampening of the pump. (15) is the PCB board. The tubes are illustrated as transparent, as this allows illustrating the tube clutches or tube studs present on the air connections on the filter holder and on the pump.

One advantage of guiding the air through a channel from the intake to the filtering element, is that the dead volume is minimized. Here, the dead volume is defined as the air contained in the apparatus, which has to be displaced before the apparatus starts measuring on air originating from the dwelling.

One advantage of placing the filtering element before the air moving device, is that the Radon progeny in the air is not partially absorbed by the air moving device before entering the filter element.

On the other hand, it can also be advantageous to place the filtering element after the air moving device. This is because of the possible flow resistance in the filtering element. When sucking air through a filtering element, it is not possible to obtain more than vacuum on the low-pressure side. I.e., the pressure drop over the filter is limited to the ambient pressure. If the air moving device is placed before the filter, it might be possible to obtain a larger pressure difference over the filter.

The airflow can be either assumed or sensed (measured). As the aim for a Radon apparatus is to determine the Radon concentration, the airflow can be part of an overall conversion of the radiation count(s) and/or count rate to Radon concentration. Here, the apparatus manufacturer can calibrate each apparatus individually, or assume that the apparatus responds is similar for similar apparatuses. The same approach can be employed for the air moving devices capability to move air.

The sensing of the airflow can be performed either with one or more dedicated sensor(s) used to examine the airflow directly, or through monitoring the air moving device either direct or indirect. Here, a direct way to monitor the air moving device can be to sense its revolutions.

The airflow can also be established with a dedicated sensor like an impeller, a thermal mass flow sensor and/or a hot wire anemometer.

In another case, the airflow is sensed by letting the air pass through a choke and/or orifice, hereafter referred to as choke. The choke can be placed both before or after the air passes though the filter. In both cases, the choke will induce a pressure drop that increases with the airflow rate. Said pressure drop can be sensed by a differential pressure sensor, or, by measuring two absolute pressures. The latter can of course be achieved using two individual sensors, but also with a single sensor. Applying a single sensor to establish the airflow is for example possible, if the air moving device is controlled. As an example, consider that the air moving device is first turned off, and at this point the absolute pressure sensor establishes the ambient pressure. Then, the air moving device is turned on, and another pressure is established. Together these two pressures can be used to establish the pressure drop over the choke, which in turn is caused by the flow rate. Notice that sensing the ambient pressure can be done one or more times. If sensed multiple times, it becomes possible to correct for a possible variation in ambient pressure.

Figure 12:
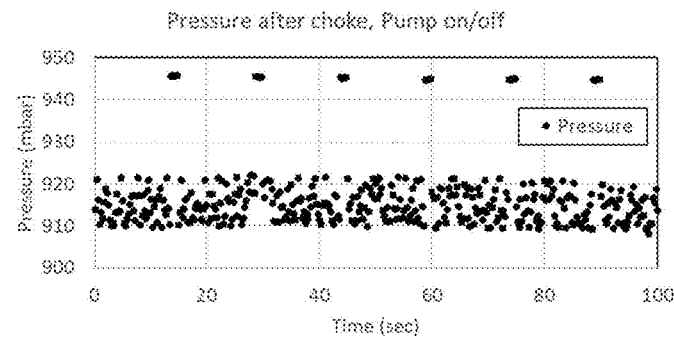
FIG. 12 shows an example of the measured pressure when the air moving device is turned on and off to allow determination of the flow rate, using linear scale.

In FIG. 12 an example of sensing the air pressure consecutively is illustrated. Here the pressure is around 945 mbar when the air moving device is off, while the pressure is between 910 and 920 mbar when the air moving device is running. In the present example, the air moving device is turned off for 2.5 seconds for every 15 second cycle.

When determining the Radon concentration, it is advantageous when the air moving device is enabled most of the time, as the objective is to get enough Radon progeny caught in the filter material to allow for accurately determining the Radon concentration. On the other hand, when the air moving device is turned off, the pressure must first increase and stabilise to allow for an accurate establishment of the ambient pressure. Moreover, when the air moving device is off, the apparatus can sense the pressure multiple times to increase the accuracy. The shorter the time is between sensing the ambient pressure, the easier it is to correct for ambient condition changes.

As an example, the cycle time could be 10 seconds, 30 second, 1 minute, 5 minutes, 10 minutes, 15 minutes, 30 minutes, 60 minutes, 120 minutes, a similar interval, or any combination hereof. The air moving device's off time, can be 100 ms, 200 ms, 500 ms, 1 second, 2 seconds, 5 second, 10 second, 30 seconds, 1 minutes, a similar interval, or any combination hereof. The air moving devices off time should be shorter than the cycle time, as the air moving device would otherwise never be turned on.

Notice that the pressure drop over the choke can actually result in an increased pressure at the measurement point. As an example, if the choke is placed on the outlet side of the air moving device just before the air exits to ambient conditions and the pressure is measured before the choke, then the pressure drop over the choke actually results in an increased pressure at the measurement point.

On the other hand, the choke can also be placed on the intake side of the air moving device. Here, the most obvious placement is before the filtering element, even though it can also be placed after the filter. In the first case, the pressure drop is solely caused as the choke itself restrict the airflow, while in the latter the pressure drop is a combination of the filter and the choke. Actually, in the latter case, the filter itself can act as the choke.

The advantage of using the filter direct as the choke is that there is no need for a separate dedicated choke, which introduces extra resistance towards flow. On the other hand, use of a dedicated choke is also advantageous, as it is easier to manufacture similar again and again with respect to the airflow properties. Moreover, if the choke is placed before the filter, then the pressure variations during the cycle of a piston or a diaphragm pump is somewhat evened out by the filter. That is, after the filter, the pressure will vary a lot during the pumps cycle, but as the filter restricts air movement, the pressure before the filter but after the choke, will also vary, but to a much smaller extent. Moreover, particles that build-up on the filter element as air passes through it, will in some cases affect the filter permeability. Here, a dedicated choke will offer a less affected pressure drop.

When a choke is used, the pressure drop can also be affected by multiple other parameters. That is the absolute ambient pressure, the temperature, the humidity and the CO2 concentration. Here it can be advantageous to sense one or more of these parameters. The easiest parameters to establish are the temperature and the ambient pressure.

In one embodiment, the choke applied in the apparatus is only calibrated at a limited number of different ambient condition (pressure, temperature, humidity and CO2 level). This limited calibration is then compared to one or more known chokes, that have been calibrated at numerous ambient conditions. The behaviour of the choke applied in the apparatus is then derived from the know chokes behaviour. This is then stored in the apparatus, for example in non-volatile memory. When the user measures, the apparatus can then approximate the airflow from the sensed parameters (the pressure drop and possible with one or more ambient condition parameters).

To minimize the pressure drops dependency on humidity, a dedicated choke can be carefully designed. The choke can consist of one or more small holes. The diameter and length of the hole or holes can be adjusted to limit the pressure drops dependency of the humidity in the desired pressure and temperature regime.

Figure 13:
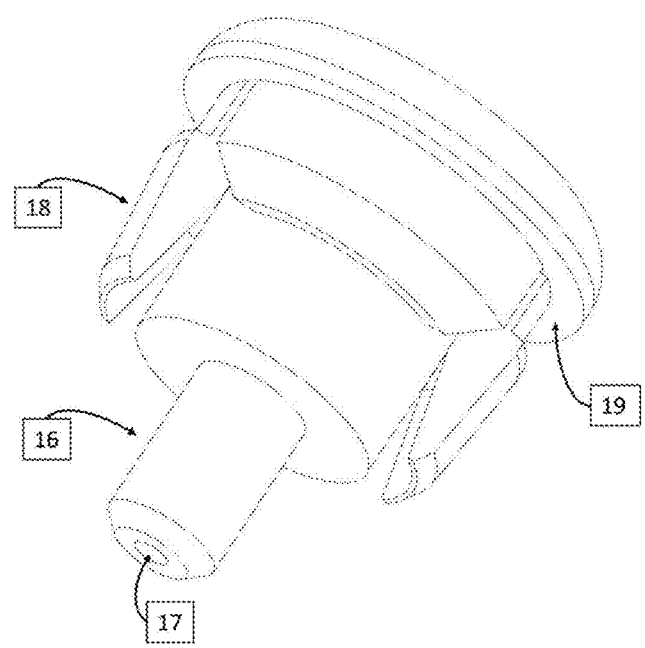
FIG. 13 illustrates a possible choke, with focus on the outlet direction.

FIG. 13 illustrates a possible choke embodiment, seen slightly from below. (16) is a stud, which is the chokes air outlet, (17) indicates the hole where the air exits the choke, (18) is a snap-fit, which will press the flange (19) towards the enclosure top, when the apparatus is assembled.

Figure 14:
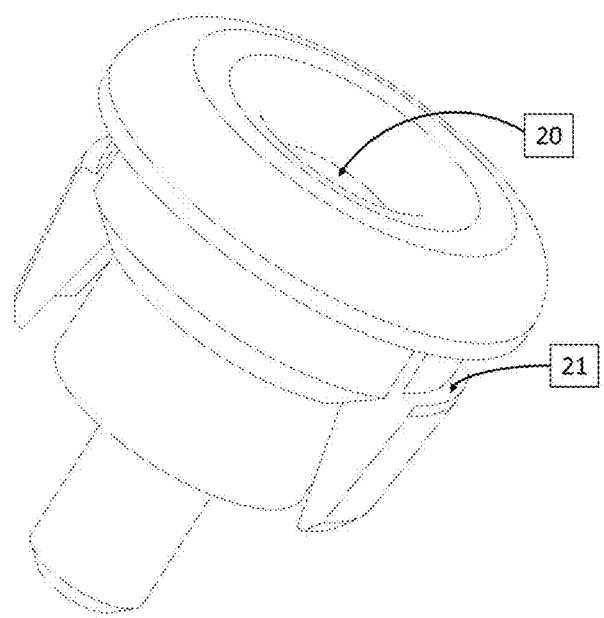
FIG. 14 illustrates a possible choke, with focus on the inlet direction.

FIG. 14 illustrates a possible choke embodiment, seen slightly from above. (20) is the air intake of the choke and (21) is the part of the snap-fit, that will extents a force on the inside of the enclosure, when the apparatus is assembled.

Figure 15:
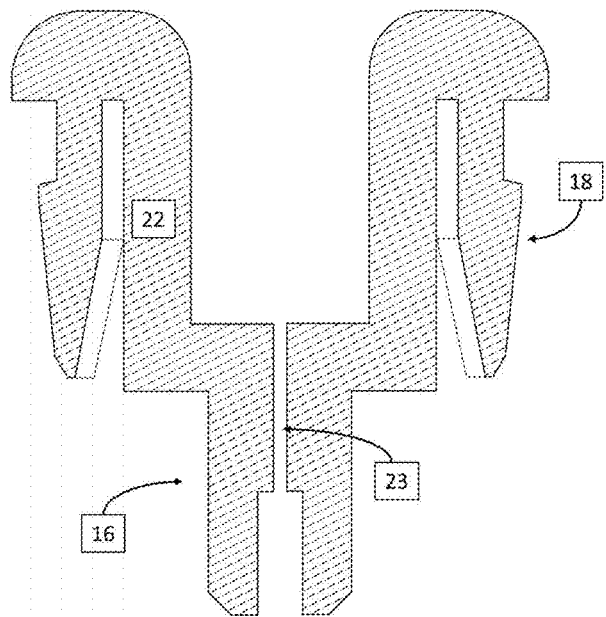
FIG. 15 is the cross-sectional view of a possible choke.

FIG. 15 is a cross-section of a possible choke. Here (22) shows the cut-through plane, (18) is the snap-fit, (23) is the part of the choke, which predominantly introduces a resistance to the airflow and (16) is the stud air outlet. Notice that the length and diameter of (23) can be varied. Thus, it is possible to minimize the influence of for example the humidity on the pressure drop inside a certain pressure and temperature range. As an example, it can be advantageous to apply a length/diameter, such that the pressure drop is least affected by humidity for a temperature interval from 5 to 45 Celsius and for a pressure interval from 700 to 1050 mbar, which in this context is defined as ambient conditions, as the pressure decreases with elevation. The impact of the humidity is in this context defined as the influence on the established flow rate. E.g. if the humidity introduces less than 10% error on the established flow rate, it means that for any humidity (0-100%, but not condensing), the established flow rate is accurate within 10% at the mentioned ambient pressure and temperature range, when the flow rate is not corrected for the humidity.

In one embodiment, the length of the part of the choke that limits the airflow, is less than 6 mm. This is advantageous, both due to the humidity influence on the pressure drop at ambient conditions, but also because longer holes are more difficult to manufacture.

For cleaning purposes, it is advantageous if a dedicated choke is placed on the perimeter of the apparatus, as this allows the user direct access to the choke. The apparatus can then instruct the user to clean the choke, if the pressure drop over the choke becomes too high, as this indicates an at least partially blocked choke. A possible embodiment is illustrated in FIG. 10, which illustrates an example of an apparatus, where the choke can be accessed by the user.

As mentioned, the filter element in the air's pathway is used to collect the Radon decay daughters. There are several possible filtering methods. A mechanical filter can be applied. This can be advantageous from a manufacturing viewpoint. On the other hand, it is also possible to employ an ionizing filter. One advantage of an ionizing filter is that it can be turned off and hence flushed of remaining Radon daughters. As an ionizing filter uses electricity, this can disturb the measurement circuitry.

In all cases it is preferred that the filter element catches a relatively large fraction of the Radon daughters, while at the same time permitting enough airflow. As the Radon daughters are electrically charged due to the alpha decay process, they tend to stick to dust particles in the air. The filter can therefore aim at collecting fine dust particles, not the single atoms. Here, one should notice that an electret or ionizing filter has the advantage of being able to collect at least part of the single atoms due to the electric attraction forces. Notice that an electret filter is normally a mechanical filter.

It is also preferred that the filter is placed close to the element, that detects radiation. This is because the radiation emitted from the Radon daughters is emitted in random directions. The probability of hitting the detector depends on the solid angle, that the detector covers. The solid angle means the amount of the field of view from some particular point that a given object covers. Here the particular point is the place on the filter, where the decaying Radon daughter was positioned.

The probability for radiation hitting the detector, can be determined using Monte Carlo simulation. Here, the filter can for example be simulated as a collection of points in a grid like manor, if it is assumed that the Radon progeny distribution is uniform on the filter. Other distribution functions can also be implemented.

The filter/detector efficiency, meaning the change that random radiation from the filter actually reaches the detector, depends on the geometry of the detector, the geometry of the filter, the distance between the filter and the detector, the angle between the filter and detector and the possible object(s) which can affect the radiation between the filter and the detector, including air, which also attenuates the alpha radiation.

Figure 16:
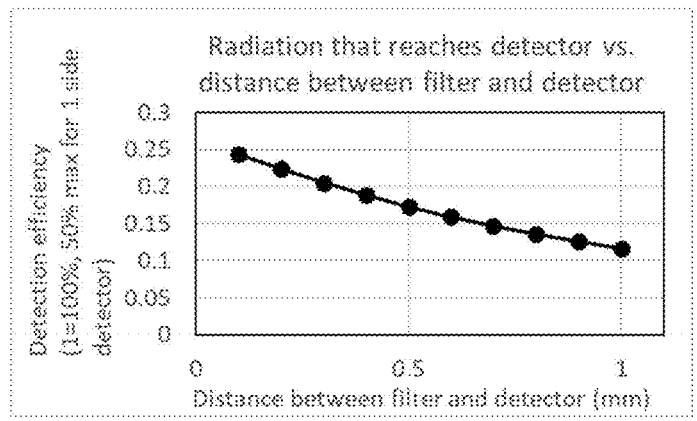
FIG. 16 shows the simulated solid angle vs. the distance between filter and detector, using linear scale.

An example of this is plotted in FIG. 16, where the height of the filter is 3.28 mm, the width of the filter is 3.03 mm, the height of the exposed area on the detector is 2.01 mm and the width of the exposed area on the detector is 2.68 mm. It is assumed that there are no objects between the filter and the detector. Moreover, the centre of the filter is placed directly above the centre of the detector and the filter plane is parallel to the detector plane. As seen, the distance between the filter and the detector has a large impact on the filter/detector efficiency.

Even though the dimensions are here expressed in absolute size, the filter/detector efficiency only depends on the relative sizes, when the absorption from the air between the filter and the detector is neglectable. I.e., if all the lengths stated for FIG. 16 are multiplied with 2 (including the filter to detector distance on the x-axis), the graph is still valid.

Figure 17:
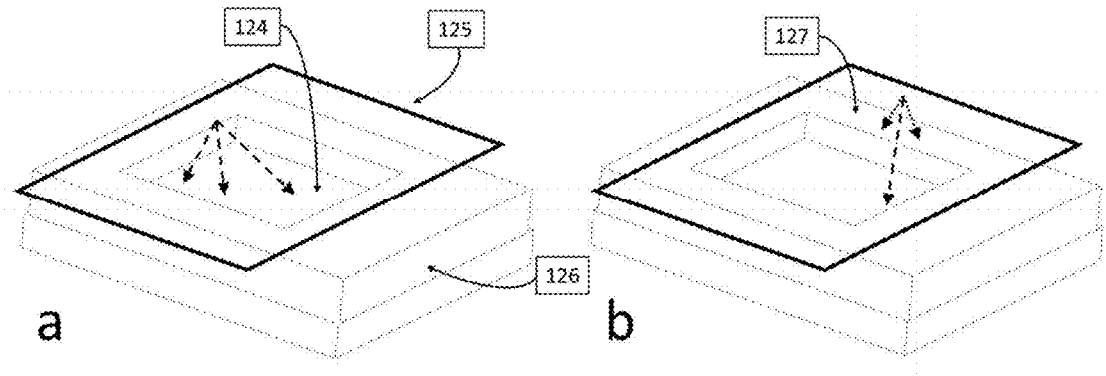
FIG. 17 illustrates that the remaining enclosure on the detector can attenuate radiation from the filter.

As illustrated in FIG. 17, the semiconductor detector might only be partially exposed to radiation. This can be advantageous, as the material used for the chip enclosure might aid in protecting the chip from exposure to oxygen in the air. In this case, if the filter is larger than the exposed part of the chip, or if the filter is placed staggered with respect to the exposed chip area, then part of the radiation can be influenced by the remaining chip enclosure. In FIG. 17, this is illustrated by showing radiation emitted from 2 different points. Here (124) is the exposed semiconductor detector, (125) is the filter (drawn as transparent to allow the illustration of the radiation), (126) is the semiconductor chip and (127) is the remaining enclosure. In FIG. 17a, the radiation (indicated with a dashed line, as the pathway is below the filter) originates from a point close to the centre of the exposed chip. In this case, the remaining chip enclosure does not affect the radiation before detection. In FIG. 17b, the radiation (indicated with either a dashed or a dotted line, as the pathway is below the filter) originates form a point directly above the remaining chip enclosure. The part of the radiation, which is illustrated with a dotted line is attenuated by the remaining chip enclosure.

Figure 18:
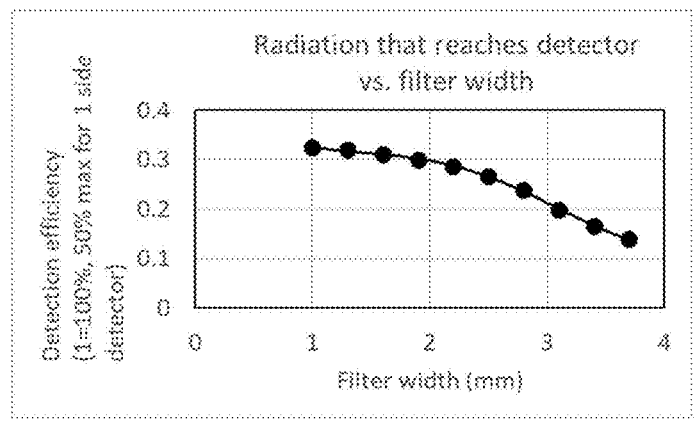
FIG. 18 shows the simulated solid angle vs. filter size, using linear scale.

To illustrate the filter size influence, the filter/detector efficiency is plotted in FIG. 18. Here, the active area of the semiconductor detector is 2.01 mm (height) times 2.68 mm (width). The filter height is 75% of the filter width. E.g. the filter height is 0.75 mm, when the filter width is 1.0 mm. The distance between the detector and the filter is 0.45 mm and the remaining enclosure height is 0.4 mm. For this plot, it is assumed that the remaining enclosure will absorb alpha radiation completely. Moreover, the centre of the filter is placed directly above the centre of the detector and the filter plane it parallel with the detector plane. As seen, the filter/detector efficiency decreases when the filter increases in size. The kink in slope of the curve between the first (small value of filter width) 6 points and the last 4 points is at least partially caused by the filter extending beyond the detector and hence the remaining enclosure absorbs part of the radiation emitted from the filter.

Figure 19:
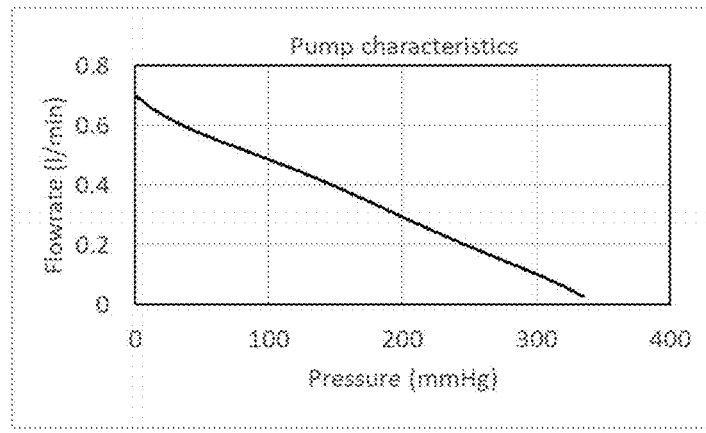
FIG. 19 illustrates a possible pump characteristic, using linear scale.

To optimize the filter size for a given detector, the air moving device's characteristics must be considered. As many air moving devices will have lower maximum flow rate when there is higher resistance in the airpath, a smaller filter will generally result in relative fewer Radon progenies being collected on the filtering material. An example of a pump's flow rate vs. pressure drop is shown in FIG. 19. The pressure is the resistance in the airflow path. The graph is indicative of the performance at ambient conditions.

As expected, a higher resistance to the flow, means the pump will be capable of moving less air. For a given filter permeability, a given pump, and a given filter/detector geometry, it is possible to optimize the filter size. As an example, consider a filter with a permeability of $$2.53 * 10^{-4} \frac{l/\min}{mbar * mm^2}$$

Figure 20:
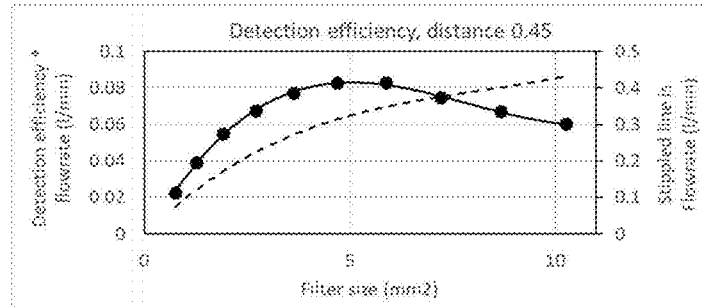
FIG. 20 shows a simulated optimization of the filter size for given parameters.

When such a filter is used for the filter/detector geometry used to make the plot in FIG. 18 and for a pump with the characteristics plotted in FIG. 19, the result is plotted in FIG. 20. As shown, the optimum filter size is around 5 mm^2, i.e. very close to the size of the detector (5.38 mm^2). The flow rate is marked with a stippled line in the figure.

For a filter size of 5.05 mm^2, product of the flow rate and the filter/detector efficiency is around 0.0829 l/min. If two detector/filters similar to the detector/filter described in FIG. 18 are applied in parallel, with one single pump (characteristics like FIG. 19), the optimal filter size pr detector shrinks a little, that is from 5.05 mm^2 to 4.21 mm^2. Of course, the total filter size is 8.42 mm^2 when the two filter/detectors are applied. In this case, the detection efficiency times flow rate becomes 0.109 l/min, i.e. an improvement of 31%.

It is of course possible to apply three or more detector/filters in parallel. Moreover, the applied detector/filter does not have to be identical.

This optimization of the count rate can be performed for more than 1 input parameter. In the present case, it was only the filter area that was changed, but it could also include filter width and height individually and the distance between the filter and the detector.

In one embodiment, the detector size is more than 0.5 mm^2. This can allow a reasonable flow rate through the filter. From a pure commodity availability view, this excludes around 20% of the commercially available photodiodes.

Figure 21:
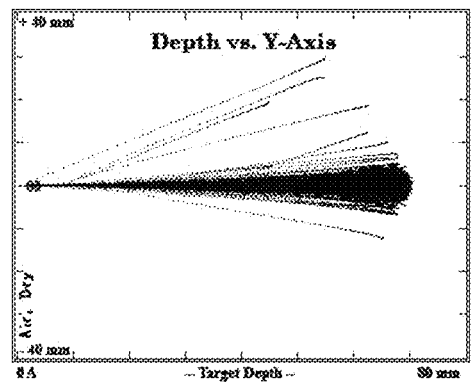
FIG. 21 shows simulation pathways for 7.69 MeV alpha radiation in air, determined using SRIM, using linear scale.

When optimizing the filter position relative to the semiconductor detector it is not enough to consider the solid angle. This is because the alpha radiation has a limited range in air. The range depends on the energy level of the alpha radiation. Here, the range for 7.69 MeV alpha radiation is around 70 mm, as illustrated in FIG. 21, where the pathway of 7.69 MeV alpha radiation in dry air is simulated using SRIM (The Stopping and Range of Ions in Matter) software simulation, version 2008.04. Each line shows the pathway of an alpha particle moving through air, origination from (0,0) and moving in the x-direction.

Figure 22:
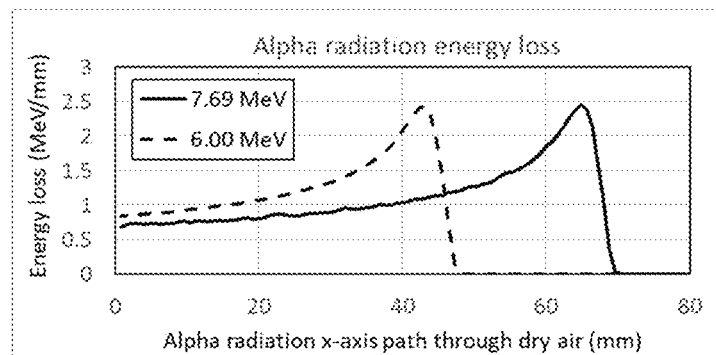
FIG. 22 shows the simulated energy loss for 6.00 and 7.69 MeV alpha radiation in air, determined using SRIM, using linear scale.

Even though the range is around 70 mm, it does not mean that it is smart to place the filter and detector at just under this distance. This is because it will require a large detector to achieve a high solid angle at this distance, and moreover because of the possible distance differences in path length for the radiation. The range in air is mainly caused by ionization when the alpha radiation passes the air molecules. The energy loss is comparatively smaller when the alpha radiation has high energy just after emission. The initial energy loss is around 0.07 MeV/mm for 7.69 MeV alpha radiation, while it is around 0.08 MeV/mm for 6.0 MeV alpha radiation. The energy loss pr mm for 6.00 MeV and the 7.69 MeV alpha radiation was determined using SRIM simulation. The result is plotted in FIG. 22.

Now, to allow distinguishing the different decays from Radon progeny, the most difficult is to distinguish the 7.39 MeV alpha radiation from Polonium-215 (originating from U235) from the 7.69 MeV radiation from Polonium-214 (originating from U238). If the only source of uncertainty of the radiation energy level is the absorption in air, then the maximal difference in traveling length from the filter to the detector is around 3.75 mm.

Distinguishing between the decay of Bismuth-211 (6.55 MeV) and Polonium-218 (6.00 MeV), marked with arrow 2 in FIG. 5, the maximal allowable difference in traveling length is around 6.9 mm.

Distinguishing between the decay of Polonium-218 (6.00 MeV) and Polonium-210 (5.30 MeV), marked with arrow 1 in FIG. 5, the maximal allowable difference in traveling length is around 8.8 mm.

Distinguishing between the decay of Polonium-212 (8.78 MeV) and Polonium-214 (7.69 MeV), marked with arrow 3 in FIG. 5, the maximal allowable difference in traveling length is around 15.6 mm.

Distinguishing between the decay of Polonium-214 (7.69 MeV) and Polonium-218 (6.00 MeV), marked with arrow 4 in FIG. 5, the maximal allowable difference in traveling length is around 24.1 mm.

Distinguishing between the decay of Polonium-210 (5.30 MeV) and Bismuth-212 (2.18 MeV), marked with arrow 5 in FIG. 5, the maximal allowable difference in traveling length is around 39 mm.

Now, in practice many other factors influence the ability to separate radiation with different energy levels, so it is advantageous to keep the variation in traveling length at a minimum.

Figure 23:
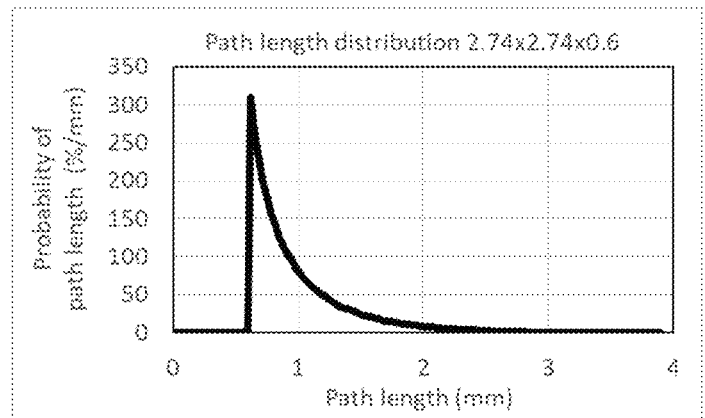
FIG. 23 shows the simulated path length variation for a specific filter/detector implementation, using linear scale.

In one preferred embodiment, it is possible to distinguish between the 7.39 MeV and the 7.69 MeV alpha radiation. Here, the filter size and the semiconductor detector size are both 2.74×2.74 mm and the distance between the filter and the semiconductor detector is 0.6 mm. In this case, the shortest radiation path from the filter to the detector is 0.6 mm (straight across), while the longest is corner to corner $(2.74^2+2.74^2+0.6^2)^0.5=3.92$ mm, i.e. a difference of 3.32 mm. As this is smaller than 3.75 mm, this embodiment will in principle allow differentiating between all the alpha radiation originating from Radon, except the unlikely decays. For this filter/detector configuration, the path length probability is plotted in FIG. 23. The probability was determined using Monto Carlo simulation, just like the approach used to determine filter/detector efficiency.

In practice, the recorded signal might however be influenced by numerous factors. In one embodiment, the amplifier circuit adds some noise, the ADC might be noisy and the energy spread might also by enlarged due to absorption both while radiating out of the filter and into the detector. When the radiation passes out of the filter, it can be affected both by the filter itself and also by dust on top of the filter. When the radiation passes into the detector, it might pass through a passive layer before reaching the detecting layers. A photodiode will for example often be covered by a silica or other glass layer. Even though these layers are thin, they still affect the ability to distinguish between radiation, as the ionization energy loss depends on the electron density, which is roughly 1000 times larger in solids than in air.

Hence, an advantageous solution can combine a filter and a semiconductor detector of the following sizes:

In one embodiment, a detector with an area of 225 mm^2 or less can be applied. This could be a quadratic chip of 15×15 mm, but other active area forms can also be applied. A circle with this area has a diameter of 16.9 mm, while a quadratic chip has a diagonal of 21.2 mm. If the active area has unequal side lengths, the diagonal will increase. The filter can be a little larger or smaller than the active area of the semiconductor detector and it is advantageous to choose the filter dimension optimal from the air moving device's characteristics, using the previously described optimization method illustrated in FIG. 20. Such a filter/detector configuration should in most cases allow discrimination between the Polonium-214 (7.69 MeV) and Polonium-218 (6.00 MeV) peaks, marked with arrow 4 in FIG. 5.

In another embodiment, a detector with an area of 120 mm^2 or less can be applied. This could be a quadratic chip of just less than 11×11 mm, but other active area forms can also be applied. A circle with this area has a diameter of 12.4 mm, while a quadratic chip has a diagonal of 15.5 mm. If the active area has unequal side lengths, the diagonal will increase. The filter can be a little larger or smaller than the active area of the semiconductor detector and it is advantageous to choose the filter dimension optimal from the air moving device's characteristics, using the previously described optimization method illustrated in FIG. 20. Such a filter/detector configuration should in most cases allow discrimination between the Polonium-212 (8.78 MeV) and Polonium-214 (7.69 MeV), marked with arrow 3 in FIG. 5. The apparatus should therefore be capable of distinguishing between the Radon-220 and the Radon-222 progeny (arrow 3 and arrow 5 in FIG. 5).

In another embodiment, a detector with an area of 25 mm^2 or less can be applied. This could be a quadratic chip of 5×5 mm, but other active area forms can also be applied. A circle with this area has a diameter of 5.6 mm, while a quadratic chip has a diagonal of 7.1 mm. If the active area has unequal side lengths, the diagonal will increase. The filter can be a little larger or smaller than the active area of the semiconductor detector and it is advantageous to choose the filter dimension optimal from the air moving device's characteristics, using the previously described optimization method illustrated in FIG. 20. Such a filter/detector configuration should in most cases allow discrimination between the Polonium-218 (6.00 MeV) and Polonium-210 (5.30 MeV), marked with arrow 1 in FIG. 5.

In another embodiment, a detector with an area of 8 mm^2 or less can be applied. This could be a quadratic chip of 2.8×2.8 mm, but other active area forms can also be applied. A circle with this area has a diameter of 3.2 mm, while a quadratic chip has a diagonal of 4.0 mm. If the active area has unequal side lengths, the diagonal will increase. The filter can be a little larger or smaller than the active area of the semiconductor detector and it is advantageous to choose the filter dimension optimal from the air moving device's characteristics, using the previously described optimization method illustrated in FIG. 20. Such a filter/detector configuration should in most cases allow discrimination between the Bismuth-211 (6.55 MeV) and Polonium-218 (6.00 MeV).

The above focus on a square like detector originates from the chip manufacturing process. Normally, semiconductor detectors are manufactured from wafers. It is convenient to have multiple chips manufactured on the same wafer. When the chips on the wafer are ready, the wafer is normally sawn into pieces, normally with one chip on each piece. Here, the advantageous form is a rectangular chip, as this form utilizes the wafer area most efficiently.

In some cases, it is advantageous, if the form of the active area is somewhat odd. E.g. if a photodiode like the TEMD5010 is used, there is a pad on the surface, which connects the anode to the soldering pad. It can be advantageous if the chip enclosure is not removed over the pad. Hence the area from which the enclosure is removed can be oddly shaped (not circular and not rectangular).

In the above examples, it was implicit assumed that the semiconductor detector is a single detecting element. If multiple detecting elements are used together, the active area of said semiconductor detector is defined as the individual detecting element active area. For a semiconductor detector that consist of multiple detecting elements (like a CCD sensor), the active area size is defined as the pixel size (assuming that the whole pixel is configured to detect radiation from Radon progeny, otherwise, the active area is the size of the part of the pixel that is configured to detect radiation from Radon progeny).

As said, the filter might slowly clog up due to dust particles after numerous measurements of the Radon concentration. Here, it can be advantageous, if the apparatus tracks the total air moving time. After some time, the apparatus can then report to the user, that the filter should be changed. Changing the filter can in some cases be an action that the user can perform, while in other cases it might be necessary to get the apparatus recalibrated at the factory or at another similar facility.

The apparatus can also report how many times it can measure the Radon concentration before the filter needs to be changed, so the user can plan ahead.

It can be advantageous to store the total air moving time and/or the remaining air moving time in non-volatile memory, like EEPROM, or in memory that has a dedicated battery backup. In this patent, such a memory is defined as a persistent memory. The advantage of storing the total air moving time in such a way, is that even if the apparatus runs out of power, it will still be able to inform the user, when the filter needs to be changed.

EEPROM is given as an example of a possible non-volatile storage media. Other possible medias include: EPROM, FRAM, MRAM, PCM, FeFET memory, Flash memory like NOR, NAND and SSD and Magnetic storage devices like hard disk, floppy disk and magnetic tape).

Notice that the apparatus might need to be recalibrated and/or get the filter and/or possible the choke replaced for different reasons than dust build-up. E.g. the choke can get worn by the airflow and hence the airflow establishing can become inaccurate. Another example is that the filter can become stretched due to the airflow motion through the filter. This will of course impact filter/detector efficiency.

Hence, there are several reasons for limiting the number of measurements of the Radon concentration that can be performed before servicing of the apparatus is recommended.

As already described, the sensitivity of the apparatus generally increases, when the filter to detector distance decreases, as illustrated in FIG. 16. A small distance does on the other hand increase the resistance to the airflow and beyond a certain point, the airflow becomes turbulent. Hence a balance must be struck.

Figure 24:
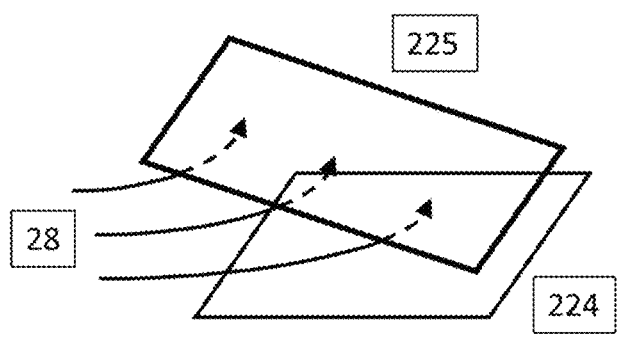
FIG. 24 illustrates the advantage of using a titled filter.

One way for allowing more air to flow while at the same time minimizing the detector/filter distance, is to tilt the filter plane relative to the detector. An example of this is illustrated in FIG. 24. Here the air (28) enters from the left and moves though the filter (225). The air is illustrated partly with a solid line and partly with a dashed line. The solid line is used where the air pathway is directly visible in the drawing, while the dashed line indicates the pathway below the filter. Radiation from the Radon progeny is detected by the semiconductor detector (224). The advantage of tilting the filter is that the airflow in the horizontal plane decreases to the right in FIG. 24, as some of the air passes through the filter.

The distance between the filter and the detector is defined as the minimum distance between filter and detector. For multiple filters and/or detectors, the distance is defined as the overall minimum distance.

In some cases, it is advantageous to only remove part of the detector chip enclosure and then let the filter be in contact with at least part of the remaining enclosure. Here, it is noted that the chip to enclosure surface distance is around 0.38 mm for the TEMD5010, around 0.47 mm for the BPW34S, around 0.5 mm for the BPW34B, around 0.7 mm for the BP104, around 1.3 mm for the s1223-01, around 1.45 mm for the BPW21R and around 1.65 mm for the BPX61. Here, a large distance between the filter and the detector can also allow for substitution between detectors, hence allowing the manufacturer the freedom to choose between different detectors with the same filter holder. In some embodiments, the enclosure can be partly removed to accommodate for the needed airflow. In other embodiments, the distance between detector and filter can be large enough to accommodate space both for the enclosure and for a relative laminar airflow. Hence, a distance of 2 mm or less between detector and filter might be preferable.

Altogether, this consideration about the ability to distinguish the different radiation energies, makes it advantageous to apply a small filter and a small detector. The drawback of this, is that the permeability of the filter scales with the filter size. Hence, it requires a relatively large pressure drop to force an airflow through a small filter.

A solution is to employ multiple detectors simultaneously. The advantage of applying multiple detectors is that the difference in path length can be kept low, while enlarging the filter area. Here, more than one detector can be connected to the same amplifier circuit and the same air moving device can be used to move the air though the filter or filters.

The advantage of multiple detectors can also be achieved by compartmentalising a single detector. This could be achieved by placing radiation barriers on top of a single detector, which in practice hinders long radiation pathways.

In one embodiment, the filter is attached to a plastic filter holder by fusing the filter to the plastic. Here, the places that are fused together becomes impermeable. Hence, a single filter can be subdivided into multiple filtering elements.

This strategy where multiple detectors and filters are used in parallel does not require that the radiation is totally shielded between the different detector/filter pairs. If radiation can pass from a neighbouring filter to an adjacent detector/filter pair, then this will of course add an unwanted signal. But, if the probability of this happening is low due to the involved solid angle, the added noise can be acceptable.

It is advantageous, if the detector is placed close to the amplifying circuitry, as this limits the electrical noise. If a semiconductor detector is applied as detector, it is advantageous either to use a surface mounted (SMD) component, or to limit the length of the legs, when a trough hole component is applied. In all cases, to place the filter close to the semiconductor detector, and to control the airflow, it can be advantageous to use the PCB as one side of a pressure chamber, with the filter holder providing relative airtightness towards the PCB board using for example a packing element.

In this document, the phrase relative airtight is defined as cases where at least the majority of the air, at ambient conditions, is guided via the design pathway. It is of course desirable that the pathway is as airtight as possible, but for ease of manufacturing of the apparatus, it can be accepted that some air might enter the airstream through leaks (referred to as false air). False air preferably forms less than 10% of the airflow, such as less than 5%.

If a pressure difference is used to establish the airflow, that is if differential and/or absolute pressure is measured, it might be beneficial if the controlled amount of air that passes through the filter material also causes the pressure drop. This is for example obtained if the air pathway between the choke and the filter material is relative airtight. In one embodiment, this is obtained by having the filter and the absolute pressure sensor inside the same relative airtight chamber, where one side of the chamber is the PCB board.

In another embodiment, the airflow is sensed before the air passes though the filter material, but using a separate airtight enclosure for the pressure measurement. In another embodiment, the airflow is sensed after the air passes though the filter material.

In the mentioned embodiments, it is possible to measure the pressure by using a relative airtight chamber that surrounds the pressure sensor and where one side of the airtight chamber is the PCB board.

This ensures control of the air's pathway, which of course is advantageous if the choke is placed before the filter. Moreover, a relative airtight pathway also limits the impact of the air inside the apparatus. As the apparatus can be brought into a dwelling and then start measuring the Radon concentration right away, measuring on the air present in the apparatus is disadvantageous, as it can represent the conditions from before entering the dwelling. By ensuring the air's pathway using a filter holder that is relative airtight, this error source is limited considerably, as the volume of air which does not represent the dwelling is limited to the volume in the tubes and other auxiliaries in the air's pathway before the filter.

Inside the filter holder, a filter can be placed relative airtight towards the holder. This assembly between filter and filter holder is useful, as air that passes around the filter does not leave Radon daughters on the filter.

In one embodiment, the filter is a mechanical filter of a membrane type, possible with a support layer underneath. This could for example be a PTFE membrane acting as filter on top of a PP membrane acting as support layer. In the context of this patent, such a membrane support layer is considered part of the filter.

In some cases, relative airtight assembly can be achieved by fusing the filter to the filter holder. For the mechanical filter described above, the filter holder will melt into the support PP membrane and possible also into the PTFE layer. If the fuse is only made at the rim of the filter, flow through the centre is still possible. The same effect can be achieved by gluing the filter to the filter holder.

Besides fusing and gluing, more conventional assembly techniques can be applied. The filter can for example be mechanically pressed towards the filter holder and a relative airtight connection can be achieved either by the compression directly or by using a packer element.

In one embodiment, the apparatus comprises a filter holder. The filter holder is for holding/supporting the filter and configured to maintains the size of the filters active area. Moreover, a preferred filter holder defines a periphery of the air's pathway, hence guiding the airflow and thereby aiding in controlling that the Radon progeny can be collected on the active area of the filter.

A filter holder that defines the periphery of the air's pathway is in the context of this patent understood to comprise at least one material, which is less permeable than the filters active area. In some embodiments, the filter holder comprises a material which in comparison to the filter can be considered impermeable.

In some cases, the filter is not uniform with respect to airflow. This could for example be the case, if part of the filter is fused or glued to the filter holder. Here, the fused or glued part of the filter is considered inactive, as the attachment process has limited the filters permeability here. In the context of this patent, the inactive part of the filter is not considered a part of the filter holder. Moreover, when comparing the permeability of the filter vs. the filter holder or other material, in the context of this patent, the filters permeability refers to the permeability of the active part of the filter.

Preferably, the filter holder is fixedly positionable relative to the semiconductor detector. In particular, the filter holder may be fixedly positioned relative to the semiconductor detector or it may be movably arranged such that it can be brought into a fixed position relative to the semiconductor detector.

The filter holder comprises all the parts in the apparatus that are used to hold the filter in a fixed position relative to the semiconductor detector where these parts (except the filter itself, which is not considered part of the filter holder) cannot (non-destructively) be disconnected from each other neither by the user nor by the apparatus.

The filter can be permanently attached to the filter holder. At least in some embodiments, it requires specialized equipment to detach the permanently attached filter from the filter holder. At least in some embodiments, the permanently attached filter cannot be detached from the filter holder in a non-destructive manner, i.e. without damaging the filter and/or the filter holder in a way that prevents the filter and/or filter holder to be reused. The advantage of using a filter, which is permanently attached to a filter holder, can be that the active area of the filter is controlled.

On the other hand, if the filter is placed in the apparatus by the user, the actual filter placement and the elements that defines the periphery of the air's pathway, like packing elements, can affect the size and placement of the active filter area. E.g. if the packing elements are compressed more, they can block more of the filter.

The impact of this error source depends on the size of the filter and the size of the detector. If the filter is much larger than the detector, the error will be small, but in this case, the solid angle efficiency of the apparatus is limited.

The prior art solution is to use a large detector and a large filter, as the error scales with the perimeter of the filter (for a circle, the perimeter scales with the radius, r), while the active area scales with the area (for a circle, the area scales with the radius squared, $r^2$). Hence, the relative error is small for large filters and large detectors. However, large filters and detectors are expensive to manufacture and the larger detector will in general also have a larger capacitance, which dampens the signal responds when detecting radiation.

The same issue is also apparent for apparatuses that can move the filter, but where the filter is not permanently attached to a filter holder that defines a periphery of the air's pathway. Here, the active area can be ensured by means like packing rings, which are not permanently attached to the filter. Just as for the user replaceable filter, the size and placement of the active area is difficult to control.

In one preferred embodiment, the filter is attached permanently to a filter holder, where said filter holder is fixedly positioned in the apparatus. An example of an embodiment with the filter attached in this way inside the apparatus is illustrated in FIG. 10 and FIG. 11.

For clarification, a filter holder is defined as irreplaceable when it requires one or more specialized tools, including Radon calibration equipment and/or tools capable of precise placement, to replace said filter holder.

On the other hand, a filter holder is defined as replaceable, when the user and/or the apparatus can replace the filter holder. Normally, the manufacturer would describe the replacement process for a replaceable filter in the apparatus manual.

Radon calibration equipment is in the context of this patent understood to comprise the equipment needed to calibrate the Radon apparatus such that its output is within tolerance allowed by the manufacturer. One way of calibrating a Radon apparatus is to let it measure on an atmosphere with a known Radon concentration. The Radon concentration can for example be determined by a reference instrument.

It can be advantageous if the Radon concentration is enlarged for example by having a Radon chamber that contains a Radon source. Such a source can contain the parent elements of Radon, e.g. Uranium-235, Thorium-232 and/or Uranium-238. It can be advantageous if the Radon chamber mainly contains the parent for the Radon isotope that the Radon apparatus is calibrated for. In other Radon chambers the parent can be shorter living parents like Radium, where especially Radium-226 can be useful for creating Radon-222, as its half-live is 1600 years and hence the amount in a Radon chamber will be stable during the lifetime of a fabrication facility while still having a high Radon-222 production.

Besides knowing and/or controlling the Radon concentration in a Radon chamber, it can be useful to know and/or control the temperature, the pressure, the humidity, the $CO_2$ concentration and/or other ambient parameters.

One way of performing a Radon calibration is to let the Radon apparatus measure on the atmosphere in the chamber and then determine a calibration factor between the observed amounts of detected radiation and the Radon concentration in the chamber.

A more refined way of calibrating a Radon apparatus can be to calibrate individual parts of the apparatus separately, as exemplified with the previously described choke calibration.

In some embodiments, a fixedly positioned filter holder is only intended to be replaced by the manufacturer or other qualified persons. This allows that the manufacturer or other qualified persons might Radon recalibrate the apparatus with the new filter holder.

In some embodiments, an apparatus that comprises a fixedly positioned filter holder is only intended to carry out a limited number of Radon measurements before the apparatus is discarded. To this end, the apparatus may be configured to only be operable a predetermined number of times. In some embodiments, the predetermined number of times is one, i.e. the apparatus may be a single-use apparatus. The apparatus may be configured to maintain a counter for counting the performed number of Radom measurements. The apparatus may even be configured to stop operation after the predetermined number of Radon measurements have been performed.

The advantage of a fixedly positioned filter holder is amongst other things that the factory Radon calibration can rectify variations in the filter/detector efficiency. Hence the fabrication tolerances for the filter holder, for the detector and for the assembly can be somewhat relaxed.

To ensure accuracy of the apparatus, filter replacement and/or filter holder replacement might require the use of one or more specialized tools. Here, specialized tools is understood as tools that are not found in the average household. The user might get the manufacturer to replace the filter. The one or more specialized tools can comprise specialized assembly tools, which could be very accurate placement equipment designed to place a filter and/or filter holder inside the apparatus. As an example, a pick and place apparatus for electronic components can routinely place a component with an accuracy of 1/1000 of an inch. Less accurate pick and place apparatuses can of cause also be applied. Another example is a robot arm that can routinely reach an accuracy of 0.1 mm. Another example is that a feeler gauge can be used to ensure the position of the filter relative to other objects, hereunder the detector. Another example is that a stencil can be used to place the filter. Another example is that the position of the filter can be controlled using guide pins. Likewise, a specialized tool can comprise a torque screwdriver, for example if one or more screws are used to compress packing rings towards the filter. Examples of torque screwdrivers includes the assembly line screwdrivers manufactured by Hios, where the following list covers the torque range from 0.02 to 10N·m: CL-2000 (0.02-0.2N·m), CL-4000 (0.1-0.55N·m), VZ-1812 (0.4-1.8N·m), CL-9000NL (1.2-5N·m) and VBH-1820PS-OPC (4-10N·m). Similarly, non-electric torque screwdrivers comprise the produces manufactured by Gedore, which can cover the torque range from 0.02 to 13.6N·m. These screwdrivers are only mentioned as examples to illustrate the variety of possibilities and similar products from other manufactures can of cause be used. Another example is an electric screwdriver with turn counting function.

The manufacturer might however employ a different strategy, where the filter and/or filter holder is replaced, but where a Radon recalibration is performed. In the context of this patent, the Radon recalibration equipment is considered a specialized tool, as such equipment generally comprises having a chamber with a known and possibly controlled Radon concentration.

In all cases, the use of one or more specialized tools can ensure that the apparatus after a filter replacement and/or filter holder replacement preforms a measurement that is within the tolerance allowed by the manufacturer.

The intention of the manufacturer could also be that the apparatus is a limited- or single-use device that is discarded when the filter needs replacement. Here, the manufacture can limit the user's ability to change the filter for example using the same strategy employed for modern-day smartphones, where for example the battery is permanently built into the phone. Just as for a phone's battery, the access to the filter can be so difficult that it effectively hinders that the user replaces the filter. In this patent, such an assembly of the apparatus is defined as stating that the filter is permanently built into the apparatus.

The advantage of using one or more specialized tools for filter replacement is similar to the case where the filter is permanently built into the apparatus. In both cases, the filter and the detector can be miniaturized, as the measuring accuracy can be achieved by the assembly accuracy and/or the apparatus calibration.

In an embodiment, the filter is permanently positioned in the apparatus.

In another embodiment, that filter is uneasily replaceable.

In another embodiment, that filter is irreplaceable for the average consumer.

In another embodiment, that filter is embedded into the apparatus.

In another embodiment, the filter is fixedly positioned in the apparatus.

In the context of this patent, stating that the filter is permanently positioned in the apparatus and/or uneasily replaceable and/or irreplaceable for the average consumer and/or embedded into the apparatus and/or fixedly positioned in the apparatus comprises both the case where filter replacement requires the use of one or more specialized tool and the case where the filter is permanently built into the apparatus.

Figure 25:
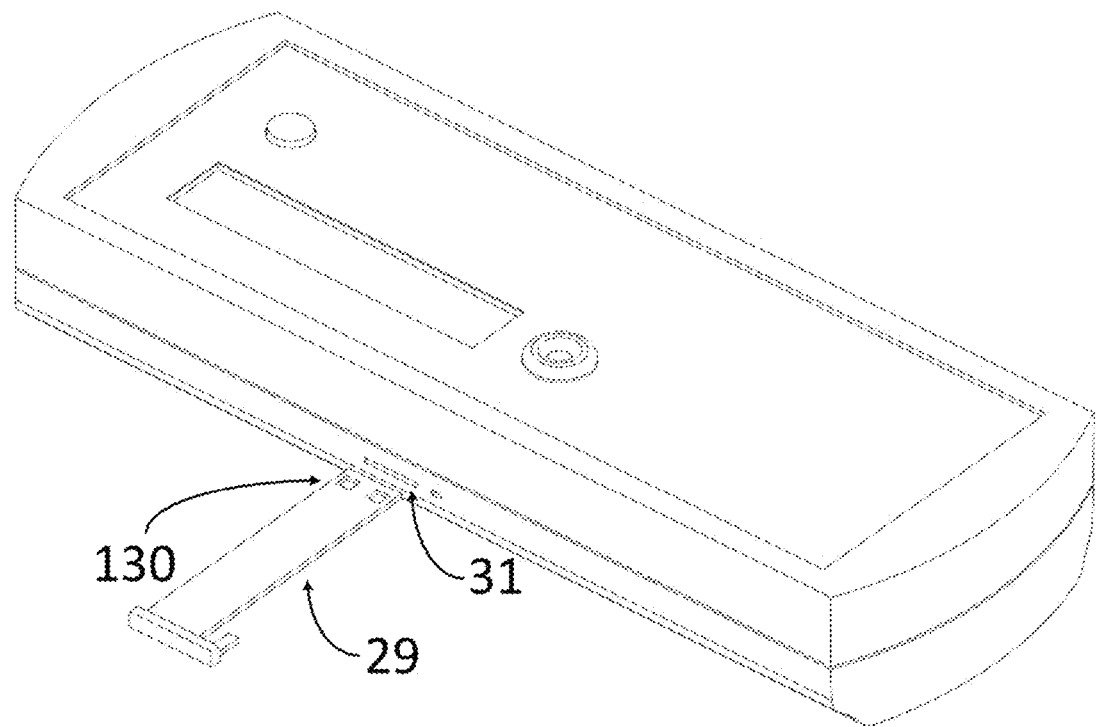
FIG. 25 illustrates a permanently attached filter to a replaceable filter holder, when the filter holder is outside the apparatus.

In a preferred embodiment, the filter is permanently attached to a filter holder, where the user can replace the filter holder including the filter. An example of such an embodiment is shown in FIG. 25. Here, the filter holder (29), is placed just outside the corresponding holes in the enclosure (31). The filter itself is placed beneath the two holes (130) in the filter holder (29).

Figure 26:
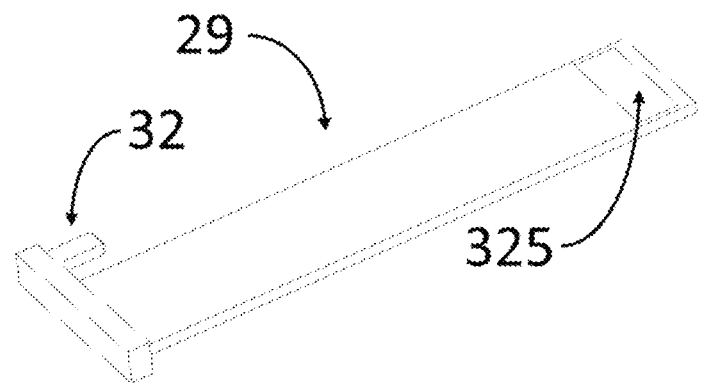
FIG. 26 illustrates a filter holder with the filter permanently attached.
Figure 27:
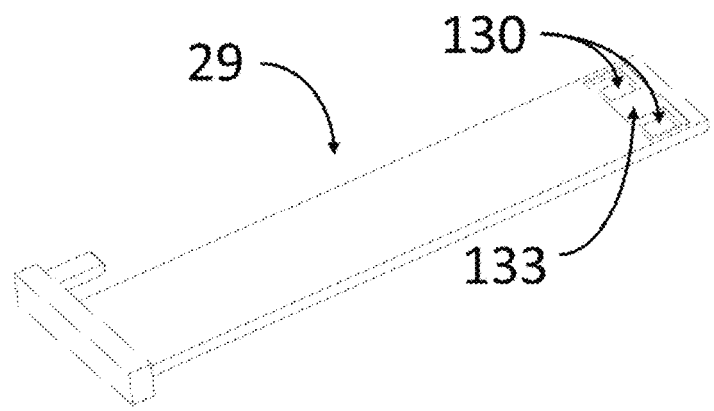
FIG. 27 illustrates a filter holder without the filter material.

In FIG. 26, the filter holder (29) is illustrated. The filter (325) is permanently attached to the filter holder. The extra stick (32) will hinder wrong insertion of the filter holder in the apparatus. To further illustrate the filter holder, FIG. 27 illustrates the filter holder (29) without the filter. The manufacturer will permanently attach the filter at the position marked as (130). Here the two holes will allow air passage, while the bond between the filter holder and the filter is made at the submerged plane marked as (133). This assembly allows control of the active area of the filter.

When the filter holder in FIG. 26 is inserted into the apparatus, packing elements will ensure a relative airtight air pathway by sealing against either the filter holder and/or the inactive parts of the filter. This ensures that active area is not affected by a change in the area covered by the packing element.

Figure 28:
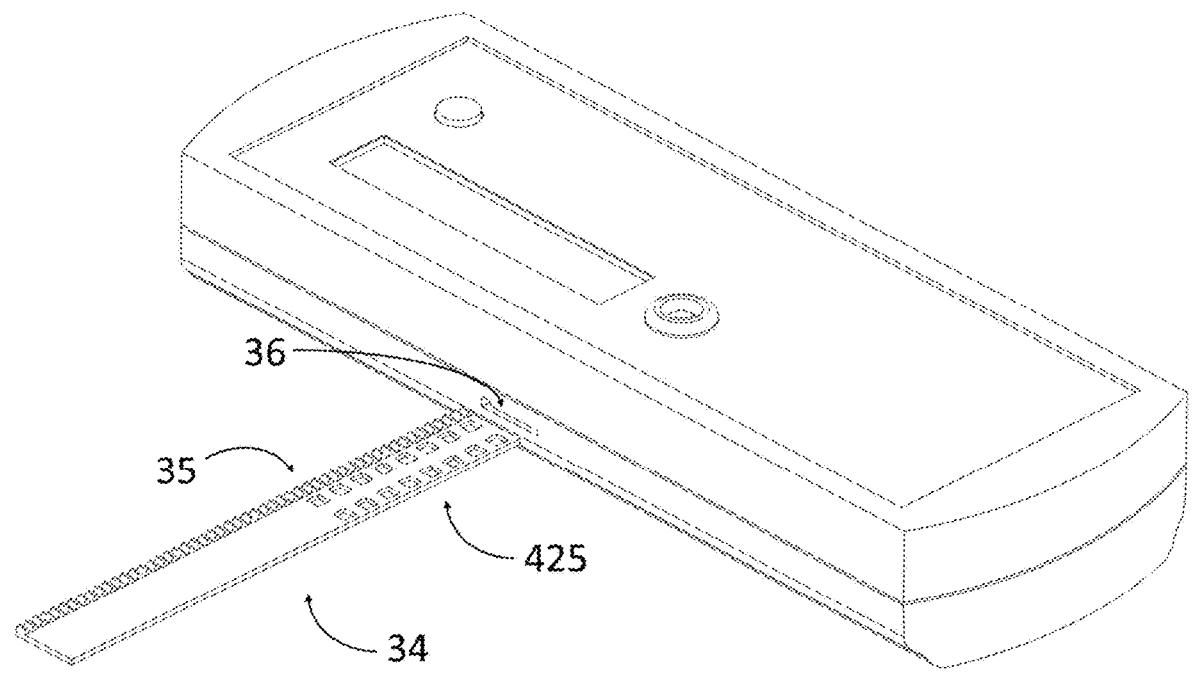
FIG. 28 illustrates a filter holder with a permanently attached filter, when the filter holder is outside the apparatus.

In another embodiment illustrated in FIG. 28, the filter is attached permanently to a moveable filter holder (34). When the filter holder is inserted into the apparatus in the asymmetric hole (36) which ensures correct orientation of the filter holder, the apparatus can move the filter holder using the gear bar (35). The active area of the filter can then change position between different places on the filter (425), which enables the use of a fresh uncontaminated filter. As previously described, the air's pathway is determined at least in part by the filter holder and/or the inactive parts of the filter.

The advantage of using a moveable filter holder, is that the apparatus can make many consecutive determinations of the Radon concentration without waiting for the decay tail or without changing the filter. In some embodiments, the filter holder is both moveable and irreplaceable.

An example of a moveable and irreplaceable filter holder is a disk like filter holder comprising multiple filters. Here, the apparatus can perform multiple consecutive determinations of the Radon concentration, as a filter can be rotated away from the air pathway and replaced by a new filter located on the same disk like filter holder. If multiple detectors are employed, the apparatus might measure Radon progeny decays both on the build-up and on the decay tail simultaneously.

In the illustrated embodiment (FIG. 25 to FIG. 28), two detectors are utilized inside the enclosure, both in close proximity to the two active filter areas in the applied filter holder. This is just an illustration. The actual apparatus can comprise any number of detectors and active filter areas.

Figure 29:
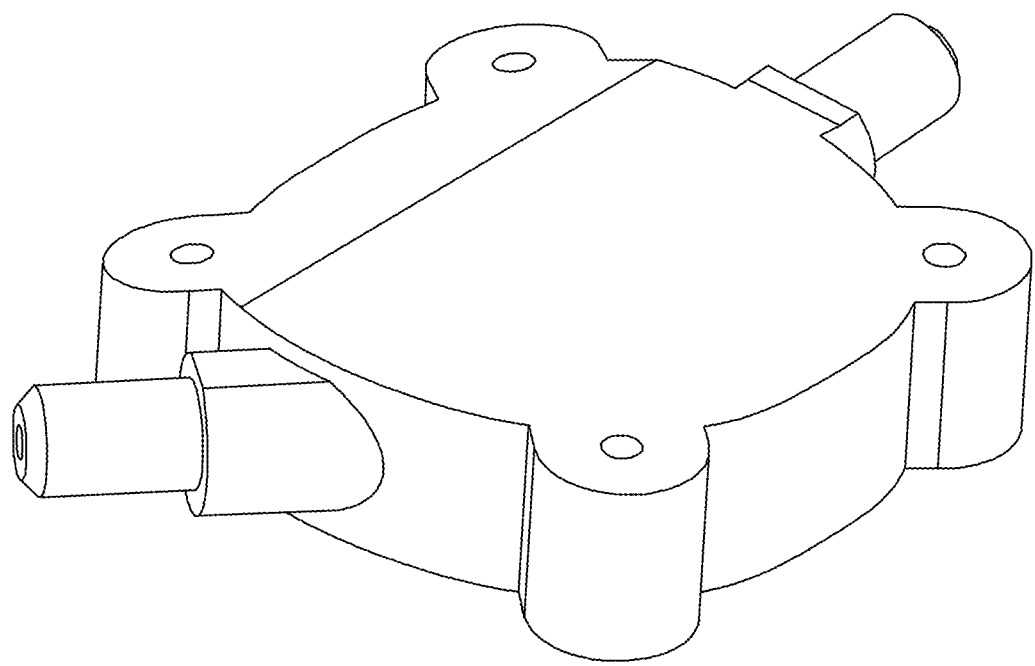
FIG. 29 illustrates a filter holder, seen from above.
Figure 30:
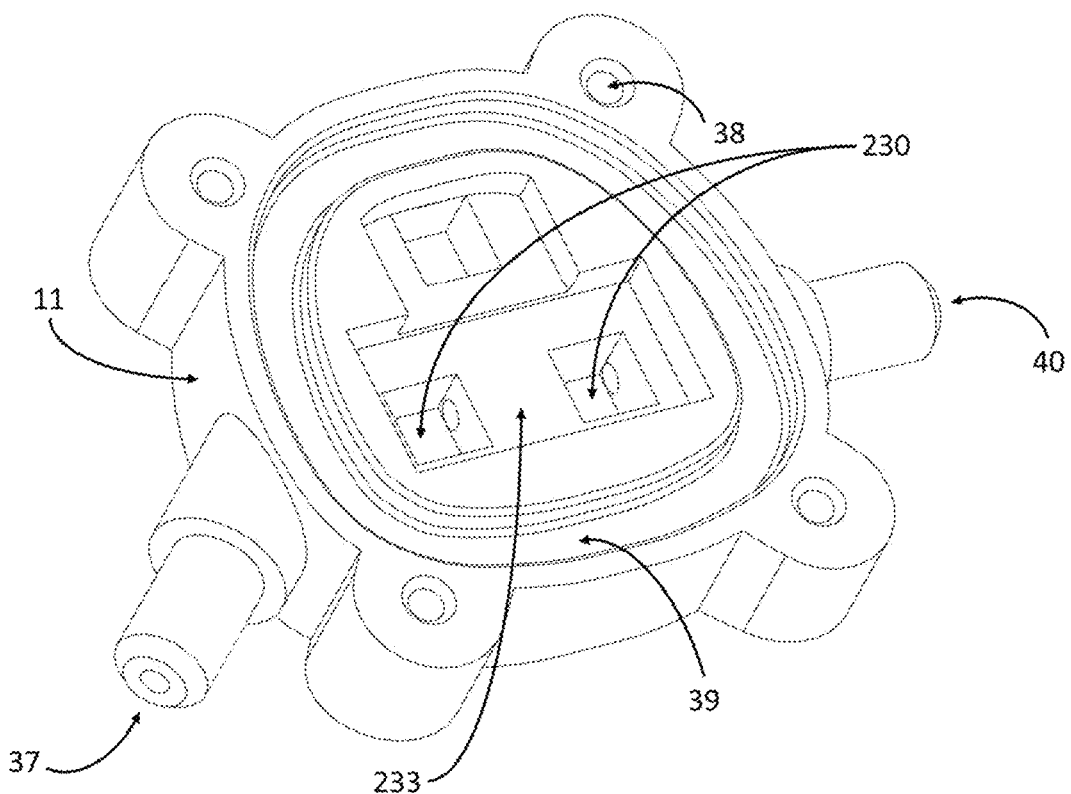
FIG. 30 illustrates a filter holder without the filter material, seen from below.
Figure 31:
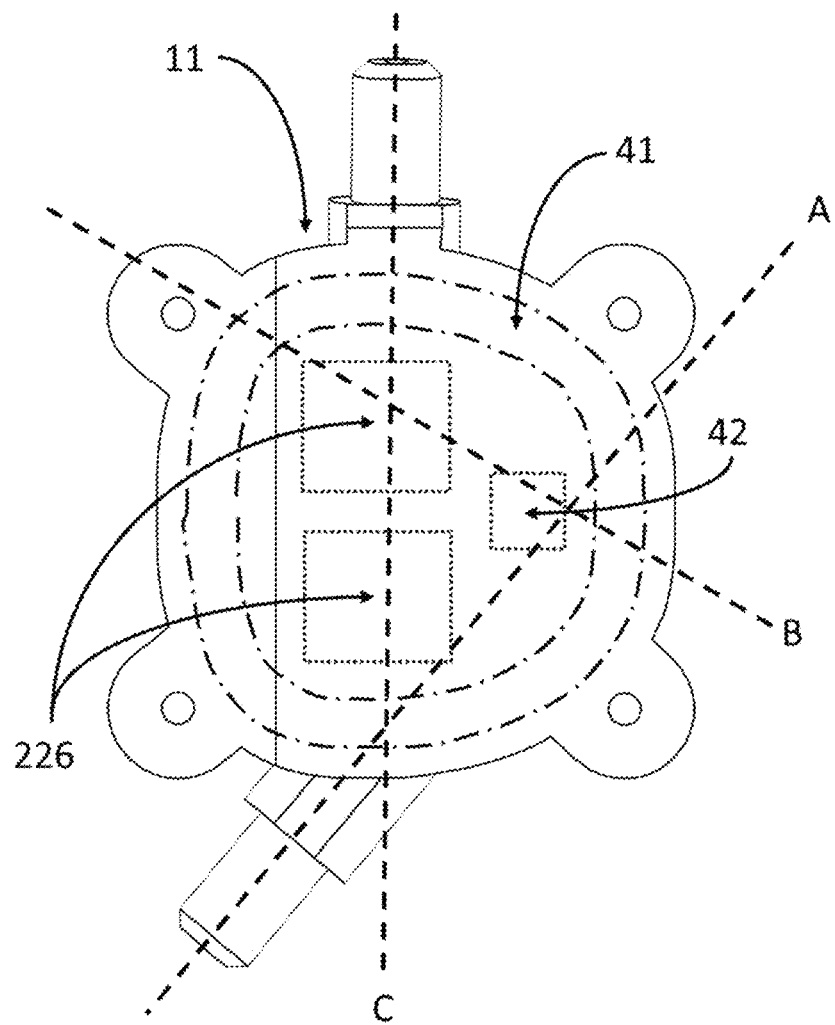
FIG. 31 illustrates a filter holder, seen directly from above. The position of the cross-sectional views in FIG. 32, FIG. 33 and FIG. 34 are shown.
Figure 32:
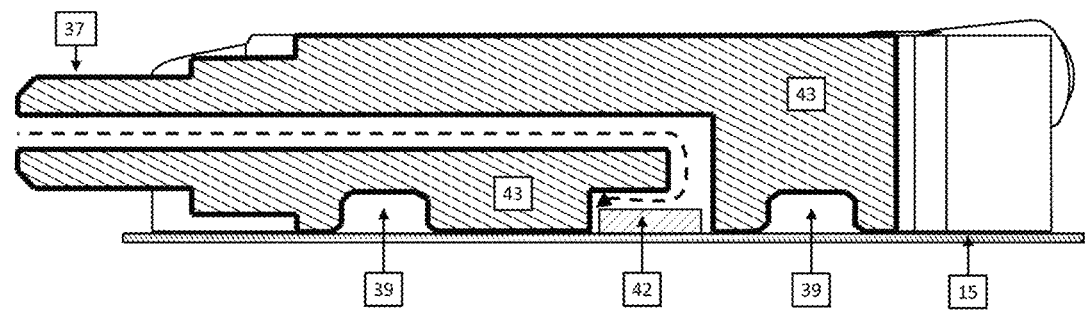
FIG. 32 Cross-sectional view (A) of the filter holder in FIG. 31. This cross-section shows the air's pathway from the inlet to the inside of the filter holder.
Figure 33:
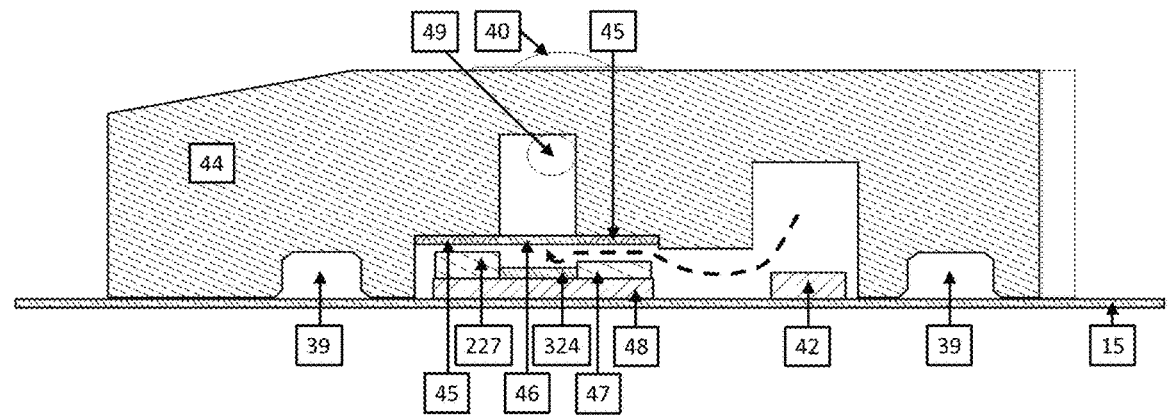
FIG. 33 Cross-sectional view (B) of the filter holder in FIG. 31. This cross-section shows the air's pathway inside the filter holder.
Figure 34:
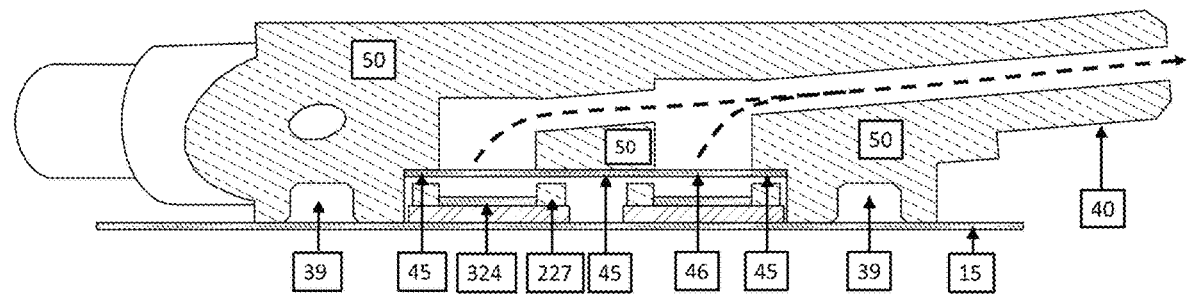
FIG. 34 Cross-sectional view (C) of the filter holder in FIG. 31. This cross-section shows the air's pathway from the inside of the filter holder to the outlet.

An example of a filter holder is illustrated in FIG. 29, FIG. 30 and in FIG. 31 and further elaborated with the cross-sectional drawings in FIG. 32, FIG. 33 and FIG. 34. FIG. 29 illustrates the filter holder seen from above, i.e. the PCB board will be mounted below.

In FIG. 30, the filter holder is seen from below. Here (11) is the filter holder, (37) is the inlet, (233) is a flat area, where the filter will be permanently attached. The two holes (230) guides the air to the outlet (40), after it passes the filter, which is not included in the figure. (38) is one of the screw holes, that will be used to attach the part to the PCB board and (39) is the groove where the packing element can be placed.

In FIG. 31, the filter holder is seen from straight above. To illustrate the inside of the filter holder, three cross-section views of the filter holder are made in FIG. 32 (marked with dashed line A in FIG. 31), FIG. 33 (marked with dashed line B in FIG. 31) and FIG. 34 (marked with dashed line C in FIG. 31), respectively. In FIG. 31, (11) is the filter holder, (226) are the two semiconductor sensors, marked with a dotted line, (41) is the packer element, marked with dashed dotted lines and (42) is the pressure measuring chip, marked with a dotted line.

The cross-section in FIG. 32 illustrates the airs pathway with a dashed arrow. (43) in the figure illustrates the filter holder surface in the cut through view, (42) is the pressure sensor, (39) is the space for the packing element, (15) is the PCB board underneath the filter holder and (37) is the air intake, which in some embodiments can be connected via a tube to a choke.

The cross-section in FIG. 33 illustrates the airs pathway with a dashed arrow. (44) in the figure illustrates the filter holder surface in the cut through view. (45) is filter material, where it has been mounted onto the filter holder in a relative impermeable manor. Here, the filter material could for example be fused or glued to the filter holder. (46) is the part of the filter material, which the air mainly passes though. The active part of the semiconductor sensor (324) is situated just below the permeable part of the filter (46). Part of the semiconductor's enclosure (227) and (47) remains on the chip. On the air intake side, the enclosure (47) is illustrated as partly removed, as it is lower than (227). This can be advantageous to aid the airflow. (48) is the bottom part of the semiconductor detector, where the detector chip manufacturer has attached the silicon chip to a little PCB board, that is then soldered onto the main PCB board (15). Notice that (324), (227), (47) and (48) as a collective is referred to as the semiconductor detector, as this is the device sold by the semiconductor manufacturer, without the cut-out in the semiconductor enclosure. (42) is an absolute pressure sensor, (39) is the space for the packing element, (49) is the hole that leads the air to the outlet (40).

The cross-section in FIG. 34 illustrates the airs pathway with a dashed arrow. (50) in the figure illustrates the filter holder surface in the cut through view, (324) is the exposed semiconductor sensor, (227) is the remaining enclosure on the semiconductor sensor and (46) is the active part of the filter that most of the air passes though. Notice that the air passes through the filter material above both the semiconductor sensors. (45) indicates the places where the filter material is inactive and attached to the filter holder, resulting in a relative airtight attachment. (39) is the place where the packer element can be placed, (15) is the PCB board underneath the filter holder and (40) is the air outlet, which in some embodiments can be connected via a tube to the air moving device.

An advantage of the illustrated filter holder, is that it can be manufactured using a mould. The holes in the air inlet and outlet can for example be drilled, or made during the moulding process, for example using mould inserts. As the hole here is straight, the insert can also be straight. If a more complex filter holder is needed, where for example three or more detectors are connected, the insert could be a spiral spring, which is then screwed out during the moulding process to connect multiple filter intakes.

Moreover, it can be advantageous if the filter holder comprises at least one material in more than a minuscule amount, which is rigid. In the cases where the holder filter is replaceable, this rigid material part of the filter holder can aid in keeping the form factor of the filter while the filter holder is inserted into the instrument. When the filter holder is fixedly positioned in the instrument, the rigid part of the filter holder can aid in ensuring the position of the filter relative to the detector and hence aid in keeping the instrument calibration valid when the instrument is handled by the user. E.g. if the user drops the instrument on the floor, the rigid part of the filter holder might hinder that recalibration or repairing becomes necessary.

In another embodiment, the filter holder comprises more than a tiny amount of at least one rigid material.

In another embodiment, the filter holder comprises more than a minute amount of at least one rigid material.

In another embodiment, the filter holder comprises more than a small amount of at least one rigid material.

In another embodiment, the filter holder comprises a bulk amount of at least one rigid material.

In another embodiment, the filter holder comprises more than 1% W/W of at least one rigid material, preferable where said filter holder comprises more than 5% W/W of at least one rigid material.

In all these cases, material applied as glue or other binding material, will generally be applied in less than a minuscule amounts, that is, the amount is less than minuscule, tiny, minute, small, bulk, 1% W/W and 5% W/W. A glue or binding material applied in less than a minuscule amount is not capable of keeping a rigid structure by itself.

A rigid material has a high enough Youngs modulus to keep the filter in place even when subjected to some force. Here, it is advantageous to look into Youngs modulus, E(Gpa) for different materials. As described in the Materials Data Book, 2011 Edition, Revised 2019, Cambridge University Engineering Department.

Here, at page 11, it is seen that typical elastomers have a Youngs modulus well below 0.01 Gpa, while rigid materials typical have a Youngs modulus at or above 0.01 Gpa. To keep the filter at a stable position, it can in some embodiments be advantageous, if the filter holder comprises a bulk rigid material with a Youngs modulus above 0.01 Gpa, 0.05 Gpa, 0.1 Gpa, 0.5 Gpa or 1 Gpa.

On the other hand, materials with a very high Youngs modulus tent to be difficult to machine. Here, Carbyne, that has a Youngs modulus of 32700 Gpa is an example of a material that would be difficult to machine into a filter holder, but also materials with a Youngs modulus above 10 Gpa, 100 Gpa, 200 Gpa, 600 Gpa, 800 Gpa, 1000 Gpa or 1200 Gpa can prove difficult to manufacture into a filter holder.

The air is forced through the filter using an air moving device. Such a device can for example be a fan, a blower, a pump and/or a compressor. As the accuracy of the determination of the Radon concentration increases with an increase in radiation counts, which again increases with the volume of air moved during the determination of the Radon concentration, it is obviously an advantage to move large quantities of air through the apparatus. On the other hand, a handheld apparatus might be powered by batteries. In this case, it is advantageous that the air moving device is small and that the power consumption is low.

The radiation from the Radon progeny can be detected using numerous different techniques. This includes an Ionization chamber, a Geiger-Müller tube, a Scintillation counter, a photoelectric tube and/or a Semiconductor detector.

Here the semiconductor detector can be made from materials such as Silicon, Diamond, Germanium, Cadmium telluride (CdTe) and cadmium zinc telluride (CZT). One advantage of applying a semiconductor detector arises from the fabrication techniques. Here, the industry has comprehensive experience with both the manufacturing of raw wafers and moreover with the techniques to produce components from such wafers. Hence, the component to component variation is minimal.

In some cases, the semiconductor detector contains one or more junctions (PN and/or PIN type). Some detectors can be operated by measuring the direct current that radiation can induce, some others can be operated in reverse bias mode. In the latter, the detector is subjected to bias in the reverse direction, hence effectively blocking all current. When radiation interacts with the detector, a small current can flow thought the sensor, which can then be detected.

In a preferred embodiment, the semiconductor detector is made from Silicon. This material comes with a number of advantages, including the cleanroom manufacturing capabilities around the world, as Silicon is the material of choice for the vast majority of semiconductors. Moreover, Silicon will naturally form a thin oxide when exposed to ambient air. This oxide layer will shield the Silicon underneath. When the alpha radiation passes the oxide layer, it is of course attenuated, but the attenuation is relatively small due to the thin layer thickness and, more importantly, the attenuation is almost constant over time. Hence the apparatus can be Radon calibrated at the manufacturing facility and when applied by the user, the attenuation from the oxide layer will be almost the same.

A radiation signal detected by a semiconductor detector will almost be a step change in voltage, where the stepping time is determined by the charge collection time of the carriers in the depleted region of the semiconductor detector (the drift time), by the charge collection time of the carriers in the undepleted region of the semiconductor detector (the diffusion time) and by the RC time constant of the semiconductor detector-circuit combination.

A possible principle for the semiconductor detector includes a Silicon Drift Detector (SSD), a Position-sensitive detector (PSD) either 1 or 2 dimensional, an avalanche diode (APD), a PN diode or a PIN diode, a charge-coupled device (CCD) or an optical DRAM sensor. Notice that the electronic circuitry that might interpret the signal from the semiconductor detector might depend on the applied detector. E.g. the signal from a photodiode might first be amplified and then it might be converted to a digital signal by an ADC. On the other hand, the signal from an APD might not need amplification due to the built-in amplification in the detector itself. A DRAM sensor will typically readout a digital signal directly, as detected radiation will have changed the value of a digital bit in the circuit. Hence, a DRAM sensor will typically function without the need of an ADC or similar circuitry.

In one preferred embodiment, the applied detector is a photodiode. The advantage of using a photodiode is that they are manufactured in large quantities and hence are commercially available. Moreover, a photodiode is usually sensitive to alpha radiation. A dedicated alpha radiation detector has the disadvantage that the cleanroom optimization is performed for a smaller production volume. In contrast hereto, commercial components, like photodiodes, are applied in numerous applications. Hence from an optimization viewpoint, it is technical smart to employ such a commercially available component. As the apparatus should not be affected by light, applying a photodiode as detector requires that the enclosure and/or other components hinders most of the ambient light in reaching the photodiode.

The described advantage originates from the extensive experience behind the manufacturing of commercial photodiodes. Hence, a photodiode is defined as any component, which was manufactured as a photodiode. As an example, a Radon apparatus manufacturer might prohibit the photodiode's ability to detect light, for example by evaporating a thin metal layer on top of the photodiode. In this case, as the original component was a photodiode, it is still considered a photodiode within this context.

Instead of applying the manufactured semiconductor detector directly as is, it can be advantageous to use a detector chip with the enclosure. If the chip with the enclosure is applied, it can be advantageous to remove at least part of the enclosure. This is because the enclosure might otherwise absorb part of the alpha radiation and hence limit the detected radiation.

The enclosure can be removed mechanical, chemical or by other means. Here, it can be advantageous to use a laser to cut away part of the enclosure. Multiple lasers are possible, including an excimer laser, a CO2 laser, a neodymium (Nd) laser and/or a neodymium yttrium-aluminium-garnet (Nd:YAG) laser. The mechanical method can include cutting and/or drilling. The chemical can include a solvent for the enclosure and possible a masking process to shield the areas where the enclosure should remain relative unaffected. Here, a masking process applied in the semiconductor fabrication industry can be advantageous.

The electrical signal can be detected directly, or it can be enhanced by one or more amplifiers before the signal is processed. As the radiation signal is almost a step function, the frequency span of the radiation signal is quite wide. Hence, the output from the amplifier will in part be determined by the design of the amplification circuit. The amplifier circuit can be either inverting or non-inverting and/or a combination hereof.

Normally, the amplification factor is determined by a resistor and/or capacitor combination connected to the amplifier. As it is desirable to ensure the same amplification factor over a wide range of temperatures it can be advantageous to use one or more C0G or NP0 capacitors. This also aids in ensuring favourable aging properties.

In one preferred embodiment, the amplifying circuit consist of four inverting amplifies in series. The resulting signal is therefore non-inverted. An example of such circuitry is given in the application note AN2236 entitled Gamma-Photon Radiation Detector by Maxim integrated products from Sep. 22, 2003, hereafter referred to as AN2236. Even though this circuit is aimed at detecting gammy ray radiation from a smoke detector source (AM-241), its amplification degree can be adjusted to accommodate the alpha radiation from the Radon daughters by choosing the resistors and capacitors carefully. Moreover, the applied amplified can be changed to other suitable amplifiers, including the amplifiers directly in family with the applied circuit.

As mentioned in the application note, it is also advantageous to limit the capacitance of the employed semiconductor detector, which in practice scales with the active area of the detector. Hence, a small area semiconductor detector is preferable to limit the electrical noise.

Figure 35:
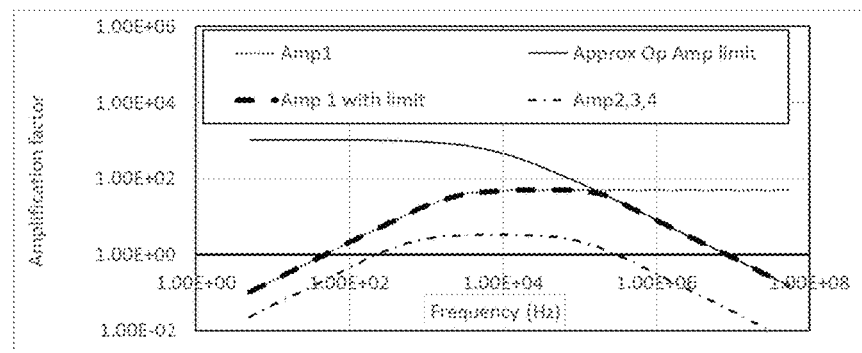
FIG. 35 shows a possible amplification implementation, where the amplification of the radiation signal is relatively stable, using logarithmic scales for both axis.

In one embodiment, the amplifying circuit is made using four amplifiers, all embodied in a single IC. The amplification of this embodiment is shown in FIG. 35. The dotted line (Amp 1) shows the amplification of the first amplifying circuit, if the amplifier is perfect. In reality, the amplifier is frequency limited. This is illustrated with the solid line (Approx Op Amp limit). This limitation of an amplifier is usually stated in the manufacturer's datasheet. Hence, the actual amplification from the first amplifier is limited at high frequencies. This is illustrated with the thick dashed line (Amp 1 with limit). After the signal is amplified by the first amplifying circuit, it is amplified by three identical circuits, illustrated in the figure with a dash dotted line (Amp 2,3,4). Notice that the amplification of circuit 2, 3 and 4 are not affected by the limitation of the amplifier.

The advantage of this difference in amplification is explained in AN2236. Here, the second amplifying circuit enhances the thermal noise of the first 1 k resister. For the embodiment illustrated in FIG. 35, the value of the similar resistor is 5.1 k. The thermal noise from this resistor is amplified by amplifier 2, 3 and 4. In one embodiment, this noise is around 0.1 mVRMS at 80 Celsius. As the resistance between the detector and the amplifier is not 0 (the ideal case), the first amplifier also enhances thermal noise. As the resistance is low, and possible only caused by the trace resistance in the PCB connection, the amplified noise by amplifier 1, 2, 3 and 4 due to the trace resistance is around 0.01 mVRMS. Hence, if the circuit is only optimized for minimal total noise, it could be advantageous to increase the amplification of circuit 1 and decrease the amplification of circuit 2, 3 and 4. This would however mean that the limit of the amplifier (continues thin line in FIG. 35) would matter more.

Figure 36:
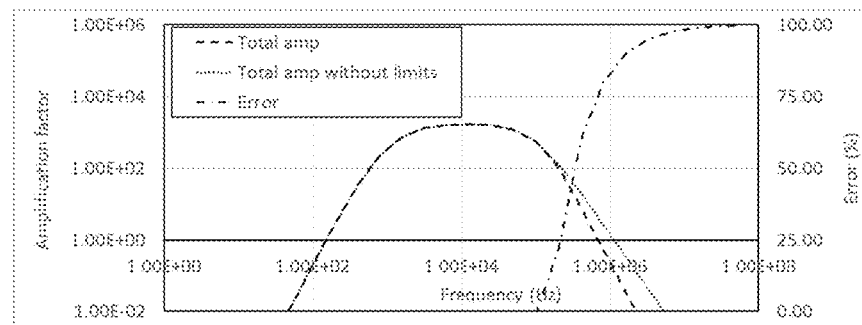
FIG. 36 shows the same amplification implementation as FIG. 35. Here, the focus is the amplification error due to the limitation of the operational amplifier vs frequency, using logarithmic scales for the frequency axis and for the amplification factor, while the error axis is linear.

The total amplification of the 4 amplifiers from FIG. 35 is illustrated in FIG. 36. The dotted line (Total amp without limits) shows the total amplification, that would materialise, if the amplifier in circuit 1 is perfect. The dashed line (Total amp) includes the limitation due to the amplifier. Both of these curves refer to the left side scale. The dash dotted line (Error) shows the percentual error between the perfect and the actual amplification. Notice that at the section where the amplification is maximal (from around 3.2 kHz to around 50 kHz), the error due to the amplifier limitation is nil.

This is advantageous, as the amplifier limitation will both differ between circuits, but also because the amplifier limit can be temperature dependent. In this embodiment, the resulting amplified signal, will be relatively unaffected by fluctuations in the amplifier's performance. The relative wide frequency range with a high and almost constant total amplification is also advantageous. The alpha decay detection is almost instantaneous. As said, the drift and diffusion time of the semiconductor detector, will limit the frequency of the step like responds to the alpha particle absorption. Moreover, if an amplifying circuit is applied, its characteristic will influence the form of the signal that is measured by the ADC and/or comparator. If the amplification is a thin peak, the amplified signal will be more like a continues wave and can even result in multiple oscillations. As the step like function in this case is purely resembled, the signal size (like voltage peak to peak) will be attenuated. Hence, it can be advantageous with a relative broad amplification window.

Figure 37:
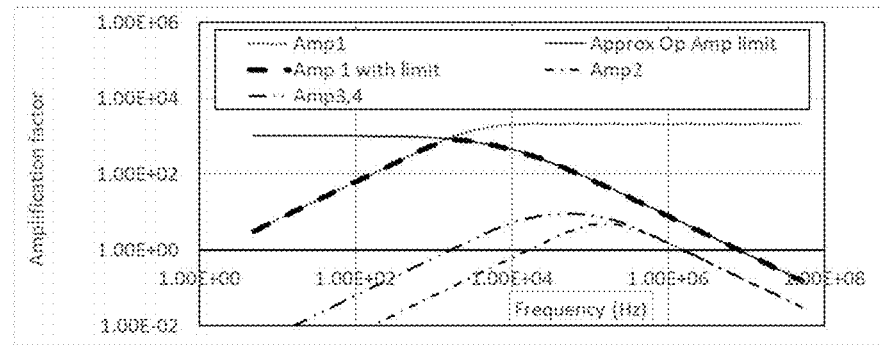
FIG. 37 shows a possible amplification implementation, where the amplification of the radiation signal is somewhat unstable, using logarithmic scales for both axis.

To demonstrate the advantage of the embodiment illustrated in FIG. 35 and FIG. 36, the same plots are made using the components described in AN2236. Notice that said application note's purpose is to detect radiation using a semiconductor detector. The amplification for said application note is illustrated in FIG. 37, where the dotted line (Amp 1) shows the amplification of the first amplifying circuit, if the amplifier is perfect. In reality, the amplifier is frequency limited. This is illustrated with the solid line (Approx Op Amp limit). This limitation of an amplifier is usually stated in the manufacturer's datasheet. Hence, the actual amplification from the first amplifier is limited at high frequencies. This is illustrated with the thick dashed line (Amp 1 with limit). After the signal is amplified by the first amplifying circuit, it is amplified by amplifier 2, illustrated in the figure with a dash dotted line (Amp 2). Thereafter the signal is amplified by two identical circuits, illustrated in the figure with a dash dotted line (Amp 3,4). Notice that the amplification of circuit 2, 3 and 4 are not affected by the limitation of the amplifier.

Figure 38:
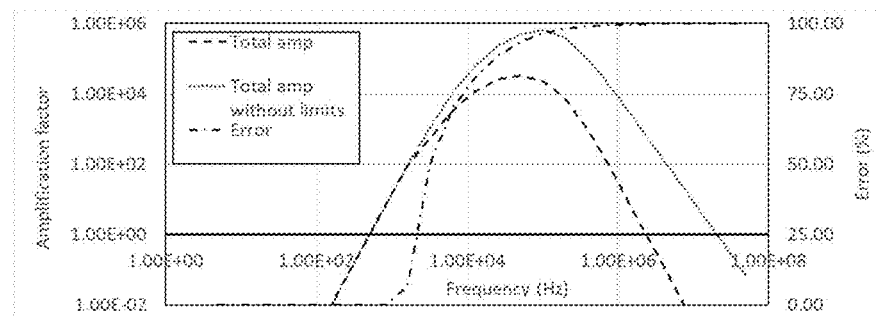
FIG. 38 shows the same amplification implementation as FIG. 37. Here, the focus is the amplification error due to the limitation of the operational amplifier vs frequency, using logarithmic scales for the frequency axis and for the amplification factor, while the error axis is linear.

The total amplification of the 4 amplifiers from FIG. 37 is illustrated in FIG. 38. The dotted line (Total amp without limits) shows the total amplification, that would materialise, if the amplifier in circuit 1 is perfect. The dashed line (Total amp) includes the limitation due to the amplifier. Both of these curves refer to the left side scale. The dash dotted line (Error) shows the percentual error between the perfect and the actual amplification. Notice that at the section where the amplification is maximal (from around 25 kHz to around 100 kHz), the error due to the amplifier limitation is above 80%. Hence the amplified signal is more prone to fluctuations in the amplifier's performance.

To describe the error introduced by the amplifier, the error is defined as the minimal error in proximity to the maximal amplification frequency, where the 3 dB proximity is defined as within 3 dB amplification of the maximal amplification. For AN2236, the 3 dB limit is from around 20 kHz to around 100 kHz, where the corresponding error is just above 80% at the low frequency limit going up to around 95% at the high frequency limit. In this case, the described amplifier error is just above 80%.

Determining the error requires knowledge of the amplifier's limits. Here, the applied limitation is the typical limitation stated in the manufacturer's specifications. If such specification is unavailable and the manufacturer upon request does not provide such information, the typical amplifier limitation can be determined by measuring on several components.

As the amplifying circuit normally enhances the signal by several orders of magnitude, it is preferred to avoid electrical disturbance from either internal or external sources.

One method to limit the electrical noise is to place the semiconductor detector and the amplifying circuits on the same PCB board, as this allows for minimal distance between them and also ensures repeatability from product to product. In the case where the signal is detected without amplification (e.g. directly by an ADC), it is advantageous to have the detector and the ADC on the same PCB board. Here, the semiconductor detector is defined as being located on the same PCB board as at least part of the electronic circuitry, when said part of the electronic circuitry handles an analog signal from said detector. This also comprises the case, where the electronic components are integrated in the detector IC. That is if the detector IC comprises one or more amplifier(s) and/or a comparator and/or ADC(s) and hence outputs a signal that is relatively immune to noise.

In another embodiment, the noise is reduced by having the semiconductor detector and the amplifying unit (or ADC, if no amplification is applied), in the same enclosure. This is advantageous, as it is easier to control the devices inside an enclosure and hence limit the noise.

As electrical disturbance tents to happen at higher carrier frequencies in the MHz to several GHz regime and as the amplified electrical signal due to a Radon decay can be adjusted to frequencies below this, it is possible to employ passive filtration to exclude the noise. In one preferred embodiment, this is achieved using one or more ferried beads, which is a low pass filter without significant DC resistance. Here, both the power input to the amplifying circuit, the output signal and the ground level can advantageously be filtered.

Moreover, standard low pass RC filters can also be applied. In one embodiment, the amplifying circuit is connected to 2 inputs, namely the signal from the semiconductor sensor(s) and a reference voltage level, it is advantageous to filter both. Here a first order, a second order, a third order and so forth filters can be applied. In one preferred embodiment, third order filters are applied. The signal from the semiconductor sensor(s) is affected by noise both from the high voltage side and from the ground side. This noise can also be limited by employing a RC filter. In one preferred embodiment, a third order filter is employed both for the high voltage and the ground side of the semiconductor sensor(s).

The noise can also be suppressed by encapsulating the semiconductor sensor(s) and at least the first amplifier inside a Faraday cage. Here, it is advantageous that one side of the cage is the PCB board. The rest of the Faraday cage can for example be implemented by placing a conducting housing on top of the PCB board.

Additional noise reduction can be obtained by employing an LDO regulator. This can also be placed under the Faraday shield.

One way to detect the electrical signal originating from radiation is to use a comparator to determine if the signal voltage reaches a threshold. This event can be used directly to count radiation or in a further refinement, the comparator can trigger an analog to digital conversion (ADC), where the measured value is then used to determine if the signal arises from Radon progeny decay and/or what Radon progeny caused the signal.

It is also possible to use a continues ADC and then count the instances where the signal reaches a certain value or interval. An example of a radiation measurement is plotted in FIG. 39.

In some cases, the form of the signal curve can be determined by multiple ADC conversions, and the curve form can then be compared to a predefined curve, which for example could be the curve that a Radon decay is expected to result in. This can be done by a multitude of methods comprising Fourier transform, cross-correlation and/or convolution. In this case, it can be advantageous to use a digital signal processor (DSP).

It should be noticed that the optimal amplified signal, which can be engineered by adjusting the amplification circuit, depends on the detection method. A comparator is generally a fast component and if the signal is only detected by the comparator, it can be advantageous to design the amplifying circuit so it predominantly enhances high frequency signals. If the signal is detected (possible after amplification) by an ADC, then it is advantageous to choose a frequency band that is in line with the detection speed of the ADC.

Figure 40:
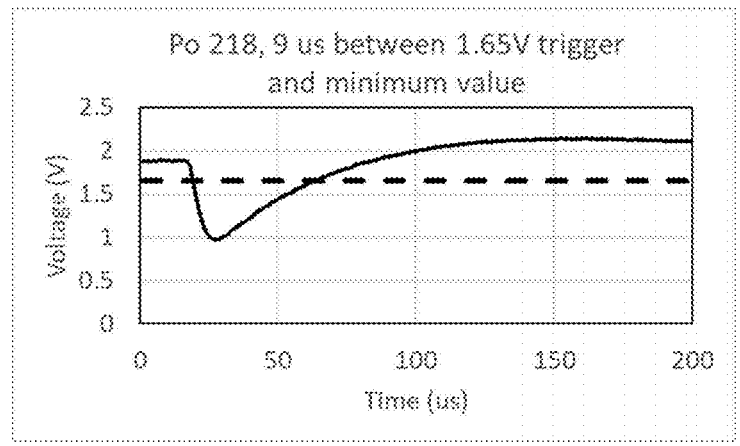
FIG. 40 shows an example of a measured electric responds after amplification to alpha radiation for a possible embodiment, with an indication of the comparator triggering voltage, using linear scale.

If the ADC has sample and hold capability, this can be employed to capture the extreme value of the signal. Here, a comparator reference value can be selected and the chip can be programmed or otherwise set-up to make an ADC when the comparator is triggered. This is illustrated in FIG. 40, where the continues measured ADC value is plotted for a radiation event. As seen, the signal voltage (solid line) starts as an almost constant value. When the radiation is detected, the voltage drops relatively abruptly and then the voltage recovers again. The overshoot after the event is caused by the AC coupling of the amplifying circuit. The stippled line indicates the comparator voltage.

In one embodiment, when the signal voltage drops below the comparator voltage, an ADC event is triggered. It can begin with a sample and hold of the voltage before the conversion is made. In this case, the timing of the sample and hold can be chosen according to the expected signal, such that the minimum voltage is recorded. This adjustment can both include choosing an appropriate ADC circuit and moreover adjusting the value of the comparator voltage.

It is moreover advantageous if the comparator voltage crosses the radiation signal at a point where the slope of the radiation signal is high. This is because the time uncertainty of the comparator triggering is minimized by a fast change in the signal voltage. In the example illustrated in FIG. 40, the time between the comparator triggering and the minimum signal voltage is around 9 us. This value will of course depend on the apparatus, as it depends on the applied semiconductor detector, the possible amplifying circuit amongst other things.

Notice, in one preferred embodiment, the continues signal curve shown in FIG. 40 is recorded by external electronic circuitry. In this embodiment, the apparatus itself only records a single value for the decay, that is an ADC value triggered by the comparator event.

Figure 41:
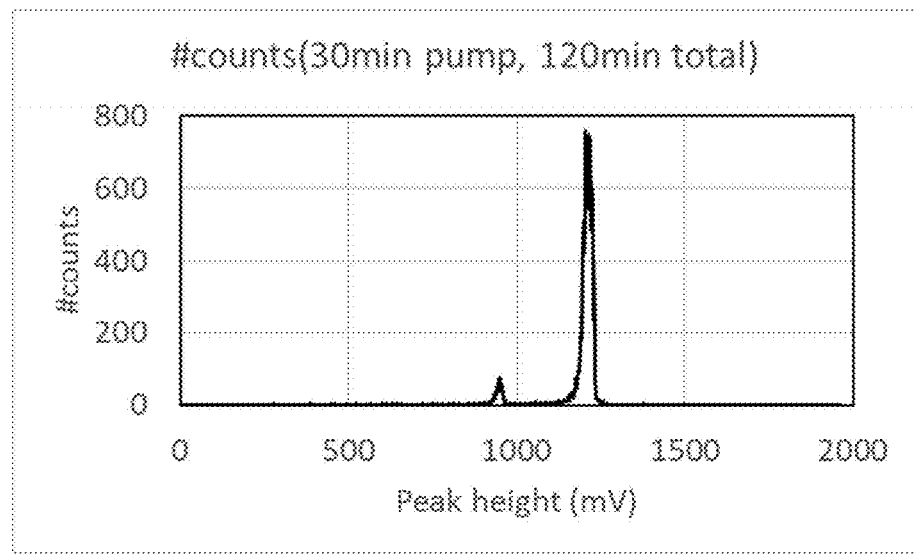
FIG. 41 shows an example of a histogram for the measured alpha radiation signal voltages after amplification detected during a Radon measurement, for a possible embodiment, using linear scale.
Figure 42:
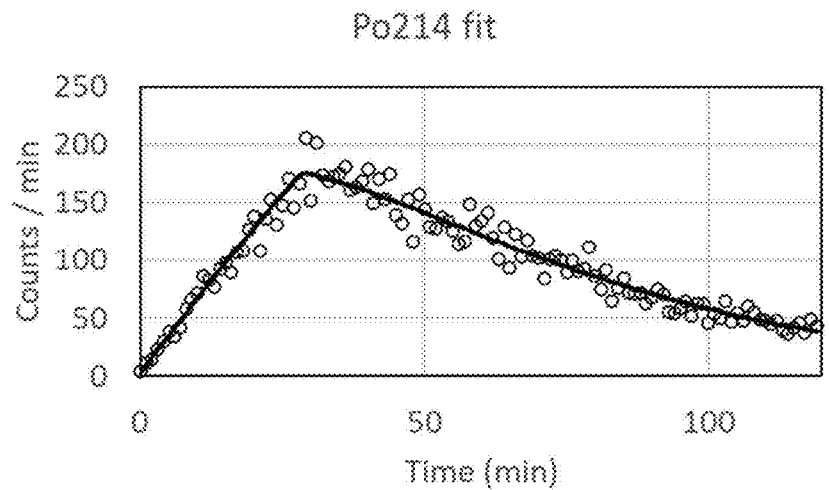
FIG. 42 shows a possible interpretation of the Po-214 counts vs. time for the measurement shown in FIG. 41, using linear scale.
Figure 43:
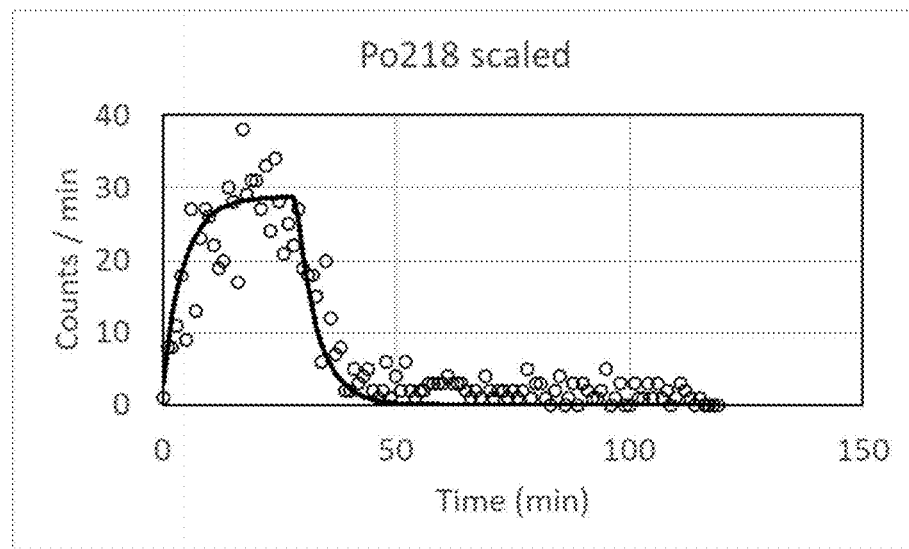
FIG. 43 shows a possible interpretation of the Po-218 counts vs. time for the measurement shown in FIG. 41, using linear scale.

In FIG. 41, the result obtained from a measurement where air was pumped through a filter for 30 minutes, whereafter the tail was monitored for 90 minutes is plotted. The small peak just below 1000 mV is the 6.0 MeV Polonium-218 alpha decay and the peak around 1200 mV is the 7.69 MeV Polonium-214 alpha decay. When values below 1070 mV are counted as Polonium-218 decays and values above are counted as Polonium-214 decays, then one can determine each decay activity vs. time. This is illustrated in FIG. 42 for Polonium-214, where the round rings represent the measured decay rate at a given time. The solid line shows a fitted curve of the simulated decay rate. The fitting factor is solely a scaling factor. In FIG. 43, the decay rate for Polonium-218 is shown. Here, the round rings represent the measured decay rate at a given time. The solid line shows a scaled curve of the simulated decay rate. The scaling factor is the fitting factor from the Polonium-214 plot.

The measurement illustrated in FIG. 41 was performed using a semiconductor detector that was configured to spectrally resolve alpha radiation and output a detector signal corresponding to the energy levels of the detected alpha radiation connecting to electronic circuitry that can spectrally resolve the radiation signal. In this document, a detector is defined as configured to spectrally resolve alpha radiation, when the signal output from the detector can be used to distinguish between alpha energy levels. Moreover, the electronic circuitry is defined as being capable of spectrally resolving the radiation signal, when it has the capability to distinguish between different radiation sources and in some embodiments between one or more of the Radon progeny's decays.

As an example, an apparatus that can distinguish between the decay of Polonium-214 (7.69 MeV) and Polonium-218 (6.00 MeV) has alpha radiation spectrometry capability. Such an apparatus could implement an ADC or in a simpler version just two comparators with different activation voltages. Other examples of Radon progeny radiation energies are illustrated in FIG. 5. On the other hand, an apparatus that can only determine if radiation is detected, but not differentiate between any Radon progeny sources, does not have alpha radiation spectrometry capability. The latter is usually the case for an apparatus that applies a semiconductor DRAM sensor, uses an ion chamber or a Geiger Müller tube, as these detectors only indicate that radiation is detected but lacks the ability to spectrally resolve the radiation. Another example is an apparatus that only applies a single comparator that distinguishes between no radiation and detection of radiation. Such an apparatus does not have alpha radiation spectrometry capability.

In one embodiment, such electronics circuitry comprises a comparator and a timer. Here, radiation with energy above a certain level will trigger the comparator, which enables the distinguishing between the specific decay and less energetic decays. To distinguish the specific decay from more energetic decays, the timer can be used to determine how long time the comparator is triggered. Here, more energetic decays will trigger the timer for a longer time.

In another embodiment, the electronic circuitry comprise an ADC, which directly allows discrimination between different energy levels.

Figure 39:
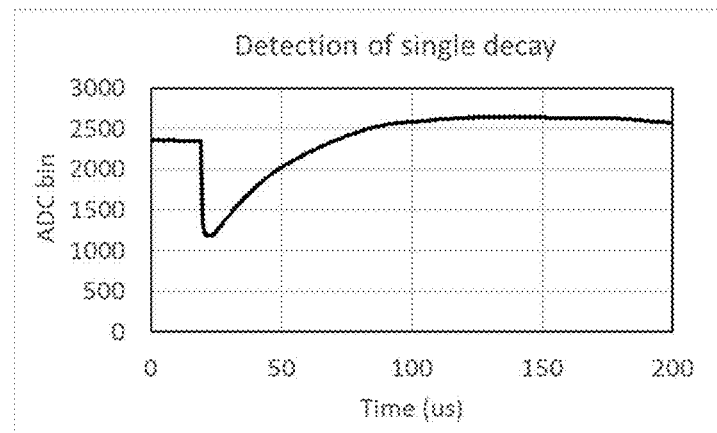
FIG. 39 shows an example of a measured electric responds after amplification to alpha radiation for a possible embodiment. Here the scale is ADC bin (0 to 4095, with a reference voltage of 3.3V), using linear scale.

The example described above illustrates the need for determining when a decay is assigned to a specific decay based on the signal height, or other signal characteristics like area under the curve (below for example the non-signal value) in FIG. 39, the absolute area away from the non-signal value and/or time between crossing the comparator line first and second time.

Figure 44:
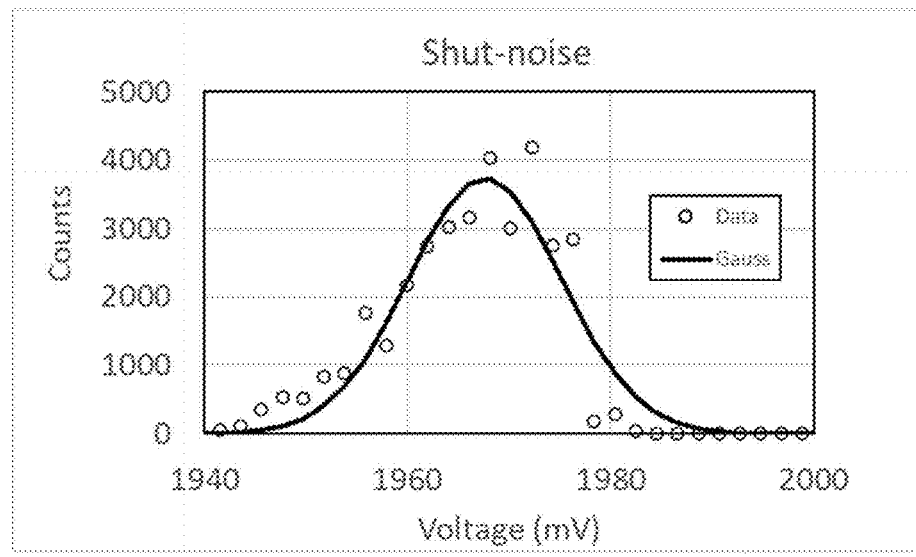
FIG. 44 shows a measurement of the approximate gaussian noise from a detecting circuit, using linear scale.

As the peaks shown in FIG. 41 are non-Gaussian, due to the combination of normal noise (Gaussian) and the path length distribution (FIG. 23), it is advantageous if the discriminating voltage used to bin the decays as either Polonium-218 or Polonium-214 decays takes this into account. This can be done by measuring the shut-noise, i.e. multiple ADC conversions of the non-signal value. An example of this is plotted in FIG. 44. By adding the determined Gaussian error with the distribution function due to the path length difference, one can determine the signal distribution from the individual radiation energies. The optimal discriminating value can then be chosen, for example in such a way that it will be equally wrong in both directions. For the case illustrated in FIG. 41, this means that the amount of Polonium-214 decays wrongfully identified as Polonium-218 decays will on average equal the amount of Polonium-218 decays wrongfully identified as Polonium-214 decays.

A more simplistic method is to choose the mid-point value between the 2 peak values in FIG. 41 as the discriminating value.

The detected radiation might be interpreted by an electronic processing unit, which might also include other factors in the interpretation like the airflow, the temperature, the pressure, the humidity, the $CO_2$ concentration or other similar factors. The term electronic processing unit comprises general- or special-purpose programmable microprocessors, Digital Signal Processors (DSP), Application Specific Integrated Circuits (ASIC), Programmable Logic Arrays (PLA), Field Programmable Gate Arrays (FPGA), Graphical Processing Units (GPU), special purpose electronic circuits, etc., or a combination thereof. The electronic processing unit may be an electronic processing unit integrated into an embodiment of the apparatus disclosed herein or it may completely or partly be implemented as an electronic processing unit separate from the apparatus, e.g. as a data processing unit of a computing device or other data processing system external to the apparatus disclosed herein. The electronic processing unit may be implemented as a single component or as multiple components, e.g. as a distributed signal and/or data processing architecture.

The electronics that process the signal from the semiconductor detector is in this document referred to as the electronic circuitry. The electronic circuitry possibly comprises an amplifying circuitry, it possibly comprises a comparator, an ADC and/or other means for converting the possible analog signal into a digital signal. The electronic circuitry comprises the electronic processing unit that uses the input data to determine the Radon concentration in the air. Said input data comprises data from the semiconductor radiation detector. It might moreover comprise data related to the airflow, it might comprise temperature, pressure, humidity and/or CO2 or other relevant information about the air, it might also comprise various QC parameters like the pump rotation speed, the power consumption of various components, the voltage levels present in the applied electronics and relevant user inputs like the conversion factor (f), ambient condition data or otherwise.

If the apparatus is connected to an external device with computational abilities, then some of the calculation and data storage task can be handled by the external device. An example of such a use of external computational ability is that the comparison between the radiation decay curve form (see FIG. 39 as an example of a possible curve form for a radiation decay) and the expected curve form can be performed by the external devise. Here, it might not be the external device, which is in direct communication with the apparatus that performs the calculation. The external device might forward the job to another computer. One example of this, is that the apparatus is connected to a mobile phone, which in turn gets the calculations performed in the cloud.

Another calculational task, that the apparatus might get done externally, is the comparison between the detected radiation vs. time and the expected radiation vs time. Here an example of the expected radiation vs. time curve form is shown in FIG. 9.

When the apparatus is Radon calibrated, it can be advantageous to combine some or all of the possible variables in one or more individual calibrations. The count rate will for example depend on the actual filter/detector positioning, both in the X/Y plane, the possible angle between the active detector area and the active filter area and the distance between the filter and the detector. Moreover, the detector efficiency can also vary from device to device, even if these are manufactured similarly. The hole size in the filter can also vary and the airflow establishment can also be calibrated.

As the aim of the apparatus is to determine the Radon concentration, each individual parameter does not necessarily need to be determined. In some cases, it is enough to determine the count rate when measuring in a controlled atmosphere and then applying a single multiplication number to calibrate the apparatus. In other cases, it is necessary to determine one or more parameter(s) in detail, while the remaining parameters effect can be determined collectively instead of individually. An example of this is that it can be necessary to determine the choke's effect individually, as the impact of the choke size might vary with ambient condition (pressure, temperature, humidity and/or CO2 concentration). On the other hand, all the parameters that determines the filter/detector efficiency might in this example be combined to a single calibration parameter.

Some external devices can also be used to display the result. Here, an example is a phone that is connected to the apparatus by a wire, wireless or by other means. It is also possible to display the result directly on the apparatus, for example via a display.

It is advantageous if the apparatus is portable, as it should be easy for the user to determine the Radon concentration in a dwelling. If the apparatus is battery powered, it will support the portability. Here it can be advantageous to employ a voltage regulating mechanism, like a buck, boost, buck-boost or Ćuk converter or a LDO regulator to ensure an almost constant voltage to at least parts of the electronic devices employed in the apparatus. More than one mechanism can be combined together in the apparatus.

In one embodiment, the battery voltage is passed through a step-down converter before being employed in the apparatus. Here four AA batteries are combined in series. The voltage output of the converter is 3.3V, which ensures that almost all the power in the batteries can be consumed before the battery voltage decreases below the voltage needed to keep the 3.3V output from the step-down converter.

In one embodiment, the step-down 3.3V is used to power all the non-sensitive electronics, like the air moving device, the CPU, the digital part of the pressure and humidity sensor and a shift register chip. Moreover, in this embodiment, the step-down 3.3V is also used as input for a boost converter. The boost converter produces around 5V. This voltage is used both to power a display and to power a LDO regulator. The latter produces 3.3V, which is used to power the analog side of the pressure and humidity sensor, the semiconductor radiation sensor, the amplifying circuit and a voltage reference diode used as reference for the ADC converter integrated in the CPU.

One advantage of employing a constant voltage to the air moving device, is that the flow rate is more uniform. If an air moving device is driven by battery voltage directly, it can result in a fluctuating flow rate, which again will impact the form of the radiation build-up and decay.

In one embodiment, the CPU controls the air moving device via a MOSFET, the shift register and the display contrast via a PWM output connected to a MOSFET, which output is filtered by a resister and a capacitor. Moreover, the CPU controls whether the 5V is enabled and the low side connectivity from the display via the shift register. The display contrast is here adjusted by applying an almost constant voltage at the display LED backlight output voltage. This is done, as the display contrast is optimal when the voltage over the LED backlight is adjusted to a certain level. To allow for variation between displays and possible also to enable user control of the contrast, the output voltage from the LED backlight is controlled by the CPU.

One advantage of letting the CPU control the power to the auxiliary electronics, is that it allows the CPU to limit the apparatus's power usage. This can be advantageous, as the apparatus might monitor the wait time after the last determination of the Radon concentration and report, when it is ready for a new determination of the Radon concentration. In this case, it is advantageous if the user leaves the apparatus powered on, as the apparatus needs to count the time until it is ready for another determination of the Radon concentration. To avoid battery drainage, some apparatuses can automatically enter a low power mode after the determination of the Radon concentration is complete.

The power consumption in the low power mode depends on multiple factors, including if some or all of the applied auxiliary electronics can be powered down. It is advantageous if the power consumption can get below 100 mA, as AA batteries normally has a power rating around 3.000 mAh. In this case, the typical battery lifetime can be extended to around 30 hours.

If the apparatus is carefully designed, the low power consumption can be around 40 uA, hence allowing a battery lifetime of around 8.5 years. It is of course difficult to reduce the power consumption to this level, and therefore a compromise might be needed, where it is accepted that the apparatus has a higher power usage in the low power mode, up to and including a power consumption of 200 mA. This can for example be 1 uA, 5 uA, 10 uA, 50 uA, 100 uA, 500 uA, 1 mA, 5 mA, 10 mA, 50 mA, 100 mA and 200 mA.

The current usage is defined as the current the apparatus receives (e.g. from the batteries or from an external source), when these are delivering the nominal voltage. E.g. for an AA battery, the nominal voltage is around 1.5V. The current usage in the low power mode is moreover defined as the average consumption over a longer time span.

It can also be advantageous to let the CPU monitor the voltages applied in the apparatus, as it can then detect errors that might affect the Radon measurement result. This allows the CPU to inform the user of possible errors. In one embodiment, the CPU monitors the battery voltage, the 3.3V step-down voltage, the 3.3V LDO voltage, the 5V boost voltage, and the voltage in part of the filter applied at the output side of the semiconductor detector. Part of these voltages are observed using resistors to attenuate the voltage by a factor, to ensure that the voltage is within the range of the ADC. This range can be determined by the CPU, using a reference diode voltage for comparison. In other embodiments, the CPU can also use an internal reference. In other embodiments, the ADC can be a separate component that can use an external or internal reference voltage.

The apparatus can also monitor the total power consumption since last battery change. This can be used to warn the user in due time before the batteries needs to be replaced. The advantage of such a warning is that it limits the risk of battery failure during a Radon measurement.

Figure 45:
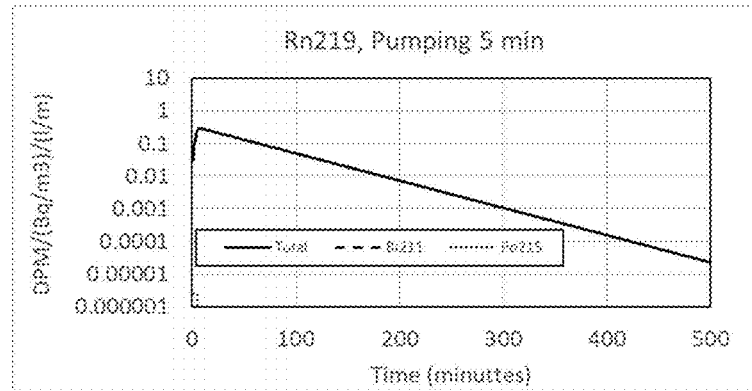
FIG. 45 shows the simulated decay from a filter due to Radon-219 progeny, collected over 5 min, using logarithmic scale for the y-axis and linear scale for the x-axis.
Figure 46:
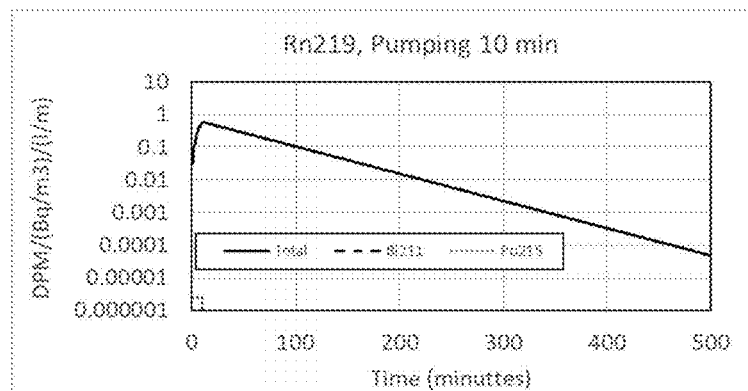
FIG. 46 shows the simulated decay from a filter due to Radon-219 progeny, collected over 10 min, using logarithmic scale for the y-axis and linear scale for the x-axis.
Figure 47:
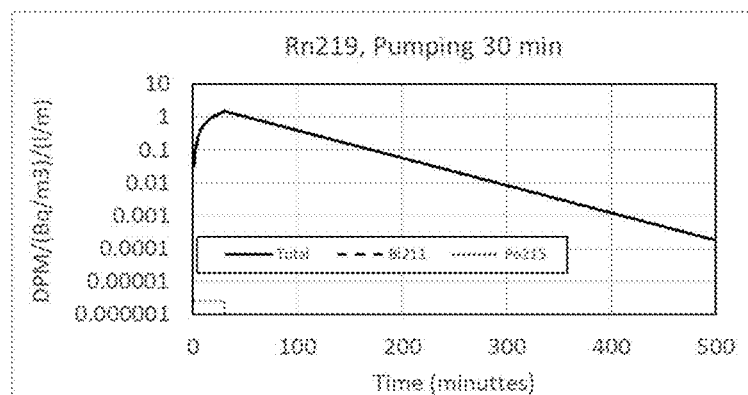
FIG. 47 shows the simulated decay from a filter due to Radon-219 progeny, collected over 30 min, using logarithmic scale for the y-axis and linear scale for the x-axis.
Figure 48:
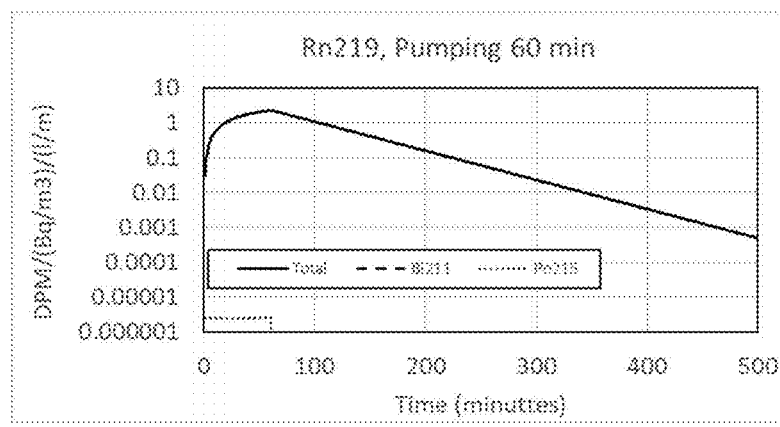
FIG. 48 shows the simulated decay from a filter due to Radon-219 progeny, collected over 60 min, using logarithmic scale for the y-axis and linear scale for the x-axis.
Figure 49:
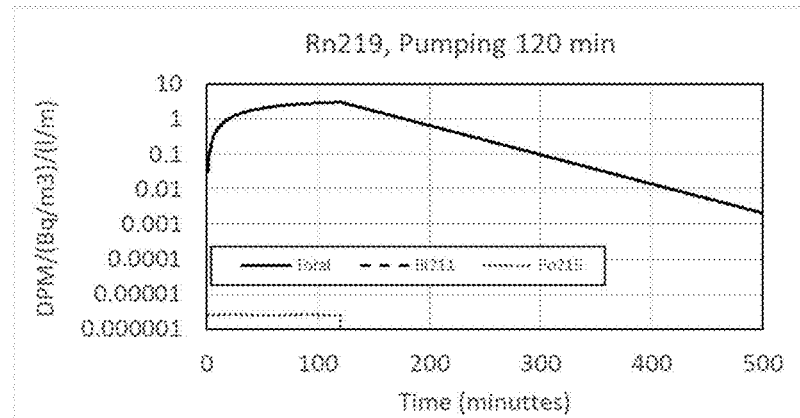
FIG. 49 shows the simulated decay from a filter due to Radon-219 progeny, collected over 120 min, using logarithmic scale for the y-axis and linear scale for the x-axis.
Figure 50:
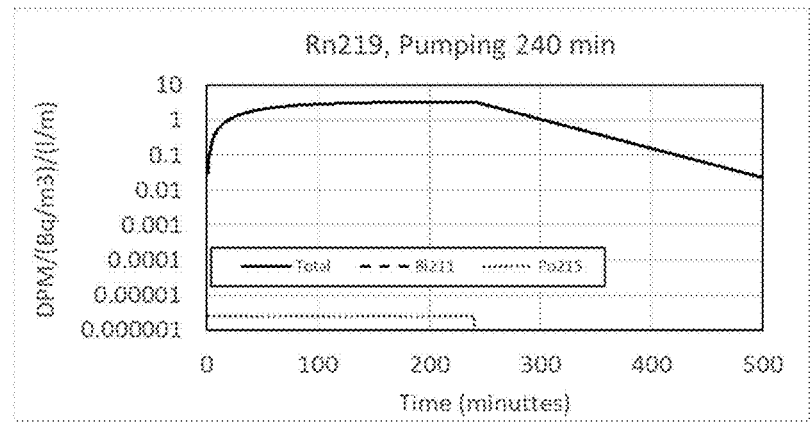
FIG. 50 shows the simulated decay from a filter due to Radon-219 progeny, collected over 240 min, using logarithmic scale for the y-axis and linear scale for the x-axis.

To illustrate the recorded signal during a determination of the Radon concentration, for a variety of air moving times, several finite time calculations were performed. For Radon-219, its progeny's decays pr minute (DPM) is plotted for a 5 minute air moving time (FIG. 45), a 10 min air moving time (FIG. 46), a 30 minute air moving time (FIG. 47), a 60 minute air moving time (FIG. 48), a 120 minute air moving time (FIG. 49) and a 240 min air moving time (FIG. 50). These plots only illustrate a handful of the possible air moving times for the apparatus, which in some configurations can be 5 seconds, 10 seconds, 30 seconds, 1 minute, 3 minutes, 5 minutes, 10 minutes, 15 minutes, 20 minutes, 30 minutes 40 minutes, 50 minutes, 60 minutes, 70 minutes, 80 minutes, 90 minutes, 120 minutes or even longer air moving times. The air moving time should be conveniently short for the user while allowing for a reasonable Radon measurement accuracy.

Figure 51:
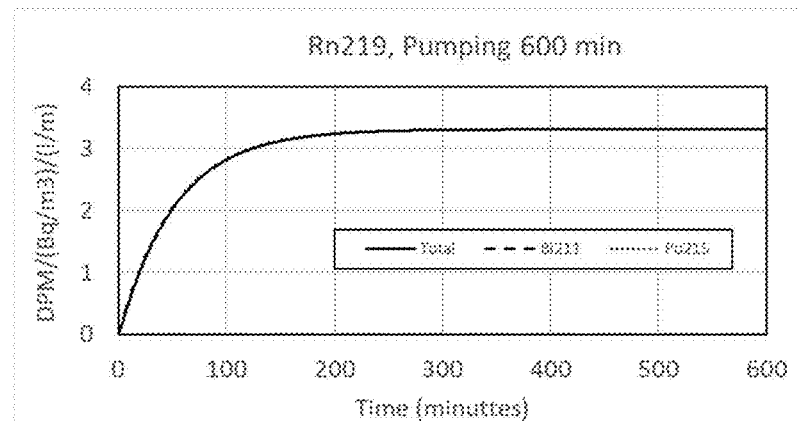
FIG. 51 shows the simulated decay from a filter due to Radon-219 progeny, collected over 600 min, using linear scale.

As seen, the total decay pr minute approached an asymptotic value, when the air moving time is increased. When the air moving time is increased to 600 minutes (FIG. 51) the approach to the asymptotic value becomes even more pronounced. As seen, the decay is dominated by the Bi-211 decay, as the Po-215 is a LD decay. To illustrate when the apparatus is ready to determine the Radon concentration again, the decay tail is plotted for an extended period of time in FIG. 52.

To illustrate the effect of the decay tail, assume that the airflow though the filter is 0.4 l/min and assume a detector efficiency of 10% (0.1 count/decay) and assume that the air moving time is 30 min and the total time measured on Radon progeny decay is 200 min. Moreover, assume that the concentration of Radon-219 is 100 Bq/m3 in the dwelling that will be measured upon.

Figure 52:
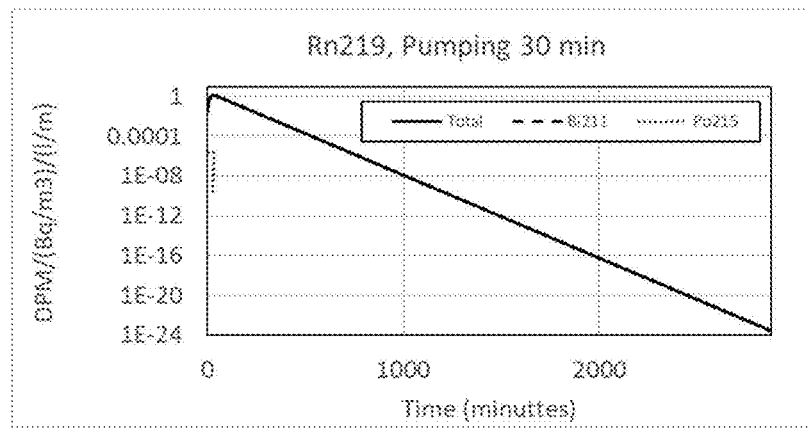
FIG. 52 shows the simulated decay from a filter due to Radon-219 progeny, collected over 30 min, using logarithmic scale for the y-axis and linear scale for the x-axis, with a prolonged simulation of the decay tail.

The area under the curve in FIG. 52 is 96.4 decays/(Bq/m3)/(l/m) between starting (t=0) and ending (t=200) the measurement on Radon progeny decays. In this case, the apparatus observes the following counts on average:

$$96.4 \text{ decays}/(Bq/m3)/(l/m) * 100 Bq/m3 * 0.4 l/m * 0.1 \text{ count/decay} = 385.6 \text{ counts}$$

In this case, the uncertainty from the limited count rate alone is 5.09%.

Assume that the maximal allowable error is +1 Bq/m3 for the apparent extra Radon-219 concentration due to the previous determination of the Radon concentration. This means that during a concurring 200 min measurement on Radon progeny decays, the counts due to the previous measurement is not allowed to be more than 3.856 counts on average.

If it is assumed that the previous measurement was performed in the same room, then the wait time is 58 min after ending the previous determination of the Radon concentration. This is because the area under the curve in FIG. 52 from 258 to 457 min is 0.949 decays/(Bq/m3)/(l/m), which is just below 1% of the 96.4 decays/(Bq/m3)/(l/m).

If the previous determination of the Radon concentration was made under the same conditions (flow rate, temperature, etc.) except for the Radon-219 concentration, which was 10.000 Bq/m3, then the required wait time would be 297 min.

Another approach regarding the radiation originating from a previous measurement, is to subtract the counts that is expected to originate from the progeny from the previous measurement from the observed counts. Due to the statistical uncertainty, this approach can be combined with above mentioned wait time determination. In this approach, the allowed error could be +/−1 Bq/m3.

Figure 53:
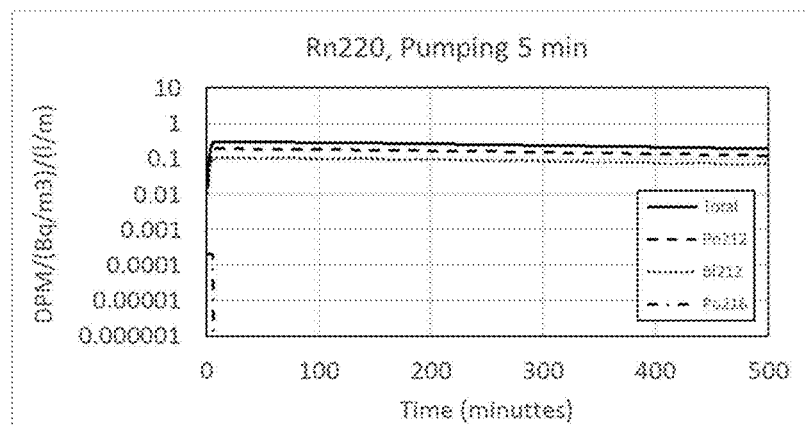
FIG. 53 shows the simulated decay from a filter due to Radon-220 progeny, collected over 5 min, using logarithmic scale for the y-axis and linear scale for the x-axis.
Figure 54:
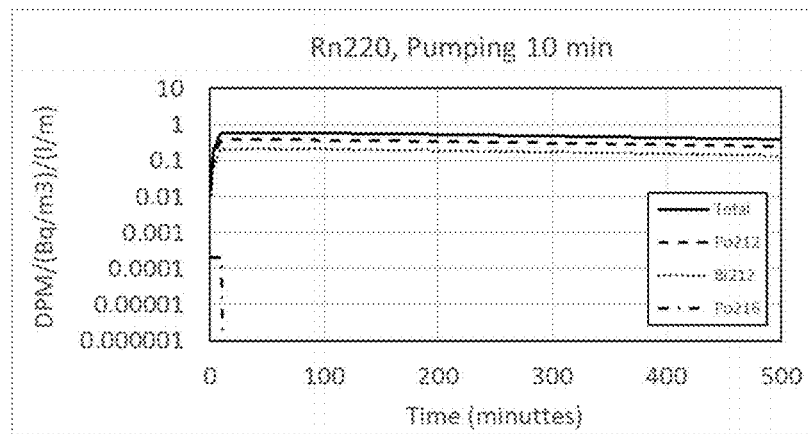
FIG. 54 shows the simulated decay from a filter due to Radon-220 progeny, collected over 10 min, using logarithmic scale for the y-axis and linear scale for the x-axis.
Figure 55:
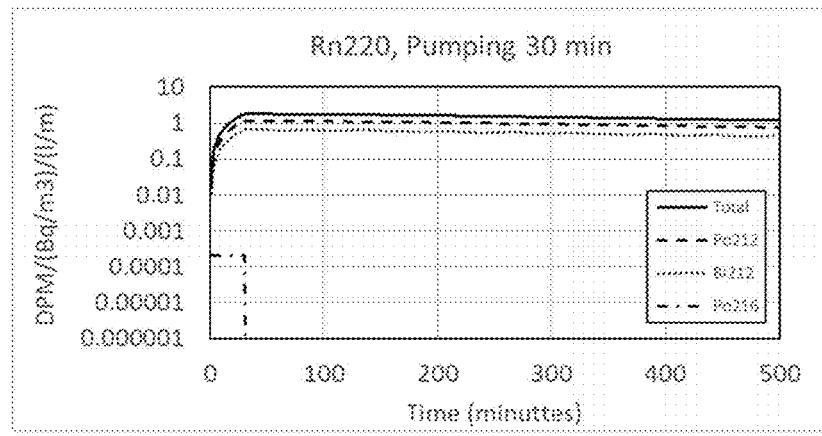
FIG. 55 shows the simulated decay from a filter due to Radon-220 progeny, collected over 30 min, using logarithmic scale for the y-axis and linear scale for the x-axis.
Figure 56:
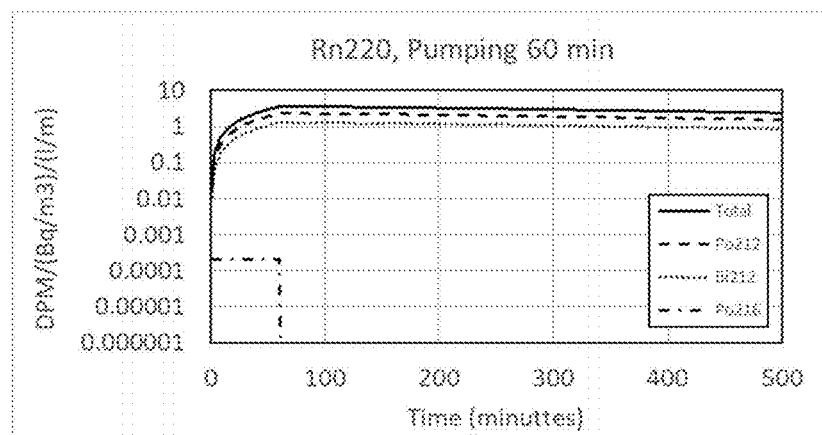
FIG. 56 shows the simulated decay from a filter due to Radon-220 progeny, collected over 60 min, using logarithmic scale for the y-axis and linear scale for the x-axis.
Figure 57:
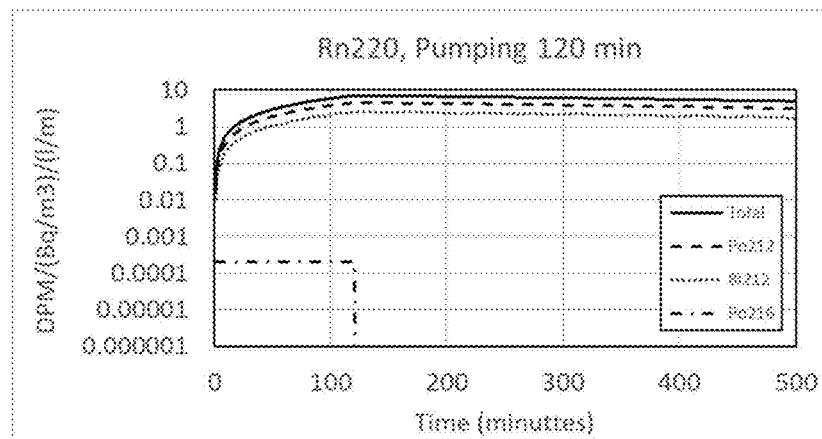
FIG. 57 shows the simulated decay from a filter due to Radon-220 progeny, collected over 120 min, using logarithmic scale for the y-axis and linear scale for the x-axis.
Figure 58:
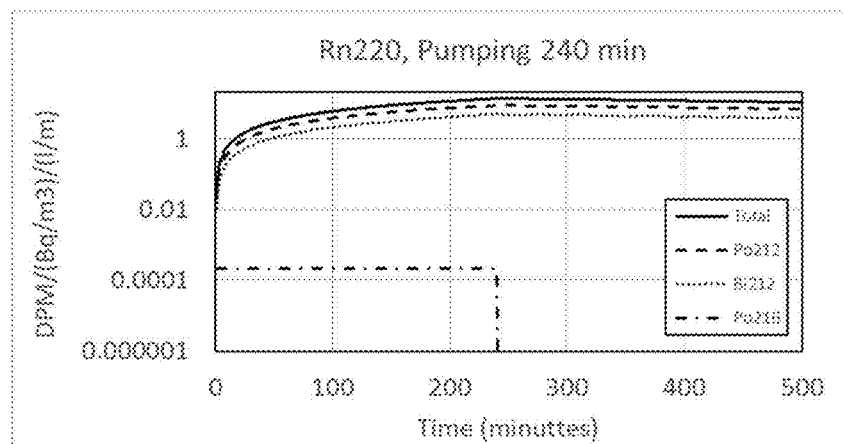
FIG. 58 shows the simulated decay from a filter due to Radon-220 progeny, collected over 240 min, using logarithmic scale for the y-axis and linear scale for the x-axis.
Figure 59:
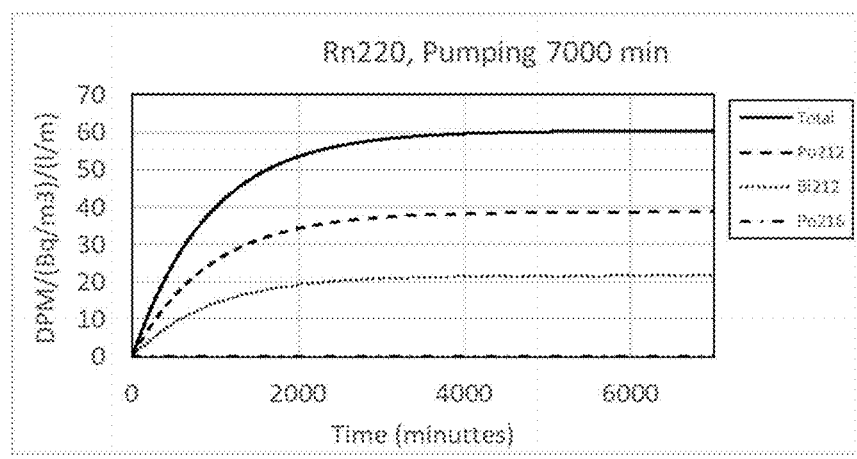
FIG. 59 shows the simulated decay from a filter due to Radon-220 progeny, collected over 7000 min, using linear scale.
Figure 60:
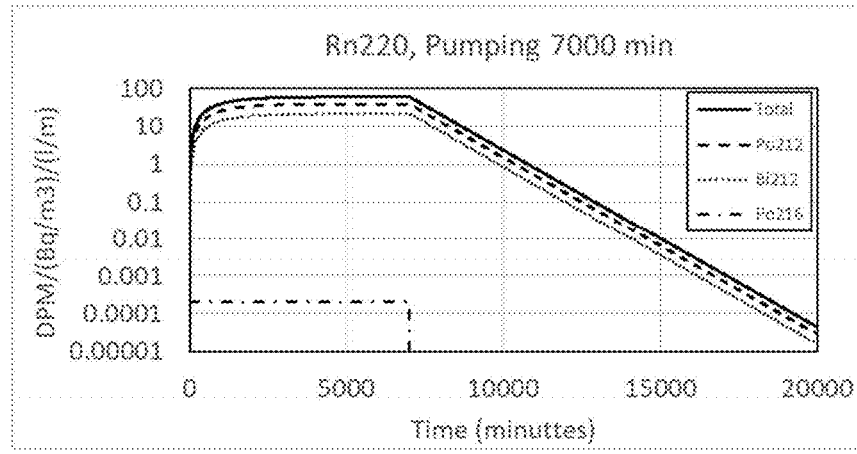
FIG. 60 shows the simulated decay from a filter due to Radon-220 progeny, collected over 7000 min, using logarithmic scale for the y-axis and linear scale for the x-axis, with a prolonged simulation of the decay tail.

The DPM for Radon-220's progeny is plotted for a 5 minute air moving time (FIG. 53), a 10 min air moving time (FIG. 54), a 30 minute air moving time (FIG. 55), a 60 minute air moving time (FIG. 56), a 120 minute air moving time (FIG. 57) and a 240 min air moving time (FIG. 58). As seen, the total decay pr minute approaches an asymptotic value, when the air moving time is increased. When the air moving time is increased to 7000 minutes (FIG. 59) the approach to the asymptotic value becomes even more pronounced. To illustrate when the apparatus is ready to determine the Radon concentration again, the decay tail is plotted for an extended period of time in FIG. 60.

Figure 61:
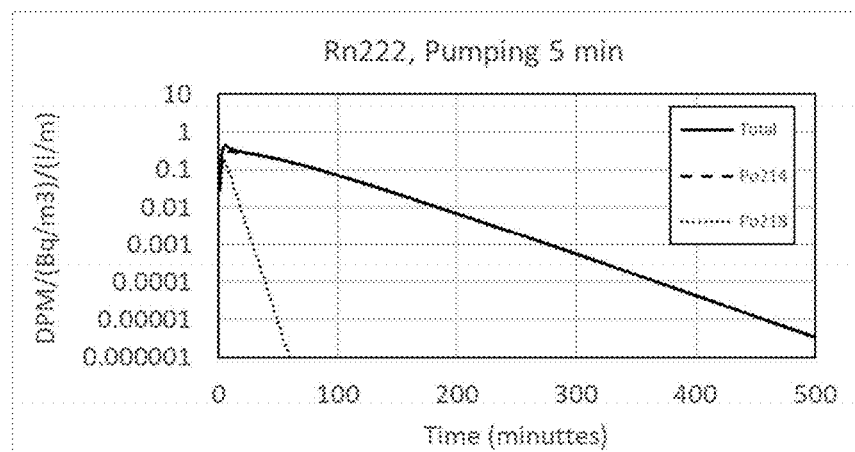
FIG. 61 shows the simulated decay from a filter due to Radon-222 progeny, collected over 5 min, using logarithmic scale for the y-axis and linear scale for the x-axis.
Figure 62:
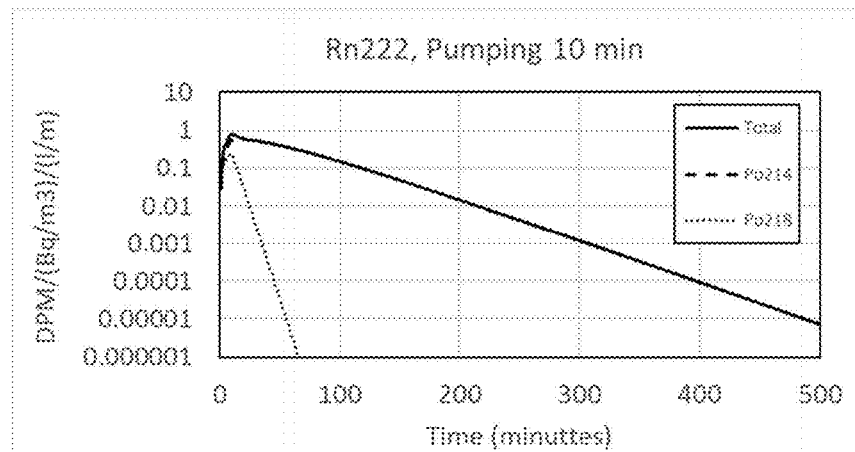
FIG. 62 shows the simulated decay from a filter due to Radon-222 progeny, collected over 10 min, using logarithmic scale for the y-axis and linear scale for the x-axis.
Figure 63:
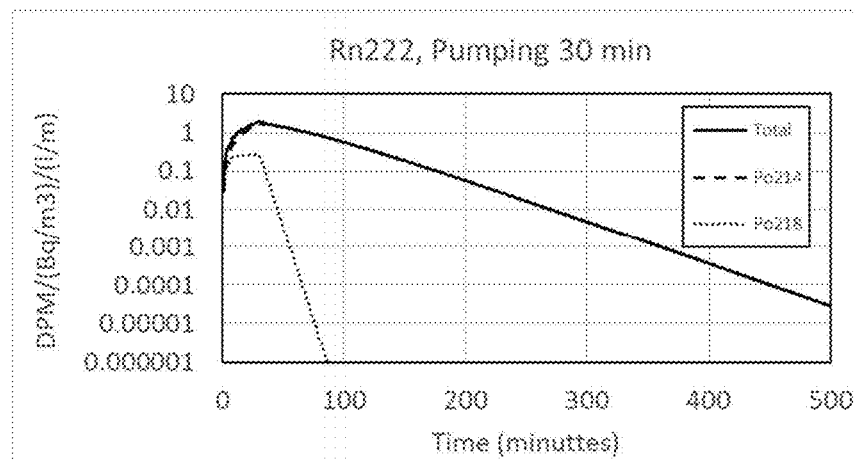
FIG. 63 shows the simulated decay from a filter due to Radon-222 progeny, collected over 30 min, using logarithmic scale for the y-axis and linear scale for the x-axis.
Figure 64:
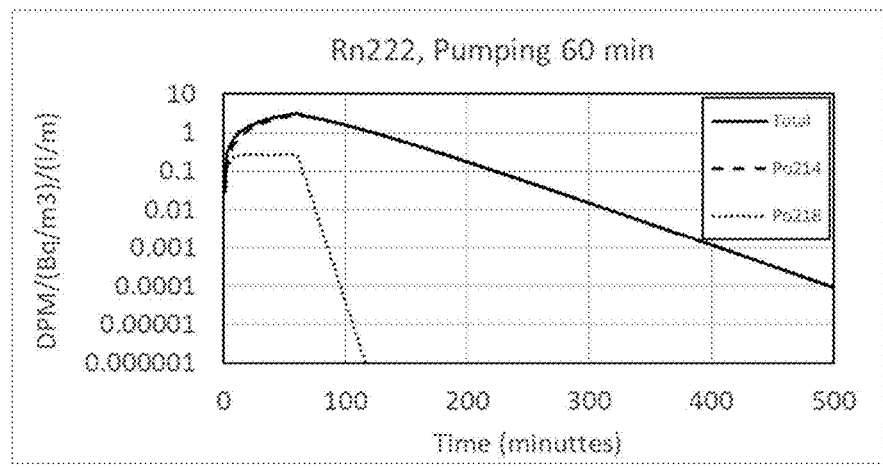
FIG. 64 shows the simulated decay from a filter due to Radon-222 progeny, collected over 60 min, using logarithmic scale for the y-axis and linear scale for the x-axis.
Figure 65:
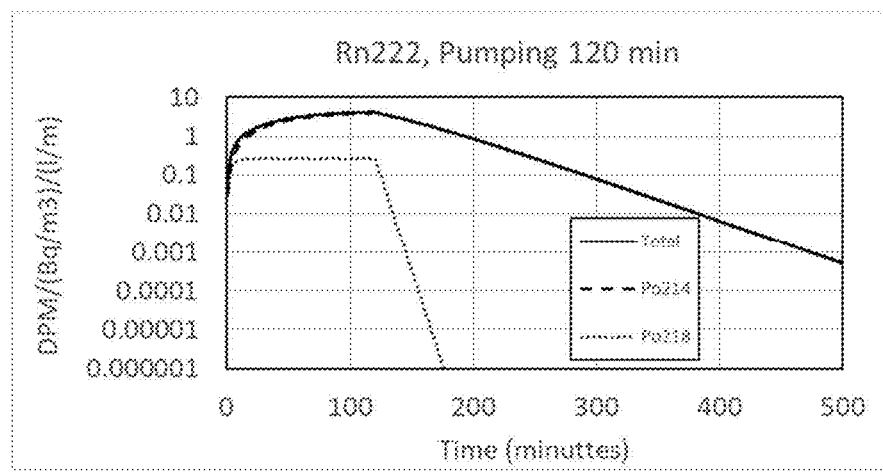
FIG. 65 shows the simulated decay from a filter due to Radon-222 progeny, collected over 120 min, using logarithmic scale for the y-axis and linear scale for the x-axis.
Figure 66:
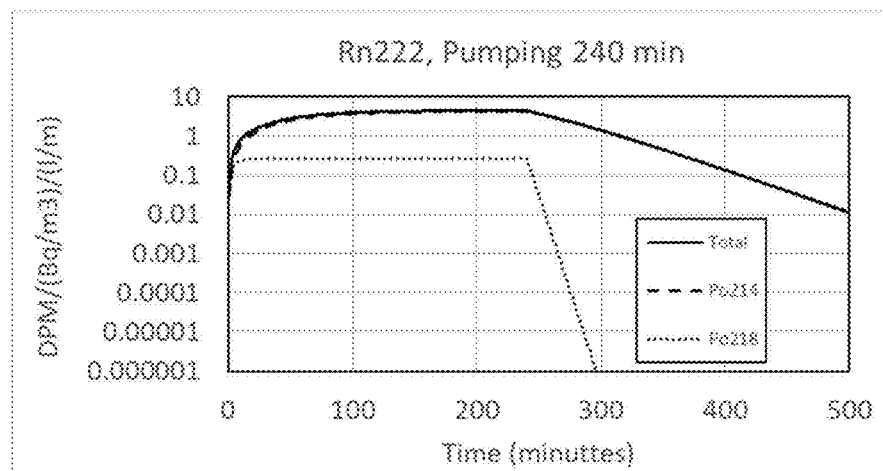
FIG. 66 shows the simulated decay from a filter due to Radon-222 progeny, collected over 240 min, using logarithmic scale for the y-axis and linear scale for the x-axis.
Figure 67:
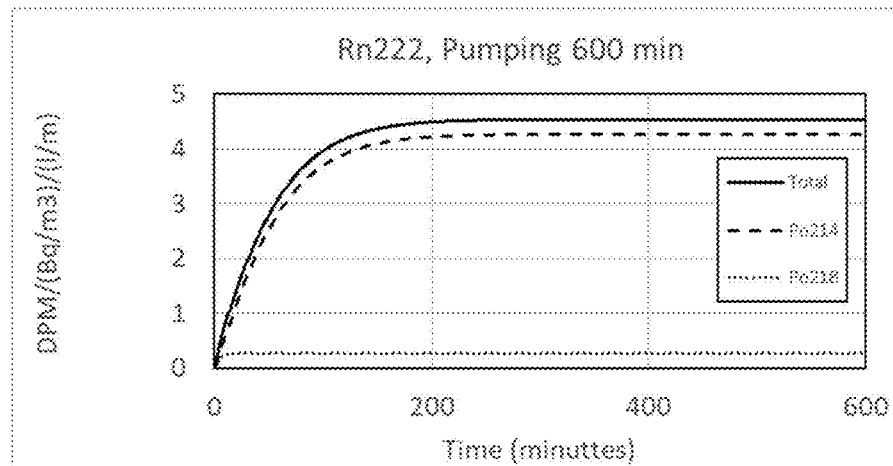
FIG. 67 shows the simulated decay from a filter due to Radon-222 progeny, collected over 600 min, using linear scale.
Figure 68:
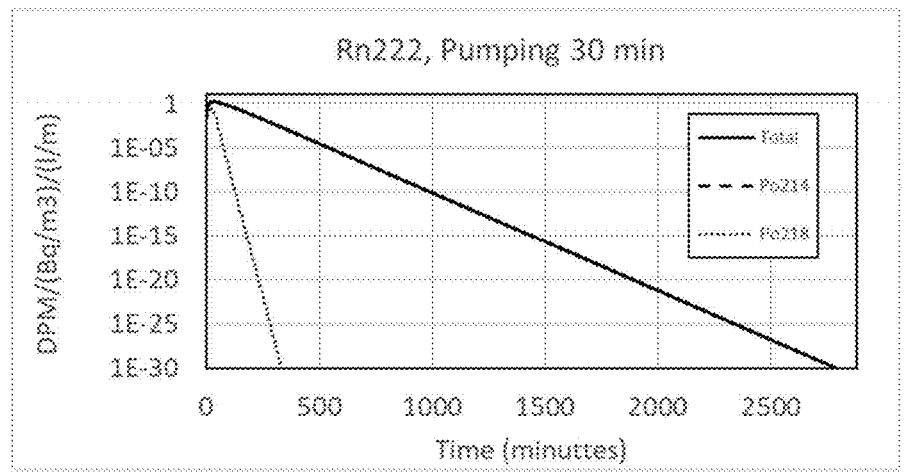
FIG. 68 shows the simulated decay from a filter due to Radon-222 progeny, collected over 30 min, using logarithmic scale for the y-axis and linear scale for the x-axis, with a prolonged simulation of the decay tail.

The DPM for Radon-222's progeny is plotted for a 5 minute air moving time (FIG. 61), a 10 min air moving time (FIG. 62), a 30 minute air moving time (FIG. 63), a 60 minute air moving time (FIG. 64), a 120 minute air moving time (FIG. 65) and a 240 min air moving time (FIG. 66). As seen, the total decay pr minute approaches an asymptotic value, when the air moving time is increased. When the air moving time is increased to 600 minutes (FIG. 67) the approach to the asymptotic value becomes even more pronounced. To illustrate when the apparatus is ready to determine the Radon concentration again, the decay tail is plotted for an extended period of time in FIG. 68.

As seen on the graphs for the long air moving times (FIG. 51, FIG. 59 and FIG. 67), the Radon progeny decay on the filter material will converge towards a constant rate, when the air moving time is long enough. An apparatus can use this radiation level measurement to determine the Radon concentration. This does however require a long waiting time before the level stabilizes. In contrary to this, the area below the curve can be used, as this does not require that the radiation level has reached a constant value. Moreover, the count rate is higher, if the whole curve is included, compared to applying a constrain, where only the stable count rate part of the curve is used.

The Radon concentration determined by the illustrated measurement is the Equilibrium Equivalent Concentration (EEC), as it determines the Radon concentration assuming that the Radon progeny is in equilibrium with the Radon concentration. It is also possible to assume a conversion factor (f), which is used to determine the Radon concentration from a non-equilibrium Radon progeny concentration. In this case, the Radon concentration equals EEC divided by f. The factor f can be applied based on other measurements, experience and/or locale legislation. The unit of the Radon concentration can be Bq/m^3, WL (working level), PAEC (potential alpha energy concentration), pCi/l, or other similar units.

Notice that the wait time for a maximal allowed added uncertainty can be determined from values known before the determination of the Radon concentration is started (by one or more of the following parameters; measurement of ambient pressure, measurement of temperature, expected flow rate of the air moving device, decay tail remaining from previous determination of the Radon concentration and/or the time for the new determination of the Radon concentration). Hence, it is advantageous if the apparatus determines when enough time has passed since the last determination of the Radon concentration and outputs this. The necessary wait time depends on the Radon isotope(s) under investigation and in the case where the apparatus determines multiple concentrations simultaneously, it is advantageous if the apparatus can determine either each wait time or the maximum of the individual wait times.

An example of this is an apparatus that determines both the Radon-220 and the Radon-222 concentration. If the determination of the Radon concentration takes 240 min and the air moving time is 60 minutes and the Radon-220 concentration was 10 Bq/m3 and the Radon-222 concentration was 150 Bq/m3 and the allowed added uncertainty in both cases is maximum +1 Bq/m3 from the tails. In this case, the wait time is 2055 minutes for Radon-220 and 16 minutes for Radon-222.

The described combinations of air moving time, flow rate, Radon concentration, Radon isotope, total time for determination of the Radon concentration, allowed added uncertainty from previous determination(s) of the Radon concentration, confidence regarding wait time and detector efficiency are only used as examples and an embodiment can of course be implemented using other values.

As described, the maximum radiation signal from a dwelling is obtained just as the air moving device stops. Hereafter the signal decreases due to the decay of the Radon progeny. As illustrated, it can be advantageous to use at least part of the decay tail to refine the determination of the Radon concentration. Pending on the circumstances, as little as 1 min extra measurement time will provide an advantage.

An apparatus does not have to measure continuous on the build-up from the air moving device starts till it stops, and neither does it have to measure continuously on the decay tail.

As described, the apparatus functions by passing air through a filtering element for some time. Hereafter, it can be advantageous to measure on the decay tail for some time. When the air moving device stops, it is possible to move the apparatus, while the measurement on the decay tail continues. The apparatus can even leave the dwelling, while still refining the determination of the Radon concentration by measuring on the decay tail of the collected Radon daughters.

It can be advantageous to store the remaining wait time in persistent memory. The advantage of storing the wait time in such a way, is that even if the apparatus runs out of power, it will still be able to inform the user, when a new determination of the Radon concentration can be performed without significant uncertainty due to the last performed determination of the Radon concentration.

When a potential buyer investigates a dwelling, and possible performs a determination of the Radon concentration, this can only reflect the Radon and/or Radon progeny concentration at that time.

The owner of the dwelling will therefore have an incentive to lower the Radon and/or Radon progeny concentration before a measurement is performed. In one example, this can happen if the owner of the dwelling ventilates the property before letting potential buyers examine it.

As air diffusion is slow, it is likely that the concentration has only been lowered at places where air can move relatively unhindered.

Hence the potential buyer can investigate places where air movement is unlikely. Examples of such places includes: Kitchen closets, wardrobe closets, closets in general, rooms without ventilation possibilities and other similar places.

To gain access to places with limited air movement, it can be advantageous to connect the apparatus inlet to a tube. The user will then have the capability to place the apparatus at some distance from the spot where the Radon concentration is determined.

Figure 69:
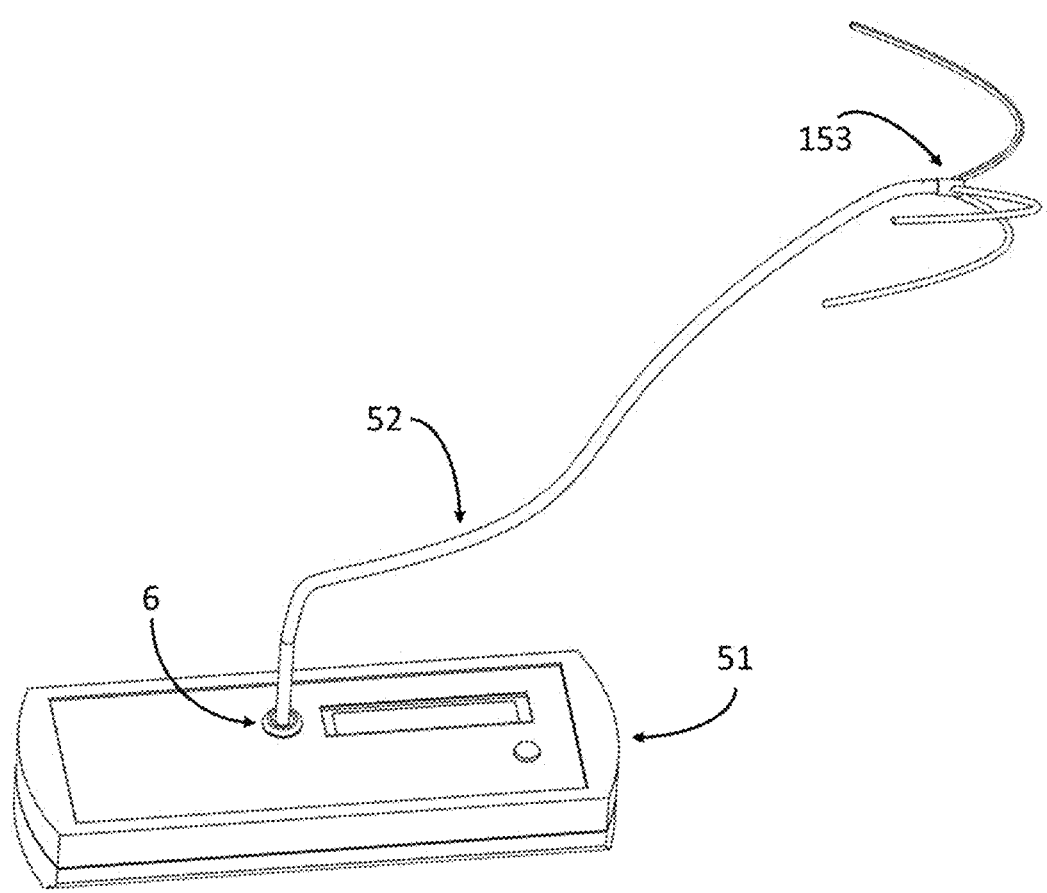
FIG. 69 illustrates an embodiment, where a tube is connected to the apparatus inlet and a spider like spacing device is attached to the inlet of said tube.
Figure 70:
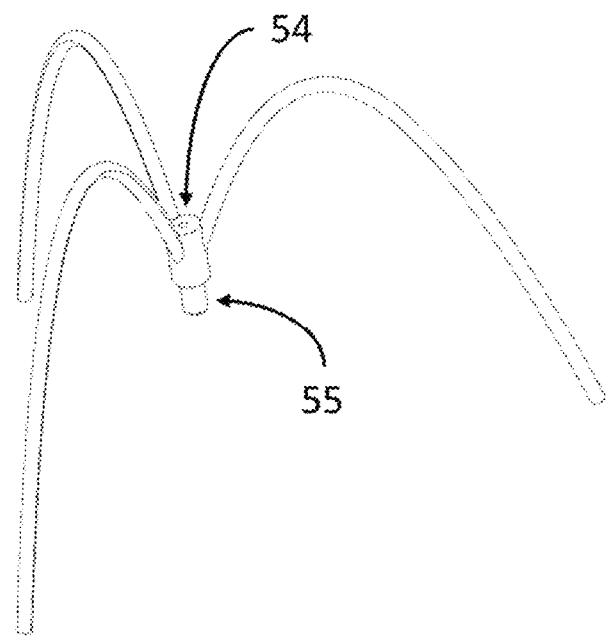
FIG. 70 illustrates the spacing device from FIG. 69 from a different angle.

In this case, it is important that the tube intake remains unblocked. Here it can be advantageous to connect the tube to the device illustrated in FIG. 69. Here, a tube (52) is connected to the apparatus (51), at the inlet (6). In the other end, the tube is connected to a spider like device (153). The function of the device, which is also illustrated in FIG. 70, is to keep the intake away from objects. As an example, if the spider like device is placed inside a kitchen closet containing pots and pans, the spider like device will ensure that the inlet remains open during a determination of the Radon concentration. If such a spacing device is not attached to tube, the tube might suck onto the wall, or the other contents in the kitchen closet, hence limiting airflow during the determination of the Radon concentration.

In FIG. 70, the intake (54) and the outlet (55) of the spider like device are specifically marked on the drawing.

Figure 71:
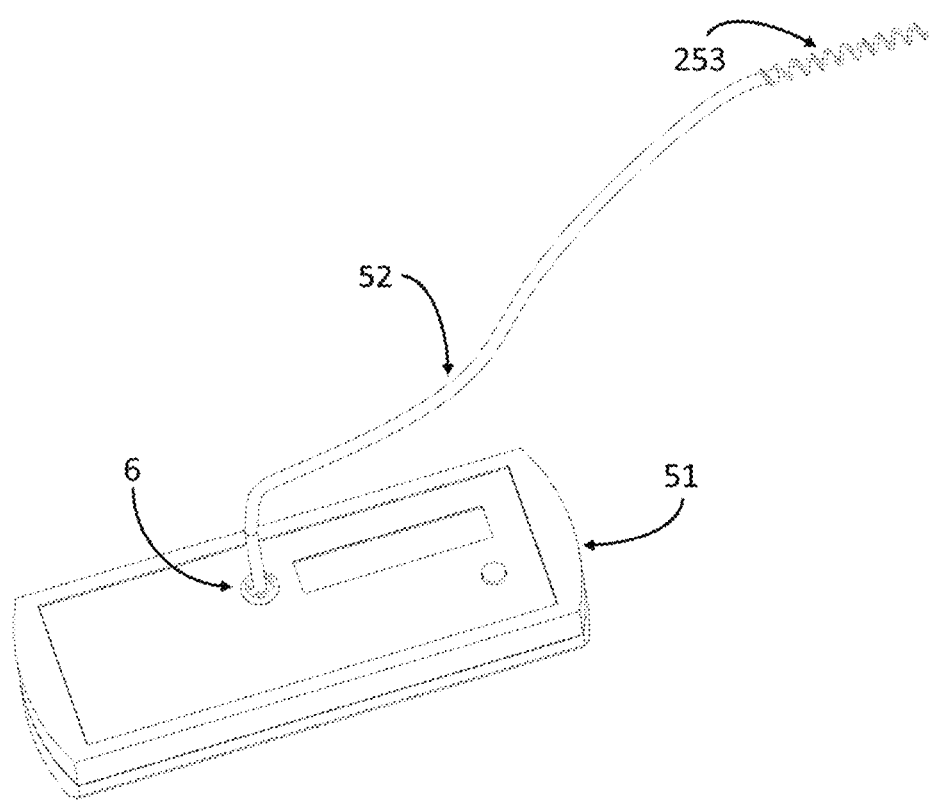
FIG. 71 illustrates an embodiment, where a tube is connected to the apparatus inlet and a spring like spacing device is attached to the inlet of said tube.

The spacing device can even be as simple as a spring, which is illustrated in FIG. 71. Here, a tube (52) is connected to the apparatus (51), at the inlet (6). In the other end, the tube is connected to a spring like device (253).

One additional advantage of such a tube, is that a prolonged distance between the apparatus intake (via the tube) and the outlet limits the amount of recycled air. This is advantageous, as recycled air will contain fewer Radon progeny, as they have already been at least partially captured in the filter element.

Another mean to determine enlarged ventilation, is to determine the concentration of the Radon-222 progeny Polonium-218 and Polonium-214 separately. As the time it takes to reach equilibrium between Radon-222 and its first decay daughter depends on the lifetime of Polonium-218 (3.10 min), this equilibrium is established much faster than the Polonium-214 equilibrium. Hence, if the concentration of Polonium-214 is smaller than expected in relation to the Polonium-218 concentration, this shows that ventilation has affected the determination of the Radon concentration. In some embodiments the apparatus can use the measured Polonium-214 to Polonium-218 ratio to determine if ventilation affects the determination of the Radon concentration and/or use said ratio to determine the conversion factor (f) and in turn a corrected Radon concentration. It can also be advantageous to use only the Polonium-218 concentration to determine the Radon-222 concentration, due to the relative fast equilibrium between the two.

If an apparatus measures the individual concentrations of Polonium-218 and Polonium-214 and uses this to determine a ventilation corrected Radon concentration and/or other Radon concentrations, in the context of this patent this capability is comprised in the following statement; the apparatus can determine the conversion factor (f) between the non-equilibrium Radon progeny concentration and the Radon concentration.

As stated, determining the individual concentrations of Polonium-218 and Polonium-214 can be used to determine multiple Radon concentrations. This comprises the Radon concentration present in the dwelling (ventilation corrected), but also the Radon concentration if the dwelling is unventilated. The latter is possible, as the individual concentrations of Polonium-218 and Polonium-214 can be used to determine the ventilation of the dwelling (air changeout pr second).

Figure 72:
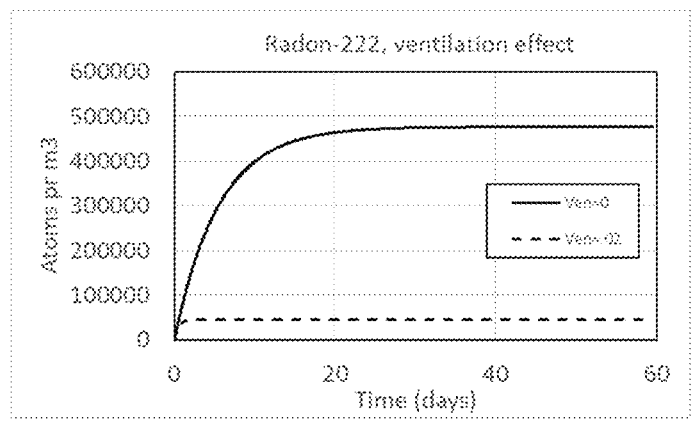
FIG. 72 shows the Radon-222 concentration vs time for two cases using logarithmic scale for the y-axis and linear scale for the x-axis. In both cases, the number of Radon atoms that enters the dwelling is 1 atom/(sec*m3) and an initial concentration of zero concentration for Radon-222. The difference between the two lines in the plot is the ventilation rate. The solid line is for zero ventilation and the dashed line is for a ventilation of 0.02 1/(s*m3).

To illustrate the effect of ventilation, the Radon-222 concentration vs time is plotted in FIG. 72 covering two cases. In both cases, the number of Radon atoms that enters the dwelling is 1 atom/(sec*m3) and an initial concentration of zero concentration both for Radon-222 and for its progeny was applied. The radiation equations were solved using finite timesteps, with a stepping time of 10 ms. Such a timestep is adequate both for resolving the ventilation effect and also for all half-lives, except Polonium-214. Hence, for Polonium-214, it is assumed that its radiation activity equals Bismuth-214's activity, hence neglecting the ventilation effect for Polonium-214 itself.

The difference between the two lines in the plot is the ventilation rate. The solid line is for zero ventilation and the dashed line is for a ventilation of 0.02 l/(s*m3). Notice that the minimal legal ventilation rate for new buildings in Denmark is 0.3 l/(s*m2) and with a ceiling height of 2.3 m, this corresponds to a ventilation of 0.13 l/(s*m3). As seen, both curves reach an asymptotic value and the ventilation makes the conversion go faster. Hence, in the following plots regarding the ventilation effect (FIG. 72 through FIG. 82), the converged values at 60 days have been applied. As the 10 ms timestep applied in the simulation does not resolve Polonium-214 half-live, the determined radiation activity for Polonium-214 was used to determine the converged Polonium-214 concentration.

The measured radiation from the filter depends on multiple factors, that is the pumping time, the total measuring time, the ventilation rate, the Radon concentration, the flow rate through the filter, the filter/detector efficiency and the detector efficiency. Notice that the count rate scales linearly with the Radon concentration, the flow rate through the filter, the filter/detector efficiency and the detector efficiency. Hence the Polonium-218 to Polonium-214 total radiation count rate ratio is independent of these.

If the wait time after the pump stops is long enough, the determination of the Radon concentration will effectively include all counts from the filter. In FIG. 61 through FIG. 66, it is seen that the count rate decreases with around a factor of 10 for each 100 minutes that passes after the pumping stops. Hence, to illustrate the measured radiation after the filter activity effectively diminished, a wait time of 210 minutes after the pumping stops was applied. Here, the Polonium-218 vs. Polonium-214 total count rate ratio will depend on the atmosphere measured upon, but not on the pumping time.

Figure 73:
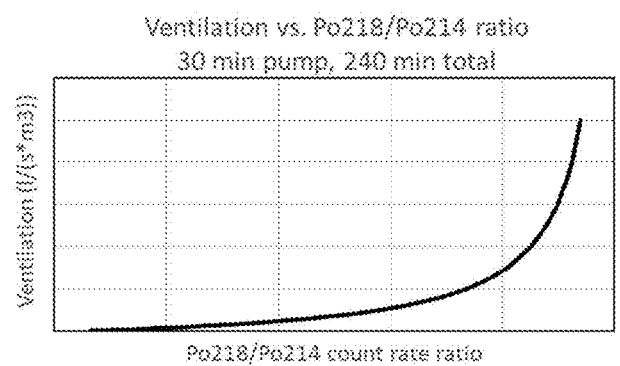
FIG. 73 shows the ventilation rate vs the Polonium-218 to Polonium-214 total radiation count rate ratio, using linear scale. The radiation is the simulated total emission from a filter where the pump was active for 30 minutes and the total measurement time was 240 minutes.
Figure 74:
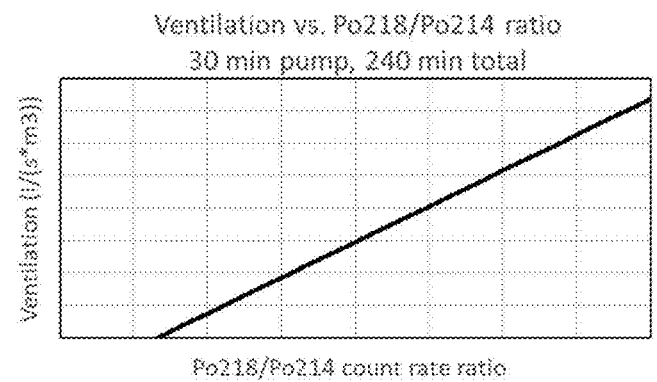
FIG. 74 is a zoom-in on FIG. 73, covering the normal ventilation rates.

In FIG. 73 the ventilation rate vs the Polonium-218 to Polonium-214 total radiation count rate ratio is plotted. The radiation is the simulated total emission from a filter a pumping time of 30 minutes and a total measurement time of 240 minutes. In FIG. 74, the same data is plotted zoomed-in at the common ventilation range.

Figure 75:
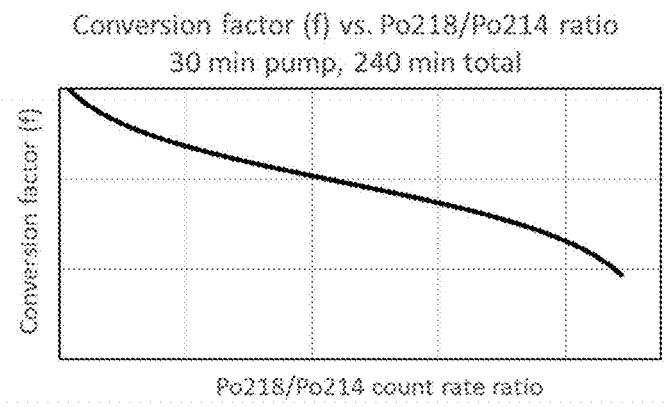
FIG. 75 shows the conversion factor (f) vs the Polonium-218 to Polonium-214 total radiation count rate ratio, using logarithmic scale for the y-axis and linear scale for the x-axis. The radiation is the simulated total emission from a filter where the pump was active for 30 minutes and the total measurement time was 240 minutes.
Figure 76:
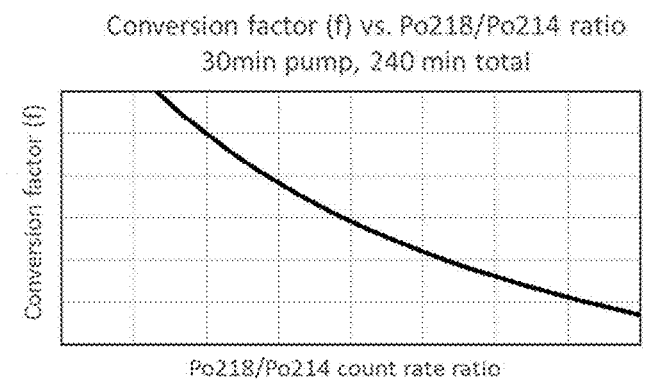
FIG. 76 is a zoom-in on FIG. 75, covering the normal ventilation rates.

In FIG. 75 the conversion factor vs the Polonium-218 to Polonium-214 total radiation count rate ratio is plotted. The radiation is the simulated emission from a filter a pumping time 30 minutes and a total measurement time of 240 minutes. In FIG. 76, the same data is plotted zoomed-in at the common ventilation range.

Notice that, as the wait time after the pumping stops is long for FIG. 73 through FIG. 76, the plot is almost independent of the pumping time. I.e. plotting the same graph for a different pumping time (like 10 min) will be indistinguishable from the plotted curve.

On the other hand, both the relationship between the ventilation and the Polonium-218 to Polonium-214 total radiation count rate ratio and the relationship between the conversion factor vs. the Polonium-218 to Polonium-214 total radiation count rate ratio will depend on the pumping time for shorter waiting times.

Figure 77:
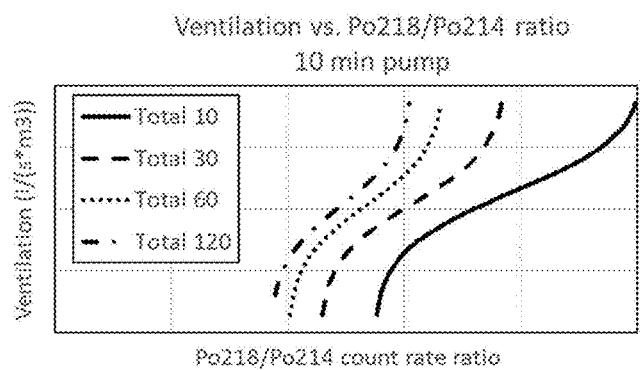
FIG. 77 shows the ventilation rate vs the Polonium-218 to Polonium-214 total radiation count rate ratio, using logarithmic scales for both axis for a pumping time of 10 minutes. The solid graph is for a total measurement time of 10 minutes, the dashed graph is for a total measurement time of 30 minutes, the dotted graph is for a total measurement time of 60 minutes and the dash-dotted graph is for a total measurement time of 120 minutes.

To illustrate this, the ventilation vs. the Polonium-218 to Polonium-214 total radiation count rate ratio is plotted in FIG. 77 for a pumping time of 10 minutes. Here, the solid line illustrates a total Radon measuring time of 10 minutes (i.e. no waiting time after the pumping), the dashed line illustrates a total Radon measuring time of 30 minutes, the dotted line illustrates a Radon measuring time of 60 minutes and the dash-dotted line illustrates a total Radon measuring time of 120 minutes.

Figure 78:
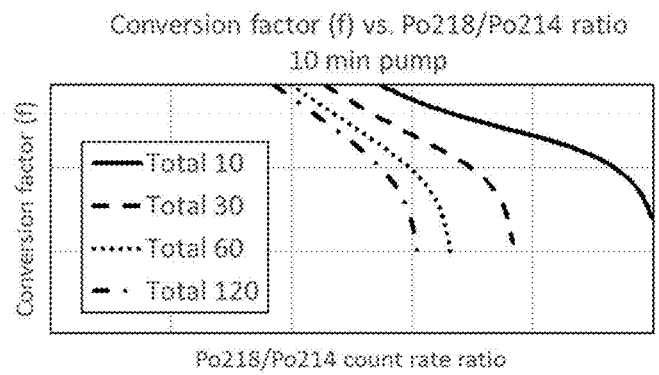
FIG. 78 shows the conversion factor (f) vs the Polonium-218 to Polonium-214 total radiation count rate ratio, using logarithmic scales for both axis for a pumping time of 10 minutes. The solid graph is for a total measurement time of 10 minutes, the dashed graph is for a total measurement time of 30 minutes, the dotted graph is for a total measurement time of 60 minutes and the dash-dotted graph is for a total measurement time of 120 minutes.

In FIG. 78, the conversion factor (f) is plotted vs the Polonium-218 to Polonium-214 total radiation count rate ratio for a pumping time of 10 minutes. Here, the solid line illustrates a total Radon measuring time of 10 minutes (i.e. no waiting time after the pumping), the dashed line illustrates a total Radon measuring time of 30 minutes, the dotted line illustrates a Radon measuring time of 60 minutes and the dash-dotted line illustrates a total Radon measuring time of 120 minutes.

Figure 79:
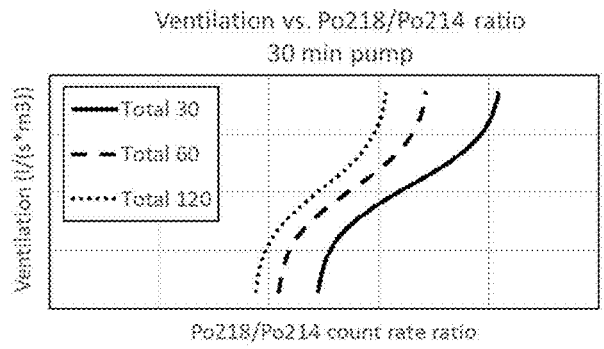
FIG. 79 shows the ventilation rate vs the Polonium-218 to Polonium-214 total radiation count rate ratio, using logarithmic scales for both axis for a pumping time of 30 minutes. The solid graph is for a total measurement time of 30 minutes, the dashed graph is for a total measurement time of 60 minutes and the dotted graph is for a total measurement time of 120 minutes.

In FIG. 79, the ventilation is plotted vs the Polonium-218 to Polonium-214 total radiation count rate ratio for a pumping time of 30 minutes. Here, the solid line illustrates a total Radon measuring time of 30 minutes (i.e. no waiting time after the pumping), the dashed line illustrates a total Radon measuring time of 60 minutes and the dotted line illustrates a Radon measuring time of 120 minutes.

Figure 80:
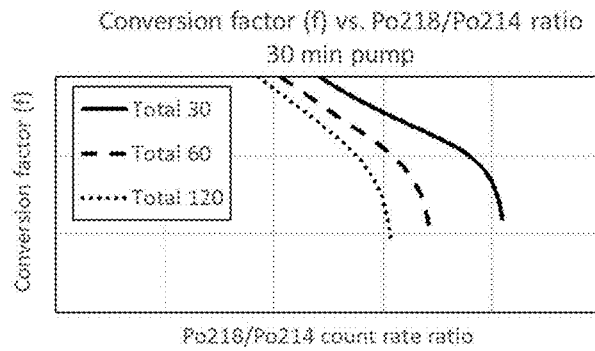
FIG. 80 shows the conversion factor (f) vs the Polonium-218 to Polonium-214 total radiation count rate ratio, using logarithmic scales for both axis for a pumping time of 30 minutes. The solid graph is for a total measurement time of 30 minutes, the dashed graph is for a total measurement time of 60 minutes and the dotted graph is for a total measurement time of 120 minutes.

In FIG. 80, the conversion factor (f) is plotted vs the Polonium-218 to Polonium-214 total radiation count rate ratio for a pumping time of 30 minutes. Here, the solid line illustrates a total Radon measuring time of 30 minutes (i.e. no waiting time after the pumping), the dashed line illustrates a total Radon measuring time of 60 minutes and the dotted line illustrates a Radon measuring time of 120 minutes.

Figure 81:
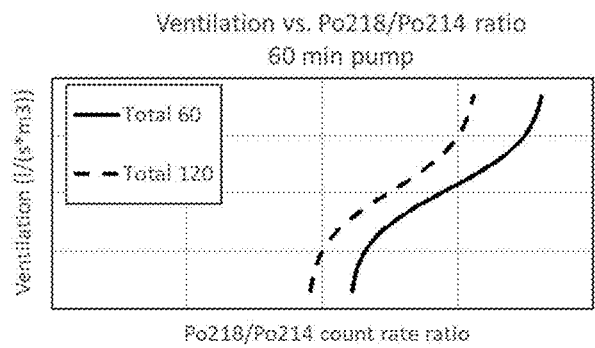
FIG. 81 shows the ventilation rate vs the Polonium-218 to Polonium-214 total radiation count rate ratio, using logarithmic scales for both axis for a pumping time of 60 minutes. The solid graph is for a total measurement time of 60 minutes and the dashed graph is for a total measurement time of 120 minutes.

In FIG. 81, the ventilation is plotted vs the Polonium-218 to Polonium-214 total radiation count rate ratio for a pumping time of 60 minutes. Here, the solid line illustrates a total Radon measuring time of 60 minutes (i.e. no waiting time after the pumping) and the dashed line illustrates a total Radon measuring time of 120 minutes.

Figure 82:
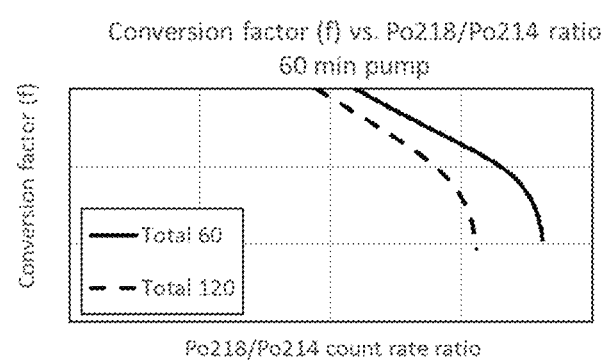
FIG. 82 shows the conversion factor (f) vs the Polonium-218 to Polonium-214 total radiation count rate ratio, using logarithmic scales for both axis for a pumping time of 60 minutes. The solid graph is for a total measurement time of 60 minutes and the dashed graph is for a total measurement time of 120 minutes.

In FIG. 82, the conversion factor (f) is plotted vs the Polonium-218 to Polonium-214 total radiation count rate ratio for a pumping time of 60 minutes. Here, the solid line illustrates a total Radon measuring time of 60 minutes (i.e. no waiting time after the pumping) and the dashed line illustrates a total Radon measuring time of 120 minutes.

When the detected radiation is analysed, it can be advantageous if the instrument or connected devises can determine a value for the conversion factor (f) for a given Polonium-218 to Polonium-214 total radiation count rate ratio. As the direct simulation of the radiation responds for a given ventilation rate is somewhat computational heavy, it can be advantageous to use an approximation, where the points on the relevant graph exemplified by FIG. 75 through FIG. 82, is approximated with a look up table and/or one or more a mathematical function(s). Such a function can be a polynomial like a Taylor expansion. It can also be a logarithmic function or a sum of logarithmic functions, possible using one or more polynomials as arguments. It can also be a power function or a sum of power functions, possible using one or more polynomials as arguments. It can also be a sinusoidal function or a sum of sinusoidal functions, possible using one or more polynomials as arguments. It can also be a combination of the mentioned functions or a combination hereof, possible with the origin shifted for one or more of the applied functions. To avoid numerical instability, it can be advantageous if the fitting function limits or avoids subtractions.

In the illustrations of the ventilation effect, FIG. 73 through FIG. 82, it was assumed that the filter catches all the Radon progeny, which is pumped through the filter. However, a specific filter can have an affinity for one or more specific progenies. I.e. the filter can have an affinity for positive charged progeny. In this case, the graphs needs to be determined for the specific filter affinity. This can be done using the described simulation method.

For the professional user, the results determined by the Radon apparatus can be used to generate a rapport. The rapport could for example include the positions in the dwelling where the Radon concentration was determined, the result(s) of determining the Radon concentration, the date and other relevant information. Such a rapport could for example be generated by an online tool, where the operator needs to identify himself. This enables the online system to check if the professional operator is up to date with training and has the necessary certification(s).

Moreover, it is advantageous if the apparatus itself and/or connected devices can identify the geographical position automatically, for example by using a GPS. In some embodiments, the position can be determined by linking the apparatus to a mobile phone via. Blue tooth. Furthermore, the apparatus itself and/or connected devices can in some embodiments identify the time. The position and/or the time can then be stored together with the Radon result, which will enable the user easy access to the performed determination(s) of the Radon concentration. Such extra data can also be used to generate the aforementioned rapport.

In some embodiments, the objective with the time and/or geographical position data is to aid the user in recalling the event where the Radon concentration was determined. Hence, the accuracy of the geographical position can be adequate if it can identify the address where the Radon concentration was determined, or in some instances just the local area. Likewise, the time determination can be precise, but in some instances, it is enough if the date is established.

In other embodiments, the geographical position is determined more accurately and can therefore be used to determine the room in the dwelling where the Radon concentration was determined.

Although particular exemplary hearing devices have been shown and described, it will be understood that it is not intended to limit the claimed inventions to the exemplary hearing devices, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

The invention claimed is:

1. An apparatus configured to measure decay(s) from Radon progeny, the apparatus comprising:
an air moving device configured to create an airflow;
a filter;
a pathway configured to guide the airflow through the filter, wherein the filter is configured to collect at least part of the Radon progeny in the airflow;
a semiconductor detector configured to detect alpha radiation from the Radon progeny collected by the filter, the semiconductor detector being configured to spectrally resolve the alpha radiation and output a detector signal indicative of two or more respective energy levels of the detected alpha radiation;
wherein the apparatus comprises or is connectable to electronic circuitry configured to interpret the detected alpha radiation to thereby perform a Radon measurement;
wherein the apparatus comprises or is connectable to an output device configured to output an equivalent equilibrium Radon concentration and/or to output a Radon concentration; and
wherein the semiconductor detector has an active area less than 225 mm$^2$, wherein the filter is supported by a filter holder, and wherein the filter holder is fixedly positionable in the apparatus.

2. The apparatus according to claim 1, wherein the active area of the semiconductor detector is less than 120 mm$^2$.

3. The apparatus according to claim 1, wherein the filter is permanently attached to the filter holder, wherein at least part of the filter holder defines a periphery of the pathway and wherein the filter holder comprises at least one bulk rigid material.

4. The apparatus according to claim 1, wherein the filter holder comprises at least one bulk rigid material with a Youngs modulus in a range between 0.1 Gpa and 600 Gpa.

5. The apparatus according to claim 1, wherein the filter holder comprises at least one bulk rigid material with a Youngs modulus in a range between 0.1 Gpa and 200 Gpa.

6. The apparatus according to claim 1, wherein the filter is a mechanical filter.

7. The apparatus according to claim 1, wherein the filter is permanently built into the apparatus.

8. The apparatus according to claim 1, wherein the filter is replaceable via one or more specialized tools.

9. The apparatus according to claim 1, wherein a distance between the filter and said semiconductor detector is 2 mm or less.

10. The apparatus according to claim 1, wherein the semiconductor detector is on a PCB board, and wherein at least part of the electronic circuitry is also on the PCB board.

11. The apparatus according to claim 1, further comprising an air pressure sensor configured to sense a pressure associated with the airflow, wherein the apparatus is configured to use the sensed pressure to establish an airflow rate and/or an air volume that passes through the filter during the Radon measurement, and wherein the Radon measurement incorporates the airflow rate and/or the air volume.

12. The apparatus according to claim 11, further comprising a dedicated choke in the pathway to induce a pressure difference measurable by the air pressure sensor.

13. The apparatus according to claim 1, wherein the apparatus comprises or is connectable to a persistent memory configured to store a number of remaining Radon measurements and/or measurement time that the apparatus can carry out using the filter.

14. The apparatus according to claim 1, further comprising at least one relative airtight pressure chamber in the pathway that guides the airflow, wherein at least one side of the pressure chamber comprises at least part of a PCB board.

15. A method performed using the apparatus according to claim 1, comprising performing a Radon measurement using the apparatus in a place where air movement is unlikely due to limited ventilation.

* * * * *